(12) United States Patent
Isshiki

(10) Patent No.: US 10,459,707 B2
(45) Date of Patent: Oct. 29, 2019

(54) INSTRUCTION-SET SIMULATOR AND ITS SIMULATOR GENERATION METHOD

(71) Applicant: TOKYO INSTITUTE OF TECHNOLOGY, Meguro-ku, Tokyo (JP)

(72) Inventor: Tsuyoshi Isshiki, Tokyo (JP)

(73) Assignee: Tokyo Institute of Technology, Tokyo (JP)

( * ) Notice: Subject to any disclaimer, the term of this patent is extended or adjusted under 35 U.S.C. 154(b) by 0 days.

(21) Appl. No.: 15/877,397

(22) Filed: Jan. 23, 2018

(65) Prior Publication Data

US 2018/0165079 A1 Jun. 14, 2018

Related U.S. Application Data

(63) Continuation-in-part of application No. PCT/JP2016/071632, filed on Jul. 22, 2016.

(30) Foreign Application Priority Data

Jul. 23, 2015 (JP) .................................. 2015-145452

(51) Int. Cl.
*G06F 8/53* (2018.01)
*G06F 8/30* (2018.01)

(52) U.S. Cl.
CPC . *G06F 8/53* (2013.01); *G06F 8/31* (2013.01)

(58) Field of Classification Search
CPC ................................... G06F 8/53; G06F 8/443
USPC ......................................................... 717/136
See application file for complete search history.

(56) References Cited

U.S. PATENT DOCUMENTS

| 6,071,317 A * | 6/2000 | Nagel ...................... G06F 8/78 717/128 |
| 6,279,150 B1 * | 8/2001 | Bachmann ................ G06F 8/52 717/136 |
| 8,510,723 B2 * | 8/2013 | Barua ....................... G06F 8/52 717/136 |
| 9,588,747 B2 * | 3/2017 | Woo ...................... G06F 8/4441 |
| 2005/0278714 A1 * | 12/2005 | Vahid ...................... G06F 8/443 717/159 |
| 2006/0195906 A1 * | 8/2006 | Jin ......................... G06F 21/125 726/26 |

(Continued)

FOREIGN PATENT DOCUMENTS

| JP | H9-6646 A | 1/1997 |
| JP | H10-83311 A | 3/1998 |

(Continued)

OTHER PUBLICATIONS

Durfina et al; Detection and Recovery of Functions and Their Arguments in a Retargetable Decompiler;10 pages, 2012 (Year: 2012).*

(Continued)

*Primary Examiner* — Wei Y Zhen
*Assistant Examiner* — Brahim Bourzik
(74) *Attorney, Agent, or Firm* — HEA Law PLLC

(57) ABSTRACT

Providing an instruction-set simulator and a method for generating such simulator that is capable or guaranteeing the full restoration of source program file from the binary executable program, in which the generated source program is easy to analyze, and the simulation speed is considerably fast.

13 Claims, 46 Drawing Sheets

(56) References Cited

U.S. PATENT DOCUMENTS

| | | | |
|---|---|---|---|
| 2007/0276646 A1* | 11/2007 | Dutt | G06F 9/45504 703/22 |
| 2010/0274755 A1* | 10/2010 | Stewart | G06F 8/75 706/54 |
| 2012/0233601 A1* | 9/2012 | Gounares | G06F 8/443 717/143 |
| 2018/0211046 A1* | 7/2018 | Muttik | G06F 21/577 |

FOREIGN PATENT DOCUMENTS

| | | |
|---|---|---|
| JP | H11-24940 A | 1/1999 |
| JP | 2001515240 A | 9/2001 |

OTHER PUBLICATIONS

Kroustek et al; Preprocessing of Binary Executable FilesTowards Retargetable Decompilation; 6 pages (Year: 2013).*

"Bowen et al);"From Programs to Object Code and Back Again Using Logic Programming:Compilation and De-compilation";" Sep. 10, 1991;"31 pagesS"; (Year: 1991).*

Michael James Van Emmerik, Static Single Assignment for Decompilation, submitted Mar. 3, 2007, Doctor of Philosophy at the university of Queensland. Published Jan. 2007.

Doug Burger et al, The SimpleScalar Tool Set, Version 2.0, p. 13-25, Computer Sciences Department University of Wisconsin-Madison, USA. Published Jun. 1997.

Christopher Mills, Stanley C. Ahalt and Jim Fowler, Compiled Instruction Set Simulation, Aug. 1991, p. 877-889, vol. 21 (8), Department of Electrical Engineering, The Ohio State University, USA.

Jianwen Zhu, Member, IEEE, and Daniel D. Gajski, Fellow, IEEE, An Ultra-Fast Instruction Set Simulator, p. 363-373 vol. 10, No. 3, Jun. 2002.

Achim Nohl, Gunnar Braun, Oliver Schliebusch, Rainer Leupers, Heinrich Meyr et al, A Universal Technique for Fast and Flexible InstructionSet Architecture Simulation, p. 22-27, 3.1, Integrated Signal Processing Systems Templergraben 55, 52056 Aachen, Germany. Published Jun. 2002.

Mehrdad Reshad et al, Instruction Set Compiled Simulation: A Technique for Fast and Flexible Instruction Set Simulation, p. 758-763, 45.2, Architectures and Compilers for Embedded Systems (ACES) Laboratory Center for Embedded Computer Systems, University of California, Irvine, CA 92697, USA. Published Jun. 2003.

Marcus Bartholomeu et al., Optimizations for Complied Simulation Using Instruction Type Information, Institute of Computing, University of Campinas, Campinas-SO, Brazil. Published Oct. 2004.

Joseph D'Errico et al, Constructing Portable Compiled Instruction-set Simulators—An ADL-driven Approach, Department of Electrical and Computer Engineering Boston University, Boston, MA 02215, USA. Published Jul. 2006.

Sorav Bansal et al, Binary Translation Using Peephole Superoptimizers, Computer Systems Lab Stanford University. Published Dec. 2008.

English Translation of Written Opinion of the International Searching Authority for PCT/JP2016/071632 accompanied with PCT/IB/373 and dated Oct. 25, 2016.

* cited by examiner

FIG. 1

```
int prime_count = 0;              void get_primes()
int primes[MAX_COUNT];            {
void put_prime(int i)               int i;
{                                   put_prime(2);
  primes[prime_count ++] = i;       i = 3;
}                                   while(prime_count < MAX_COUNT){
                                      if(check_prime(i)){ put_prime(i);}
                                      i += 2;
                                    }
                                  }
```

FIG. 2

```
00008218 <put_prime>:
    8218:   e59f3014    ldr     r3, [pc, #20]       ; 8234
    821c:   e5932000    ldr     r2, [r3]
    8220:   e59fc010    ldr     ip, [pc, #16]       ; 8238
    8224:   e2821001    add     r1, r2, #1
    8228:   e78c0102    str     r0, [ip, r2, lsl #2]
    822c:   e5831000    str     r1, [r3]
    8230:   e12fff1e    bx      lr
    8234:   0001b308    andeq   fp, r1, r8, lsl #6
    8238:   0001b404    andeq   fp, r1, r4, lsl #8

000083c0 <get_primes>:
    83c0:   e92d4070    push    {r4, r5, r6, lr}
    83c4:   e59f505c    ldr     r5, [pc, #92]       ; 8428
    83c8:   e3a00002    mov     r0, #2
    83cc:   e3a06a7a    mov     r6, #499712         ; 0x7a000
    83d0:   ebffff90    bl      8218 <put_prime>
    83d4:   e2866f47    add     r6, r6, #284        ; 0x11c
    83d8:   e5953000    ldr     r3, [r5]
    83dc:   e2866003    add     r6, r6, #3
    83e0:   e1530006    cmp     r3, r6
    83e4:   c8bd8070    popgt   {r4, r5, r6, pc}
    83e8:   e3a04003    mov     r4, #3
    83ec:   ea000003    b       8400 <get_primes+0x40>
    83f0:   e5953000    ldr     r3, [r5]
    83f4:   e1530006    cmp     r3, r6
    83f8:   c8bd8070    popgt   {r4, r5, r6, pc}
    83fc:   e2844002    add     r4, r4, #2
    8400:   e1a00004    mov     r0, r4
    8404:   ebffff8c    bl      823c <check_prime>
    8408:   e3500000    cmp     r0, #0
    840c:   0affff7    beq     83f0 <get_primes+0x30>
    8410:   e1a00004    mov     r0, r4
    8414:   ebffff7f    bl      8218 <put_prime>
    8418:   e5953000    ldr     r3, [r5]
    841c:   e1530006    cmp     r3, r6
    8420:   daffff5    ble     83fc <get_primes+0x3c>
    8424:   e8bd8070    pop     {r4, r5, r6, pc}
    8428:   0001b308    andeq   fp, r1, r8, lsl #6
```

FIG. 3

```
typedef unsigned int U32;
U32 _my_put_prime_ (U32 r0)
{
  U32 r1=0, r2=0, r3=0, r4=0, r5=0, r6=0, r7=0, r8=0, r9=0, sl=0, fp=0;
  U32 ip=0, sp=0, lr=0, pc=0, cv=0, cc=0, cr=0, cls=0, cge=0, cle=0;

LDR(AL,0x01a, 3,15,  IMM,-1,0x00000014,0x0023,0x08218)
  LDR(AL,0x01a, 2, 3,  IMM,-1,0x00000000,0x0024,0x0821c)
  LDR(AL,0x01a,12,15,  IMM,-1,0x00000010,0x0025,0x08220)
  ADD(AL,0x020, 1, 2,  IMM,-1,0x00000001,        0x08224)
  STR(AL,0x02a, 0,12,  LSL_I, 2,            2,0x000c,0x08228)
  STR(AL,0x00a, 1, 3,  IMM,-1, 0x00000000,0x000d,0x0822c)
  _COND_(AL){ return r0;}
}
U32 _my_get_primes_ (U32 sp)
{
  U32 r0=0, r1=0, r2=0, r3=0, r4=0, r5=0, r6=0, r7=0, r8=0, r9=0, sl=0;
  U32 fp=0, ip=0, lr=0, pc=0, cv=0, cc=0, cr=0, cls=0, cge=0, cle=0;

STM(AL,0x009,13,             0x00004070,0x0015,0x083c0)
  LDR(AL,0x01a, 5,15,  IMM,-1,0x0000005c,0x0045,0x083c4)
  MOV(AL,0x020, 0, 0,  IMM,-1,0x00000002,        0x083c8)
  MOV(AL,0x020, 6, 0,  IMM,-1,0x0007a000,        0x083cc)
  _COND_(AL){ r0 = _my_put_prime_ (r0);}       /// bl 8218 <put_prime>
  ADD(AL,0x020, 6, 6,  IMM,-1,0x0000011c,       0x083d4)
  LDR(AL,0x01a, 3, 5,  IMM,-1,0x00000000,0x0046,0x083d8)
  ADD(AL,0x020, 6, 6,  IMM,-1,0x00000003,       0x083dc)
  CMP(AL,0x004, 0, 3,LSO_I, 6,          0,      0x083e0)
  LDM(GT,0x013,13,             0x00008070,0x0047,0x083e4)
  MOV(AL,0x020, 4, 0,  IMM,-1,0x00000003,       0x083e8)
  _COND_(AL){ goto L_08400;}                   /// b 8400
L_083f0:
  LDR(AL,0x01a, 3, 5,  IMM,-1,0x00000000,0x0048,0x083f0)
  CMP(AL,0x004, 0, 3,LSO_I, 6,          0,      0x083f4)
  LDM(GT,0x013,13,             0x00008070,0x0049,0x083f8)
L_083fc:
  ADD(AL,0x020, 4, 4,  IMM,-1,0x00000002,       0x083fc)
L_08400:
  MOV(AL,0x000, 0, 0,LSO_I, 4,          0,      0x08400)
  _COND_(AL){ r0 = _my_check_prime_ (r0, sp);} /// bl 823c <check_prime>
  CMP(AL,0x024, 0, 0,  IMM,-1,0x00000000,       0x08408)
  _COND_(EQ){ goto L_083f0;}                   /// beq 83f0
  MOV(AL,0x000, 0, 0,LSO_I, 4,          0,      0x08410)
  _COND_(AL){ r0 = _my_put_prime_ (r0);}       /// bl 8218 <put_prime>
  LDR(AL,0x01a, 3, 5,  IMM,-1,0x00000000,0x004a,0x08418)
  CMP(AL,0x004, 0, 3,LSO_I, 6,          0,      0x0841c)
  _COND_(LE){ goto L_083fc;}                   /// ble 83fc
  LDM(AL,0x013,13,             0x00008070,0x004b,0x08424)
}
```

FIG. 4 A

```
U32 _my_get_primes_ (U32 sp)
{
  U32 r0=0, r1=0, r2=0, r3=0, r4=0, r5=0, r6=0, r7=0, r8=0, r9=0, sl=0;
  U32 fp=0, ip=0, lr=0, pc=0, cv=0, cc=0, cz=0, cn=0, cls=0, cge=0, cle=0;

STM(AL,0x009,13,       0x00004070,0x0015,0x083c0)
  LDR(AL,0x01a, 5,15, IMM,-1,0x0000005c,0x0045,0x083c4)
  MOV(AL,0x020, 0, 0, IMM,-1,0x00000002,    0x083c8)
  MOV(AL,0x020, 6, 0, IMM,-1,0x0007a000,    0x083cc)
  _COND_(AL){ r0 = _my_put_prime_ (r0);}           /// bl 8218 <put_prime>
  012B15D0 A1 4C 66 32 01     mov      eax,dword ptr ds:[0132664Ch]
  012B15D5 8B 88 18 E4 31 01  mov      ecx,dword ptr _arm (131E418h)[eax]
  012B15DB 8B 15 50 66 32 01  mov      edx,dword ptr ds:[1326650h]
  012B15E1 53                 push     ebx
  012B15E2 57                 push     edi
  012B15E3 8B 3D 40 68 32 01  mov      edi,dword ptr ds:[1326840h]
  012B15E9 C7 84 8A 18 E4 31 01 02 00 00 00 mov  dword ptr _arm (131E418h)[edx+ecx*4],2
  012B15F4 41                 inc      ecx
  ADD(AL,0x020, 6, 6, IMM,-1,0x0000011c,    0x083d4)
  LDR(AL,0x01a, 3, 5, IMM,-1,0x00000000,0x0046,0x083d8)
  ADD(AL,0x020, 6, 6, IMM,-1,0x00000003,    0x083dc)
  CMP(AL,0x004, 0, 3,LS0_I, 6,   0,   0x083e0)
  012B15F5 BB 1F A1 07 00     mov      ebx,7A11Fh
  012B15FA 89 88 18 E4 31 01  mov      dword ptr _arm (131E418h)[eax],ecx
  012B1600 39 9F 18 E4 31 01  cmp      dword ptr _arm (131E418h)[edi],ebx
  LDM(GT,0x013,13,       0x00008070,0x0047,0x083e4)
  012B1606 7E 08             jle      _my_get_primes_+40h (12B1610h)
  012B1608 5F                pop      edi
  012B1609 B8 02 00 00 00    mov      eax,2
  012B160E 5B                pop      ebx
}
  012B160F C3                ret
  012B1610 56                push     esi
  MOV(AL,0x020, 4, 0, IMM,-1,0x00000003,    0x083e8)
  012B1611 BE 03 00 00 00    mov      esi,3
L_08400:
  MOV(AL,0x000, 0, 0,LS0_I, 4,   0,   0x08400)
  _COND_(AL){ r0 = _my_check_prime_ (r0, sp);}
  012B1616 8B C6             mov      eax,esi
  012B1618 E8 33 FE FF FF    call     _my_check_prime_ (12B1450h)
  CMP(AL,0x024, 0, 0, IMM,-1,0x00000000,   0x08408)
  _COND_(EQ){ goto L_083f0;}         /// beq 83f0
  012B161D 85 C0             test     eax,eax
  012B161F 75 0C             jne      L_083f0+0Ch (12B162Dh)
  _COND_(AL){ goto L_08400;}         /// b 8400
L_083f0:
  LDR(AL,0x01a, 3, 5, IMM,-1,0x00000000,0x0048,0x083f0)
  CMP(AL,0x004, 0, 3,LS0_I, 6,   0,   0x083f4)
  012B1621 39 9F 18 E4 31 01 cmp      dword ptr _arm (131E418h)[edi],ebx
  LDM(GT,0x013,13,       0x00008070,0x0049,0x083f8)
  012B1627 7E 2B             jle      L_083fc (12B1654h)
  012B1629 5E                pop      esi
  012B162A 5F                pop      edi
  012B162B 5B                pop      ebx
}
  012B162C C3                ret
```

FIG. 4 B

```
MOV(AL,0x000, 0, 0,LS0_I, 4,    0,    0x08410)
_COND_{AL}{ r0 = _my_put_prime_ (r0);}            /// bl 8218 <put_prime>
012B162D A1 4C 66 32 01    mov    eax,dword ptr ds:[0132664Ch]
012B1632 8B 88 18 E4 31 01 mov    ecx,dword ptr _arm (131E418h)[eax]
012B1638 8B 15 50 66 32 01 mov    edx,dword ptr ds:[1326650h]
012B163E 89 B4 8A 18 E4 31 01 mov    dword ptr _arm (131E418h)[edx+ecx*4],esi
012B1645 41                inc    ecx
012B1646 89 88 18 E4 31 01 mov    dword ptr _arm (131E418h)[eax],ecx
LDR(AL,0x01a, 3, 5, IMM,-1,0x00000000,0x004a,0x08418)
CMP(AL,0x004, 0, 3,LS0_I, 6,    0,    0x0841c)
012B164C 39 9F 18 E4 31 01 cmp    dword ptr _arm (131E418h)[edi],ebx
_COND_{LE}{ goto L_083fc;}            /// ble 83fc
012B1652 7F 05             jg     L_083fc+5 (12B1659h)
L_083fc:
ADD(AL,0x020, 4, 4, IMM,-1,0x00000002,    0x083fc)
012B1654 83 C6 02           add    esi,2
012B1657 EB BD              jmp    L_08400 (12B1616h)
LDM(AL,0x013,13,    0x00008070,0x004b,0x08424)
012B1659 8B C6              mov    eax,esi
012B165B 5E                 pop    esi
012B165C 5F                 pop    edi
012B165D 5B                 pop    ebx
}
012B165E C3                 ret
```

FIG. 8

```
Sample C program 1
typedef int (*func_pointer)(int);

int f0(int n){ return n + 1;}
int f1(int n){ return 5 / n + 1;}
func_pointer ftab[2] = {f0, f1};
int ff1(int n){ return n << 3;} int jump_test(int n)
{
    func_pointer f;
    switch(n){
        case 3:      f = ftab[1];    break;
        case 8:      f = ftab[1];    break;
        case 5:      f = ftab[0];    break;
        case 7:      f = ftab[0];    break;
        case 6:      f = ff1;        break;
        break;
        default:     return 0;
    }
    return f(n) + 1;
}
```

FIG. 10

```
00008340 <jump_test>:
    8340:   e2403003    sub     r3, r0, #3
    8344:   e52de004    push    {lr}
    8348:   e3530005    cmp     r3, #5
    834c:   979ff103    ldrls   pc, [pc, r3, lsl #2]   (Conditional data-dependent branch)
    8350:   ea000011    b       839c                   (Unconditional branch)
    8354:   00008384    andeq   r8, r0, r4, lsl #7
    8358:   0000839c    muleq   r0, ip, r3
    835c:   0000836c    andeq   r8, r0, ip, ror #6
    8360:   000083a4    andeq   r8, r0, r4, lsr #7
    8364:   0000836c    andeq   r8, r0, ip, ror #6
    8368:   00008384    andeq   r8, r0, r4, lsl #7
    836c:   e59f3044    ldr     r3, [pc, #68]
    8370:   e5933000    ldr     r3, [r3]
    8374:   e1a0e00f    mov     lr, pc                 (lr ← 0x8374 + 8)
    8378:   e12fff13    bx      r3                     (Data-dependent subroutine-call)
    837c:   e2800001    add     r0, r0, #1
    8380:   e49df004    pop     {pc}                   (Return)
    8384:   e59f302c    ldr     r3, [pc, #44]
    8388:   e5933004    ldr     r3, [r3, #4]
    838c:   e1a0e00f    mov     lr, pc                 (lr ← 0x838c + 8)
    8390:   e12fff13    bx      r3                     (Data-dependent subroutine-call)
    8394:   e2800001    add     r0, r0, #1
    8398:   e49df004    pop     {pc}                   (Return)
    839c:   e3a00000    mov     r0, #0
    83a0:   e49df004    pop     {pc}                   (Return)
    83a4:   e59f3010    ldr     r3, [pc, #16]
    83a8:   e1a0e00f    mov     lr, pc                 (lr ← 0x83a8 + 8)
    83ac:   e12fff13    bx      r3                     (Data-dependent subroutine-call)
    83b0:   e2800001    add     r0, r0, #1
    83b4:   e49df004    pop     {pc}                   (Return)
    83b8:   0001a8e0    andeq   sl, r1, r0, ror #17
    83bc:   00008238    andeq   r8, r0, r8, lsr r2
```

FIG. 11

```
0000000000400560 <jump_test>:
  400560:  8d 47 fd                  lea     0xfffffffffffffffd(%rdi),%eax
  400563:  48 83 ec 08               sub     $0x8,%rsp
  400567:  83 f8 05                  cmp     $0x5,%eax
  40056a:  77 09                     ja      400575        (Conditional branch)
  40056c:  89 c0                     mov     %eax,%eax
  40056e:  ff 24 c5 38 07 40 00      jmpq    *0x400738(,%rax,8)  (Data-dependent branch)
  400575:  31 c0                     xor     %eax,%eax
  400577:  48 83 c4 08               add     $0x8,%rsp
  40057b:  c3                        retq                  (Return)
  40057c:  0f 1f 40 00               nopl    0x0(%rax)
  400580:  48 8b 05 99 05 20 00      mov     2098585(%rip),%rax  # 600b20 <ftab>
  400587:  ff d0                     callq   *%rax  (Data-dependent subroutine-call)
  400589:  48 83 c4 08               add     $0x8,%rsp
  40058d:  83 c0 01                  add     $0x1,%eax
  400590:  c3                        retq                  (Return)
  400591:  48 8b 05 90 05 20 00      mov     2098576(%rip),%rax # 600b28 <ftab+0x8>
  400598:  eb ed                     jmp     400587        (Unconditional branch)
  40059a:  b8 40 05 40 00            mov     $0x400540,%eax
  40059f:  eb e6                     jmp     400587        (Unconditional branch)
  4005a1:  0f 1f 80 00 00 00 00      nopl    0x0(%rax)
  4005a8:  0f 1f 84 00 00 00 00 00   nopl    0x0(%rax,%rax,1)
  4005af:  00

```
typedef unsigned int      U32;
typedef signed int        S32;
typedef unsigned short    U16;
typedef signed short      S16;
typedef unsigned char     U8;
typedef signed char       S8;

/// CPU resource data structure
typedef struct
{
        char  _mem[MEM_SIZE];
        U32   r[16];          // r[13] → sp
                              // r[14] → lr
                              // r[15] → pc
        U32   cr, cc, cv, cls, cge, cle;
} ARMv5;
extern ARMv5 arm;
```

FIG. 1 4

```
#define _r_(n)          arm.r[n]
#define _R_             arm.cr
#define _C_             arm.cc
#define _V_             arm.cv
#define _LS_            arm.cls
#define _GE_            arm.cge
define _LE_            arm.cle define _m8_(n)     ¥
         (*(U8*)(&arm._mem[n]))
#define _m16_(n)    ¥
         (*(U16*)(&arm._mem[n]))
#define _m32_(n)    ¥
         (*(U32*)(&arm._mem[n]))

#define _COND_AL_       (1)
#define _COND_EQ_       (!_R_)
#define _COND_NE_       (_R_ != 0)
#define _COND_CS_       (_C_ != 0)
#define _COND_CC_       (!_C_)
#define _COND_MI_       (((S32)_R_) < 0)
#define _COND_PL_       (((S32)_R_) >= 0)
#define _COND_VS_       (((S32)_V_) < 0)
#define _COND_VC_       (((S32)_V_) >= 0)
#define _COND_HI_       (!_LS_)
#define _COND_LS_       (_LS_ != 0)
#define _COND_GE_       (_GE_ != 0)
#define _COND_LT_       (!_GE_)
#define _COND_GT_       (!_LE_)
#define _COND_LE_       (_LE_ != 0)
#define _COND_(c)       if _COND_##c##_
```

FIG. 15

```
00008340 <jump_test>:
  8340:      e2403003 sub      r3, r0, #3
  8344:      e52de004 push     {lr}
  8348:      e3530005 cmp      r3, #5
/// <omitted>
  8380:      e49df004 pop      {pc}                    (Return)
```

FIG. 16

```
   SUB(AL,0x020, 3, 0,   IMM,-1,0x00000003, 0x08340)
   STR(AL,0x009,14,13,   IMM,-1,0x00000004, 0x08344)
   CMP(AL,0x024, 0, 3,   IMM,-1,0x00000005, 0x08348)
/// <omitted>
   LDR(AL,0x012,15,13,   IMM,-1,0x00000004, 0x08380)   /// (Return)
```

FIG. 17

```
#define SUB(c, v, rd, rn, sh, rm, val, pc)    _SUB_(1, 0, 0, c, v, rd, rn, sh, rm, val)
#define CMP(c, v, rd, rn, sh, rm, val, pc)    _SUB_(0, 0, 0, c, v, rd, rn, sh, rm, val)
```

FIG. 18

```
#define _SUB_(w_rd, cin, swap_op, c, v, rd, rn, sh, rm, val)                        ¥
_COND_(c){ U32 op1, op2, res;                                                       ¥
   if(swap_op)  { op2 = _r_(rn); op1 = sh(rm, val);}                                ¥
   else         { op1 = _r_(rn); op2 = sh(rm, val);}                                ¥
   res = op1 - op2 - cin;                                                           ¥
   if(_fS_(v))  {                                                                   ¥
        _R_ = (res);                                                                ¥
        _C_ = (cin) ? (op1 > op2) : (op1 >= op2);                                   ¥
        _V_ = ((op1 ^ op2) & (op1 ^ res));                                          ¥
        _LS_ = (cin) ? (op1 < op2) : (op1 <= op2);                                  ¥
        _GE_ = (cin) ? (((S32)op1) > ((S32)op2)) : (((S32)op1) >= ((S32)op2));      ¥
        _LE_ = (cin) ? (((S32)op1) < ((S32)op2)) : (((S32)op1) <= ((S32)op2));      ¥
   }                                                                                ¥
   if(w_rd)     { _r_(rd) = res;}                                                   ¥
}
```

FIG. 19

```
#define IMM(rm, val)                    (val)

#define _fS_(v)                          ((v >> 2) & 1)
//The following is accessed from STR macro
#define _fB_(v)                          ((v >> 8) & 1)
#define _fH_(v)                          ((v >> 6) & 1)
#define _fP_(v)                          ((v >> 3) & 1)
#define _fU_(v)                          ((v >> 1) & 1)
#define _fW_(v)                          ((v >> 0) & 1)
```

FIG. 2 0

```
#define STR(c, v, rd, rn, sh, rm, val, pc)                              ¥
_COND_(c){ U32 ofs, rn2, addr, d;                                       ¥
  _ADDR_(v, rn, sh, rm, val, pc)                                        ¥
  d = (rd == 15) ? pc + 12 : _r_(rd);                                   ¥
  if(_fB_(v))         { _m8_(addr)  = (U8)  (d & 0xff);}                ¥
  else if(_fH_(v))    { _m16_(addr) = (U16) (d & 0xffff);}              ¥
  else                { _m32_(addr) = d;}                               ¥
  D_CACHE_SIM(addr, 0)                                                  ¥
}
```

FIG. 21

```
#define _ADDR_(v, rn, sh, rm, val, pc)                                    ¥
    if(rn == 15)       { _r_(15) = pc + 8;}                                ¥
    ofs = sh(rm, val);                                                     ¥
    if(_fU_(v))        { rn2 = _r_(rn) + ofs;}                             ¥
    else               { rn2 = _r_(rn) - ofs;}                             ¥
    addr = (_fP_(v)) ? rn2 : _r_(rn);                                      ¥
    if(_fW_(v) || !_fP_(v))   { _r_(rn) = rn2;} if defined(ENABLE_CACHE_MODEL)
void D_Cache_Sim(unsigned int addr, int isRead);
#define D_CACHE_SIM(addr, isRead)     D_Cache_Sim(addr, isRead);
#else
#define D_CACHE_SIM(addr, isRead)     //Replaced by an "empty string"
#endif
```

FIG. 2 2

```
#define LDR(c, v, rd, rn, sh, rm, val, pc)                                    ¥
_COND_(c){ U32 ofs, rn2, addr;                                                ¥
  _ADDR_(v, rn, sh, rm, val, pc)                                              ¥
  if(_fS_(v))        {                                                        ¥
         if(_fH_(v))      { _r_(rd) = (U32)((S16)_m16_(addr));}               ¥
         else             { _r_(rd) = (U32)((S8)_m8_(addr));}                 ¥
  }                                                                           ¥
  else{                                                                       ¥
         if(_fB_(v))      { _r_(rd) = _m8_(addr); }                           ¥
         else if(_fH_(v)) { _r_(rd) = _m16_(addr);}                           ¥
         else             { _r_(rd) = _m32_(addr);}                           ¥
  }                                                                           ¥
  D_CACHE_SIM(addr, 1)                                                        ¥
  if(rd == 15){ return;}                                                      ¥
}
```

FIG. 2 3

```
/// SUB(AL,0x020, 3, 0, IMM,-1,0x00000003,   0x08340)
if (1){
 U32 op1, op2, res;
 if(0) { op2 = arm.r[0]; op1 = (0x00000003);}
 else  { op1 = arm.r[0]; op2 = (0x00000003);}
 res = op1 - op2 - 0;
 if(((0x020 >> 2) & 1)) {
        arm.cr = (res);
        arm.cc = (0) ? (op1 > op2) : (op1 >= op2);
        arm.cv = ((op1 ^ op2) & (op1 ^ res));
        arm.cls = (0) ? (op1 < op2) : (op1 <= op2);
        arm.cge = (0) ? (((S32)op1) > ((S32)op2)) : (((S32)op1) >= ((S32)op2));
        arm.cle = (0) ? (((S32)op1) < ((S32)op2)) : (((S32)op1) <= ((S32)op2));
 }
 if(1) { arm.r[3] = res;}
}
/// STR(AL,0x009,14,13, IMM,-1,0x00000004,   0x08344)
if (1){
 U32 ofs, rn2, addr, d;
 if(13 == 15) { arm.r[15] = 0x08344 + 8;}
 ofs = (0x00000004);
 if(((0x009 >> 1) & 1))     { rn2 = arm.r[13] + ofs;}
 else                       { rn2 = arm.r[13] - ofs;}
 addr = (((0x009 >> 3) & 1)) ? rn2 : arm.r[13];
 if(((0x009 >> 0) & 1) || !((0x009 >> 3) & 1)) { arm.r[13] = rn2;}
 d = (14 == 15) ? 0x08344 + 12 : arm.r[14];
 if(((0x009 >> 8) & 1))     { (*(U8*) ((&arm._mem[addr]))) = (U8) (d & 0xff);}
 else if(((0x009 >> 6) & 1)){ (*(U16*)((&arm._mem[addr]))) = (U16) (d & 0xffff);}
 else                       { (*(U32*)((&arm._mem[addr]))) = d;}
}
/// CMP(AL,0x024, 0, 3, IMM,-1,0x00000005,   0x08348)
if (1){
 U32 op1, op2, res;
 if(0) { op2 = arm.r[3]; op1 = (0x00000005);}
 else  { op1 = arm.r[3]; op2 = (0x00000005);}
 res = op1 - op2 - 0;
 if(((0x024 >> 2) & 1)) {
        arm.cr = (res);
        arm.cc = (0) ? (op1 > op2) : (op1 >= op2);
        arm.cv = ((op1 ^ op2) & (op1 ^ res));
        arm.cls = (0) ? (op1 < op2) : (op1 <= op2);
        arm.cge = (0) ? (((S32)op1) > ((S32)op2)) : (((S32)op1) >= ((S32)op2));
        arm.cle = (0) ? (((S32)op1) < ((S32)op2)) : (((S32)op1) <= ((S32)op2));
 }
 if(0) { arm.r[0] = res;}
}
///<省略>
/// LDR(AL,0x012,15,13, IMM,-1,0x00000004, 0x08380)
if (1){
 U32 ofs, rn2, addr;
 if(13 == 15) { arm.r[15] = 0x08380 + 8;}
 ofs = (0x00000004);
 if(((0x012 >> 1) & 1))         { rn2 = arm.r[13] + ofs;}
 else                           { rn2 = arm.r[13] - ofs;}
 addr = (((0x012 >> 3) & 1)) ? rn2 : arm.r[13];
 if(((0x012 >> 0) & 1) || !((0x012 >> 3) & 1)) { arm.r[13] = rn2;}
 if(((0x012 >> 2) & 1)) {
        if(((0x012>> 6) & 1)) { arm.r[15] = (U32)((S16)(*(U16*)((&arm._mem[addr]))));}
        else                  { arm.r[15] = (U32)((S8)(*(U8*)((&arm._mem[addr]))));}
 }
 else{
        if(((0x012 >> 8) & 1))      { arm.r[15] = (*(U8*)((&arm._mem[addr])));}
        else if(((0x012 >> 6) & 1)) { arm.r[15] = (*(U16*)((&arm._mem[addr])));}
        else                        { arm.r[15] = (*(U32*)((&arm._mem[addr])));}
 }
 if(15 == 15){ return;}
}
```

FIG. 25

```
void _my_jump_test(){
            /// Machine instruction program source description
}
```

FIG. 26

```
8350:      ea000011 b  839c              (Unconditional branch)
```

FIG. 27

```
_COND_(AL){goto L_0839c;}/// converted into if(1){ goto L_0839c;}
```

FIG. 28

```
8454:    ebffffb9   bl   8340 <jump_test>  (call for jump_test)
```

FIG. 29

```
_COND_(AL){ _my_jump_test();}///converted into if(1){_my_jump_test();}
```

FIG. 30

```
834c:   979ff103 ldrls    pc, [pc, r3, lsl #2]   (Conditional data-dependent branch)
8350:   ea000011 b        839c                   (Unconditional branch)
```

FIG. 31

```
_COND_(LS){
  switch(_r_(3)){
       case 1: goto L_0839c;
       case 2: goto L_0836c;
       case 3: goto L_083a4;
       case 4: goto L_0836c;
       default: goto L_08384;
  }
}
_COND_(AL){goto L_0839c;}///converted into if(1){ goto L_0839c;}
```

FIG. 32

```
83a8:    e1a0e00f mov    lr, pc    (lr ← 0x83a8 + 8)
83ac:    e12fff13 bx     r3        (Data-dependent subroutine-call)
```

FIG. 33

```
_COND_(AL){ _FP_INFO_ * fpi = _GET_FFI_( r_(3)); fpi->func();}
```

FIG. 34

```
void _my_jump_test_ ()
{
   SUB(AL,0x020, 3, 0,  IMM,-1,0x00000003, 0x08340)
   STR(AL,0x009,14,13,  IMM,-1,0x00000004, 0x08344)
   CMP(AL,0x024, 0, 3,  IMM,-1,0x00000005, 0x08348)
   _COND_(LS){
          switch(_r_(3)){
          case 1: goto L_0839c;
          case 2: goto L_0836c;
          case 3: goto L_083a4;
          case 4: goto L_0836c;
          default: goto L_08384;
          }
   }
   _COND_(AL){ goto L_0839c;}
L_0836c:
   LDR(AL,0x01a, 3,15,  IMM,-1,0x00000044, 0x0836c)
   LDR(AL,0x01a, 3, 3,  IMM,-1,0x00000000, 0x08370)
   MOV(AL,0x000,14, 0,LSO_I,15,     0, 0x08374)
   _COND_(AL){ _FP_INFO_ * fpi = _GET_FPI_(_r_(3)); fpi->func();}
   ADD(AL,0x020, 0, 0,  IMM,-1,0x00000001, 0x0837c)
   LDR(AL,0x012,15,13,  IMM,-1,0x00000004, 0x08380) /// Return instruction
L_08384:
   LDR(AL,0x01a, 3,15,  IMM,-1,0x0000002c, 0x08384)
   LDR(AL,0x01a, 3, 3,  IMM,-1,0x00000004, 0x08388)
   MOV(AL,0x000,14, 0,LSO_I,15,     0, 0x0838c)
   _COND_(AL){ _FP_INFO_ * fpi = _GET_FPI_(_r_(3)); fpi->func();}
   ADD(AL,0x020, 0, 0,  IMM,-1,0x00000001, 0x08394)
   LDR(AL,0x012,15,13,  IMM,-1,0x00000004, 0x08398) /// Return instruction
L_0839c:
   MOV(AL,0x020, 0, 0,  IMM,-1,0x00000000, 0x0839c)
   LDR(AL,0x012,15,13,  IMM,-1,0x00000004, 0x083a0) /// Return instruction
L_083a4:
   LDR(AL,0x01a, 3,15,  IMM,-1,0x00000010, 0x083a4)
   MOV(AL,0x000,14, 0,LSO_I,15,     0, 0x083a8)
   _COND_(AL){ _FP_INFO_ * fpi = _GET_FPI_(_r_(3)); fpi->func();}
   ADD(AL,0x020, 0, 0,  IMM,-1,0x00000001, 0x083b0)
   LDR(AL,0x012,15,13,  IMM,-1,0x00000004, 0x083b4) /// Return instruction
}
```

FIG. 35

```
typedef void (* _FP_TYPE_)();  /// Function-pointer data type
typedef struct ST_FP_INFO_ {
   unsigned int addr;   /// Symbol address
   _FP_TYPE_    func;   /// Subroutine address for the symbol
} _FP_INFO_ ;
```

FIG. 36

```
define _FP_SIZE_    6 /// Symbol information count stored in symbol information table _FP_INFO_ fp_info_array[_FP_SIZE_] = {
        {0x8218, _my_f0},
        {0x8220, _my_f1},
        {0x8238, _my_ff1},
        {0x8338, _my_ff2},
        {0x8340, _my_jump_test},
        {0x8448, _my_main},
};
```

FIG. 37

```
_FP_INFO_  _GET_FPI_(unsigned int addr)
{
  int i;
  _FP_INFO_ * fpi;
  for(i = 0; i < _FP_SIZE_ ; i ++){
        if(fp_info_array[i].addr == addr){
            return &fp_info_array[i]; /// Pointer of _FP_INFO_ structure for address
        }
  }
  return 0; /// Return 0 when thre is no subroutine for address
}
```

FIG. 38

```
void install_mem()
{
    /// <Omitted: initialization source program of other section>
    ////      (1260c ~ 127e7) ; .rodata
    {
        static unsigned char data[476] = {
        0x25, 0x64, 0x20, 0x2d, 0x3e, 0x20, 0x25, 0x64,
        0x0a, 0x00, 0x00, 0x00, 0x24, 0xa9, 0x01, 0x00,
        ///       <Omitted>
        };
        memcpy(&arm_mem[0x1260c], data, 476);
    }
    /// <Omitted: initialization source program of other section>
}
```

FIG. 39

```
int main()
{
    install_mem();  /// Memory initialization
    my__mainCRTStartup();
    return 0;
}
```

FIG. 40

```
int main(int argc, char * argv[])
{
    install_mem();  /// Memory initialization
    install_main_param(arg, argv);
    my_main();
    return _r_(0);  /// return value of main function: stored in arm.r[0]
}
```

FIG. 41

```
void install_mem_param(int argc, char * argv[])
{
    int i, str_size = 0;
    int str_addr, p_str_addr;
    for(i = 0; i < argc; i ++){ str_size += strlen(argv[i]) + 1;}
    str_addr = MEM_SIZE - str_size;  /// Allocation of argv string data section
    p_str_addr = str_addr - argc * 4;  ///Allocation of argv string pointer data section
    _r_(0) = argc;  ///First argument (argc)
    _r_(1) = p_str_addr;  ///main Second argument (argv)
    _r_(13) = p_str_addr;  /// Set stack pointer
    for(i = 0; i < argc; i ++){
        int len = strlen(argv[i]) + 1;
        memcpy(&arm_mem[str_addr], argv[i], len);  /// argv string data copy
        m32_(p_str_addr) = str_addr;  ///argv sring address data copy
        str_addr += len;
        p_str_addr += 4;
    }
}
```

FIG. 44

```
00008340 <jump_test>:
  8340:e2403003   sub     r3, r0, #3              I(0), O(3)
  8344:e52de004   push    {lr}                    I(13,14), O(13)
  8348:e3530005   cmp     r3, #5                  I(3), O(16)
  834c:979ff103   ldrls   pc, [pc, r3, lsl #2]    I(3,16), O()
  /// Branch target: { 0x8384, 0x839c, 0x836c, 0x83a4 }
  8350:ea000011   b       839c                    I(), O()
/// 8354 - 8368: Jump table section
  836c:e59f3044   ldr     r3, [pc, #68]           I(), O(3)
  8370:e5933000   ldr     r3, [r3]                I(3), O(3)
  8374:e1a0e00f   mov     lr, pc                  I(), O(14)
  8378:e12fff13   bx      r3                      I(3), O()
  837c:e2800001   add     r0, r0, #1              I(0), O(0)
  8380:e49df004   pop     {pc}                    I(13), O(13)
  8384:e59f302c   ldr     r3, [pc, #44]           I(), O(3)
  8388:e5933004   ldr     r3, [r3, #4]            I(3), O(3)
  838c:e1a0e00f   mov     lr, pc                  I(), O(14)
  8390:e12fff13   bx      r3                      I(3), O()
  8394:e2800001   add     r0, r0, #1              I(0), O(0)
  8398:e49df004   pop     {pc}                    I(13), O(13)
  839c:e3a00000   mov     r0, #0                  I(), O(0)
  83a0:e49df004   pop     {pc}                    I(13), O(13)
  83a4:e59f3010   ldr     r3, [pc, #16]           I(), O(3)
  83a8:e1a0e00f   mov     lr, pc                  I(), O(14)
  83ac:e12fff13   bx      r3                      I(3), O()
  83b0:e2800001   add     r0, r0, #1              I(0), O(0)
  83b4:e49df004   pop     {pc}                    I(13), O(13)
```

FIG. 46

```
#define _r_(n)   r##n
define r13      sp // alias name of r13 is made as sp define _R_      cr
define _C_      cc
#define _V_      cv
#define _LS_     cls
#define _GE_     cge
#define _LE_     cle
```

FIG. 47

```
U32 _my_jump_test(U32 sp, U32 r0){
    U32 r1, r2, r3, r4, r5, r6, r7, r8;      // r0 is excluded since it is an argument
    U32 r9, r10, r11, r12, r14, r15;         // sp(r13) is excluded since it is an argument
    U32 cr, cc, cv, cis, cge, cle;

// Machine instruction program source description
}
```

FIG. 48

```
_COND_(AL){ r0 = _my_jump_test(sp, r0);}
```

FIG. 49

```
typedef U32 (* _FP_TYPE_)(U32 sp, U32 r0);   /// Function-pointer data type
```

FIG. 50

```
_COND_(AL){ _FP_INFO_ * fpi = _GET_FPI_(_r_(3)); r0 = fpi->func(sp, r0);}
```

FIG. 52

```
__FP_INFO__  __GET_FPI__(unsigned int addr)
{
  int i;
  __FP_INFO__ * fpi;
  for(i = 0; i < __FP_SIZE__; i ++){
      if(fp_info_array[i].addr == addr){
          return &fp_info_array[i];   /// Pointer of __FP_INFO__ structure for addr
      }
  }
  printf("Unregistered symbol at address (0x%08x), called via __GET_FPI__!¥n", addr);
      /// Additionally write "addr" to "symbol candidate address list" file
      /// Embed the source program to (append) in this part
  exit(-1);  /// forcibly terminate simulator
  return 0;  /// Return 0 when there is no subroutinefor addr
}
```

FIG. 53

```
#define FETCH(a) case a:
#define SAVESTATE(a) PC = a;SP = S - M;FP = F - M; AC = A;
#define ADD(a) FETCH(a); A += *S++;
#define ADI(a, n) FETCH(a); A += n;
#define CBLS(a, n) FETCH(a); if (*S++ <= A){P = n; break;}
#define HALT(a) FETCH(a); SAVESTATE(a); return 1;
#define JSR(a, n) FETCH(a); *--S = a + 2; P = n; break;
#define LAI(a, n) FETCH(a); A = n;
#define LAR(a, n) FETCH(a); A = F[n];
#define LDI(a, n) FETCH(a); *--S = A; A = n;
#define LDR(a, n) FETCH(a); *--S = A; A = F[n];
#define LDS(a, n) FETCH(a); S = M + (n);
#define LINK(a, n) FETCH(a); *--S = F - M; F = S;S += n;
#define PA(a) FETCH(a); *--S = A;
#define PI(a, n) FETCH(a); *--S = n;
#define SAR(a, n) FETCH(a); F[n] = A;
#define UNLK(a, n) FETCH(a); S = F; F = M + *S++; P = *S++; S += n; break;
```

FIG. 54

```
int execute(M)
register UL * M;
{
  register UL * S = M, *F = H,
           A = 0, P = START;
  for (;;) /* ever */
    switch (P) {
    LDS (START, START);
    JSR (START + 2, START + 5);
    HALT(START + 4);
    LINK(START + 5, -2);
    LAI (START + 7, 1);
    SAR (START+ 9, -1);
    PI (START + 11, 24);
    JSR (START + 13, START + 31);
    SAR (START + 15, -2);
    LAR (START + 17, -1);
    ADI (START + 19, 1);
    SAR (START + 21, -1);
    LDI (START + 23, 100);
    CBLS(START + 25, START + 11)
    LAR (START + 27, -2);
    UNLK(START + 29, 0);
    LINK(START+ 31, 0);
    LAR (START + 33, 2);
    LDI (START + 35, 2);
    CBLS(START + 37, START + 56);
    LAR (START + 39, 2);
    ADI (START + 41, -1);
    PA (START + 43);
    JSR (START + 44, START + 31);
    LDR (START+ 46, 2);
    ADI (START + 48, -2);
    PA (START + 50);
    JSR (START + 51, START + 31);
    ADD (START + 53);
    UNLK(START + 54, 1);
    LAI (START + 56, 1);
    UNLK(START + 58, 1);
    default: SAVESTATE(P);
       return 0;
    }
}
```

FIG. 55A

```
void Region3() {
  while (1) {
    switch(ac_pc) {

...

case 0x1954: // be PC-348
      ac_behavior_instruction(4);
      ac_behavior_Type_F2B(0, 0, 1, 2, -348);
      ac_behavior_be(0, 0, 1, 2, -348);
      ac_instr_counter++;
      break;

case 0x1958: // andcc %28, 4, 0
      ac_behavior_instruction(4);
      ac_behavior_Type_F3B(2, 0, 17, 28, 1, 4);
      ac_behavior_andcc_imm(2, 0, 17, 28, 1, 4);
      ac_instr_counter++;
      break;

...

default:
      if ((ac_pc >= 4096) && (ac_pc < 6144)) {
        AC_ERROR(... non-decoded memory location ...);
        ac_stop(EXIT_FAILURE);
      }
      return;
    }
  }
}
```

One of the region functions automatically generated for SPARC V8 architecture

FIG. 55B

```
void Execute(int argc, char *argv[]) { model_syscall.set_prog_args(argc, argv);

while (!ac_stop_flag) {
    switch(ac_pc >> 11) { case 0: Region0(); break;

case 1: Region1(); break;

...

case 14: Region14(); break;

default:
      AC_ERROR(... print error and debug info ...);
      ac_stop(EXIT_FAILURE);
      break;
    }
  }
}
```

The main simulation routine

INSTRUCTION-SET SIMULATOR AND ITS SIMULATOR GENERATION METHOD

TECHNICAL FIELD

The present invention relates to an instruction-set simulator and its simulator generation method in which the simulator is constructed by converting machine instructions into a source program, and then converting the source program back to machine instructions.

BACKGROUND ART

Conventionally, existing techniques related to the present invention are reverse-compiler (sometimes termed "decompiler") and instruction-set simulator. Reverse-compiler is a technique to convert a binary executable program (machine instructions), directly executed by a computer, into a source program, which a programmer writes. That is, a reverse-compiler performs the opposite conversion of a compiler which converts a source program into a binary executable program.

Development of reverse-compiler techniques began in the 1960's, where their initial use was to facilitate the conversion (porting) of programs designed for a certain platform into programs that can operate on different platforms. Thereafter, reverse-compiler techniques have been applied to restoring source programs that are accidently lost, debugging programs, detecting and analyzing virus programs, analyzing and understanding program contents, and extracting high level processing structure of the whole program.

On the other hand, instruction-set simulator is a software tool that emulates the behavior of a processor and executes the binary executable program. The objective of on instruction-set simulator is different from that of a reverse-compiler, where the objective of a reverse-compiler is the restoration of highly-readable source programs. For an instruction-set simulator, there exists three schemes, that is, interpreter scheme, static compile scheme and dynamic compile scheme as described below.

Three schemes of instruction-set simulator are described in the followings. Hereinafter, the term "host-CPU" refers to the CPU which executes the instruction-set simulator software. Interpreter scheme (Non-patent Document 3): Each machine code of the binary executable program is decoded (interpreted) one by one to emulate the CPU behavior. Simulation speed is low due the overhead of the decoding process.

Static compile scheme (Non-patent Documents 4, 5, 8, 9, 10): The entire binary executable program is altogether decoded and converted to the host-CPU's machine code instructions, and then the converted machine code instructions are executed at the host-CPU. Also, during the process of converting to the host-CPU's machine instructions, there are cases where the binary executable program is first converted into a source program such as a C program.

Dynamic compile scheme (Non-patent Documents 6, 7): As an improvement of the interpreter scheme, (instead of decoding and executing each machine instruction one by one), a sequence of (a group of) decoded host-CPU's machine instructions are first stored in the host-CPU's memory, and then these machine instructions are directly executed from the memory. This scheme avoids the overhead of repeatedly decoding the same set of instructions by storing the decoded results in the host-CPU's memory. This scheme is also called the "binary translation" from the target-CPU's machine instructions to the host-CPU's machine instructions, and requires implementing a complete instruction-set translation mechanisms that are very complex.

CITATION LIST

Non-patent Document 1: Michael Van Emmerik, "Static Single Assignment for Decompilation", PhD Thesis, The University of Queensland, 2007 (http://www.backerstreet.com/decompiler/vanEmmerik_ssa.pdf)

Non-patent Document 2: http://www.program-transformatton.org/Transform/DeCompilation Non-patent Document 3: D. Burger, T. M. Austin, "The simplescalar tool set, version 2.0", Computer Architecture News, pp. 13-25, 1997

Non-patent Document 4: C Mills. S. Ahalt, J. Fowler, "Compiled instruction set simulation", Software—Practice and Experience, 21(8), pp. 877-889, 1991

Non-patent Document 5: Jianwen Zhu. and Daniel D. Gajski. "An Ultra-Fast Instruction Set Simulator", IEEE Trans. VLSI Systems, Vol. 10, No. 3, pp. 363-373, 2002

Non-patent Document 6: A. Nohl, G. Braun, O/Schliebusch, R. Leupers, H. Meyr, A. Hoffmann, "A universal technique for fast and flexible instruction-set architecture simulation". Proceedings of DATE 2002

Non-patent Document 7: M. Reshadi, P. Mishra, N. Dutt. "Instruction Set Compiled Simulation: A Technique for Fast and Flexible Instruction Set Simulation", Proceeding of DAC 2003, pp. 758-763, 2003

Non-patent Document 8: M Bartholomeu, R. Azevedo, S. Rigo, G. Araujo, "Optimizations for compiled simulation using instruction type information", Proceedings of the 16th Symposium on Computer Architecture and High Performance Computing (SBAC-PAD'04), pp. 74-81, 2004

Non-patent Document 9: Joseph D'Errico, Wei Qin, "Constructing Portable Compiled Instruction-set Simulators— An ADL-driven Approach". Proceeding of DATE 2006. pp. 112-117, 2006

Non-patent Document 10: S. Bansal, A. Aiken. "Binary translation using peephole superoptimizers", Proceedings of OSDI'08, pp. 177-192, 2008

Non-patent Document 11; Wikipedia: Instruction Set Simulator www.wikipedia.org/wiki/, http://en.wikipedia.org/wiki/Instruction_set_simulator Non-patent Document 12: Wikipedia; Binary Translation http://en.wikipedia.org/wiki/Binary_translation

SUMMARY OF INVENTION

Technical Problem

Reverse-compilation has the following technical problems (as stated in Non-patent Document 1, P15-P28):

First, restoring data types is difficult. That is, estimating the data types of the original source program from the binary executable program is technically very difficult.

Second, analyzing the program control flows with indirect jumps (jump instructions whose target address are not directly coded in the instruction) is difficult. Specifically, instructions that assign register values to the program counter (PC) are normally used in C program's "switch" statements and calls through "function pointers". Program control flows that are data dependent (directions of program execution flow changes by register values) are very difficult to analyze.

Third, restoring function arguments and return values are difficult. That is, function argument format and return value format depend not only on the target processor's instruction-set, but also on the "calling convention" (a set of rules to define the argument format and return value format). Therefore, without the prior knowledge of the calling convention applied to the binary executable program, restoring function arguments and return values are difficult.

Fourth, source programs generated by reverse-compiler has the following two problems in terms of completeness. Non-patent Document 1, P26-P27, states that as of year 2002, the only reverse-compiler tools with significant achievements are "dec decompiler" and "REC" (Reverse Engineering Compiler).

First problem on completeness is the necessity of manual editing (as in the case of "REC"). Many existing reverse-compilers require manual editing of the produced source programs so that they can be compiled without errors. Reverse-compilers usually emphasize more on source program readability, and therefore, reverse-compilers which guarantee error-free compilation of produced source programs are very rare.

Second problem on completeness is the limitation of program complexity (as in the case of "dec"). Even if the produced source programs are guaranteed of error-free compilation, the range of programs that can be handled are limited due to the restrictions on the program complexity (of the binary executable program).

In Non-patent Document 1, SSA (static single assignment) form was used as an intermediate representation which enabled sophisticated data dependence analysis for improving readability of the produced source program. Other factors for readability improvement includes concatenating multiple machine instructions into structured expressions, accurate extractions of function arguments and return values, improved estimation of data types, and accurate analysis of program control flow with indirect jumps.

However, in this literature, there is no explanation on whether or not the problem of manual editing has been effectively addressed with their techniques.

Therefore, it is desirable to establish a technology framework to overcome the aforementioned technical problems (some are solved by Non-patent Document 1) of the reverse-compiler. Establishing the reverse-compiler technology framework requires the similar effort as establishing the (normal) compiler technology framework which is composed of numerous highly-complex processing steps. Compilers have much higher demands than reverse-compilers, and therefore the development resources of compilers (engineers, researchers and communities) are also much larger than that of reverse-compilers.

On the other hand, aforementioned instruction-set simulators satisfy the "completeness" problem of the reverse-compilers, in the sense that they are able to simulate any kinds of binary executable programs.

In general, static compile scheme can achieve the fastest simulation speed since the entire binary executable program is decoded only once (and therefore has the minimum amount of decoding overhead). However, for the static compile scheme which translates the decoded results into C source program (Non-patent Documents 4, 8, 9), it has been reported in Non-patent Document 8 that simulation time is 14 times to 54 times longer than the execution time of the original program directly executed on the host CPU (native execution).

Non-patent Documents 5, 10, are another kind of static compile scheme which convert the decoded results of the binary executable program directly into host CPU's machine instructions, where a variety of (machine-specific) code optimization techniques can be applied, thus achieving the simulation speed comparable to native execution. Among the instruction-set simulator techniques, static compile scheme which translates the decoded results into source programs (Non-patent Documents 4, 8, 9) are the only techniques capable of generating source program whose behavior is equivalent to that of the original binary executable program.

The drawback of the techniques of Non-patent Documents 5, 10 which directly converts decoded results into host CPU's machine instructions is that they lack the capabilities of adapting to different platforms (different host-CPUs), analyzing the target binary executable programs, and detecting and analyzing virus programs.

Therefore, for the purpose of platform conversion, analyzing and understanding programs in general, and developing antidotes software for widespread virus programs in particular, static compile scheme which translates the decoded results into source programs (Non-patent Documents 4, 8, 9) are the only viable methods for practical use.

However, static compile scheme which translates the decoded results into source programs (Non-patent Documents 4, 8, 9), has the aforementioned problem that the simulation time is 14 times to 54 times slower than native execution time.

Also, the same technique of Non-patent Documents 4, 8, 9, as explained later, suffers from difficulty of analyzing the produced source program. Therefore, detecting and analyzing virus programs are difficult with this scheme.

Here, in order to clarify the schemes of the present invention, the techniques of non-patent Documents 4, 8, 9 whose approach is the closest to the present invention among other existing approaches are explained in details with C program samples to highlight the underlying technical problems (which are to be solved by the present invention).

Non-patent Documents 4, 8, 9 are techniques based on the aforementioned static compile instruction-set simulator scheme in which the decoded results are translated into source programs using high-level programming language such as C language. The technique of producing C source programs, first proposed in Non-patent Document 4, has been utilized also in later Non-patent Documents 8, 9.

FIGS. 53, 54 show the C source program output explained in Non-patent Document 4. FIG. 53 shows the C macro definitions for each machine instructions of the target CPU, and FIG. 54 shows the C source program with equivalent behavior of the original binary executable program, of Non-patent Document 4.

FIG. 54, line 4, "register UL*S=M, *F=H, A=0, P=START;" is interpreted as follows.

S, F, A, P are local variables within the function that correspond to a slack pointer, a frame pointer, an accumulator and a program counter (PC), respectively. The larger CPU model contains these 4 registers only, therefore is a very simple CPU. When the "execute" function returns (FIG. 54, 3rd line from bottom), these CPU register values are saved to global variables by SAVESTATE macro (FIG. 54, 4th line from bottom).

FIG. 54, line 6 and onwards, "for(;;) switch(P){ . . . }" is interpreted as follows.

"for(;;)" is the main loop of the instruction-set simulator, where the loop iterates until the program execution reaches the HALT instruction (terminate CPU) or default-label (corresponds to undefined instruction address or error handling).

"switch(P)" is a switch-statement that branches to each case-statement whose label (embedded inside the C macro) corresponds to each machine instruction address.

Each machine instruction C macro contains a case-label whose value is the instruction address and a set of C statements to emulate the machine instruction behavior.

C macros for the branch machine instructions (CBLS: conditional branch, J$R: subroutine call, UNLK; return) contains program counter update calculation and a break-statement. After completion of these branch machine instructions, the program control flow returns to the switch-statement and branches to the next instruction address.

In general, there is a limit to the number of case-statements inside a switch-statement, and therefore large programs need to be partitioned and implemented using multiple switch-statements. (Non-patent Document 8, explained later, applies such program partitioning technique.)

FIG. 55A, 55B shows the C source program structure of Non-patent Document 8 whose method is derived from Non-patent Document 4.

FIG. 55A, line 1, "Region3( )" is the description of machine instruction executions whose instructions are located within a certain address range. Each instruction is explained as follows:

On FIG. 55A, line 3, based on the program counter value ("ac_pc" in the FIG.), the switch-statement branches to the case-statement with the corresponding instruction address.

On FIG. 55A, lines 5 and 11, case-label value corresponds to the instruction address, and following the case-label, the machine instruction behavior on that address is described in a set of C statements. Program counter update calculation for executing the next instruction is performed, then the final break-statement at the end returns the program execution flow back to the switch-statement.

Default-statement on FIG. 55A, line 18, corresponds to the case where the machine instruction address is outside of the range of Region3( ).

FIG. 55B, line 1, "Execute( )" is the simulator's main function, where the upper bits of the program counter (ac_pc>>11) is used to branch to the specific function "RegionXX( )" which contains the current machine instruction.

Non-patent Document 8 applies the following two optimization techniques to the generated C source program (refer to 5. Optimization Techniques of Non-patent Document 8). Note that these optimization techniques have already been implemented in Non-patent Document 4.

Optimization 1: For normal instructions where the program counter is simple incremented (unlike branches and calls), eliminate the redundant break-statement since the next instruction is located at the next case-statement.

Optimization 2: Update the program counter only on the instructions which explicitly modifies the program counter (such as branches and calls).

Instruction-set simulator of the aforementioned Non-patent Document 8 is reported to be the fastest simulator at that time, which is still 14 times to 54 times slower than the native execution.

Problems regarding the C source program of the instruction-set simulator (hereinafter called "ISS (instruction-set simulator) source program") produced by the methods of Non-patent Documents 4, 8, 9 are as follows:

First problem is that the ISS source program is composed of case-statements, where each case-statement corresponds to each machine instruction address. The reason for such program structure is explained in Non-patent Document 7, page 3, right column, first paragraph: "Each instruction of the decoded application corresponds to respective behavior function call in the generated simulator. These functions must be accessed randomly, as all of them can be a potential target of a jump instruction . . . . The switch is based on the Program Counter."

Second problem is the fact that the simulation speed of ISS source program is 14 times to 54 times slower than native execution (original program) prohibits any practical use of the ISS source program for retargeting (porting) to different CPUs. The slow simulation speed of ISS source program is caused by the program structure composed of switch-statements on the program counter value and case-statements corresponding to each machine instruction address.

Third problem is the (lack of) code optimization (opportunities).

ISS source program structure with switch-statement that potentially branches to arbitrary case-statement eliminates opportunities for applying effective code optimization techniques by the compiler.

In particular, one important code optimization technique is the dead code elimination for removing redundant calculations that are not used in later calculations which greatly affect the simulation execution time. ISS source program contains numerous update calculations on the program counter and CPU-state flags (zero flag, sign flag, overflow flag, etc.) that occupy a significant portion of the ISS source program. Therefore, not being able to optimize these redundant codes leads to large overhead compared to native execution.

Fourth problem is the lack of hierarchical program structure.

When simulating branch instructions on ISS source program, blank-statement following the program counter update calculation redirects the program execution flow back to the switch-statement, then branches to the next case-statement. During such branch instruction simulation, access to the "jump table" stored in memory occurs for determining the program location of the case-statement, which is another cause for the simulation overhead. The fact that the actual hierarchical structure of the original binary executable program is not adequately restored in the ISS source program causes the simulation speed to degrade.

Fifth problem is the low readability of the generated ISS source code.

ISS source program structure that is generated by partitioning the original program due to the limited number of case-statements inside the switch-statement are extremely hard to read. Therefore, debugging the program for correcting errors or modifying the original program for functionality extensions become extremely difficult to execute.

Sixth problem is the lack of program control flow analysis.

Instruction-set simulator techniques have mainly focused on the implementation of processor simulation capabilities, thus have evolved more or less independent of the compiler and reverse-compiler technologies. Therefore, there exists no such instruction-set simulator that incorporates program control flow analysis techniques employed by the compiler.

FIGS. 56, 57 show the software development environment for conventional embedded systems, where advantages and disadvantages for each case is explained as follows: FIG. 56 shows the conventional software development environment for embedded systems that does not utilize the instruction-set simulator.

Conventionally, the software development environment for embedded systems without the use of instruction-set simulator are either based on the actual embedded system product equipped with a target-CPU (actual target system:) or based on a computer equipped with a host-CPU.

In the case where the software development environment is based on the actual target system with the target-CPU, the source program and/or the assembly code for the target-CPU is converted into target-CPU's binary executable program using the compiler for the target-CPU. Binary executable program is stored in the memory of the embedded system product equipped with the target-CPU.

In such case, the developed source program and/or assembly code are directly executed on the actual target system and therefore a precise program testing on the real operating environment is possible. However, since the development environment is based on actual target system, it is often difficult to setup the program tests especially for corner-cases, and debugging on the actual target system is time consuming (due to limited observability of the actual target system).

On the other hand, in the case where the software development environment is based on a computer equipped with a host-CPU, the source program and/or the assembly code for the target-CPU is converted into host-CPU*s binary executable program using the compiler for the host-CPU. The binary executable program is stored in the computer equipped with the host-CPU.

In such case, the source program and/or assembly code are executed on the host-CPU which is different from the intended target-CPU, a precise emulation of the real program behavior is not possible. However, since the development environment is based on a computer with the host-CPU, it is easy to setup the program tests including corner-cases (using the standard program development environment on the host-CPU), end debugging is easy (due to high observability of the host-CPU's program development environment).

FIG. 57 shows the conventional software development environment for embedded systems that utilizes the instruction-set simulator.

The source program and/or the assembly code for the target-CPU are converted into target-CPU's binary executable program using the compiler for the target-CPU. Target-CPU's binary executable program is then translated into ISS source program through the static compile technique, which is finally converted into host-CPU's binary executable program by host-CPU's compiler. Host-CPU's binary executable program is executed on the computer equipped with the host-CPU, where precise program testing equivalent to the real operating environment (target-CPU) is possible since the host-CPU's binary executable program is generated from the ISS source program that precisely emulates the behavior of the target-CPU.

Since the target-CPU's binary executable program is converted into the host-CPU's binary executable program whose machine instruction formats are different (and the resulting overhead of the aforementioned conventional static compile scheme ISS source program), the simulation time is long.

To summarize the problems of the related art to be solved, conventional techniques include the reverse-compiler that converts the binary executable program into a source program, and the instruction-set simulator that emulates the processor behavior and executes the binary executable program.

Reverse-compiler has the following problems.

First, restoring the data types is difficult.

Second, analyzing the program control flow with indirect branches are difficult.

Third, restoring function arguments and return values are difficult.

Fourth, source programs generated by the reverse-compiler have the following problems in terms of completeness. First problem is that manual editing of the source programs generated by most reverse-compilers is required so that they can be compiled without errors. Second problem is that the range of programs that can be handled are limited due to the restrictions on the program complexity.

In Non-patent Document 1, the first problem regarding the difficulty of restoring the data types, the second problem regarding the difficulty of analyzing the program control flow with indirect branches, and the third problem regarding the difficulty of restoring function arguments and return values have been addressed. But the fourth problem regarding the completeness of the reverse-compiler scheme is still unsolved.

On the other hand, instruction-set simulator satisfies the fourth problem of the reverse-compiler, that is, the completeness problem. However, instruction-set simulator suffers from the problem that the simulation time is 14 times to 54 times longer than the native execution time, in which the original program is directly executed on the host-CPU.

In Non-patent Documents 5, 10, target-CPU's machine instructions are directly converted into host-CPU's machine instructions, in which the simulation speed is comparable to native execution. However, the "binary translation" scheme of directly converting one machine instruction format into another machine instruction format employed in Non-patent Documents 5, 10 suffers from the problems of lacking the capabilities of adapting to different platforms (different host CPUs), analyzing the target binary executable programs, detecting and analyzing virus programs.

Therefore, the only viable options for practical use that is able to address the problems in Non-patent Documents 5, 10, that is, lacking the capabilities of adapting to different platforms (different host CPUs), analyzing the target binary executable programs, detecting and analyzing virus programs, is the scheme in which the decoded results of the binary executable program are translated into C source program (Non-patent Documents 4, 8, 9).

However, as mentioned previously, instruction-set simulators in Non-patent Documents 4, 8, 9 have the following problems to be solved.

First problem is that it lacks the information to determine which instructions can potentially be the target of a branch instruction.

Second problem is that the simulation speed of ISS source program is 14 times to 54 times slower than native execution (original program).

Third problem is that the generated ISS source programs have little opportunities for code optimization (due to the particular program structure composed of switch-statements and case-statements).

Fourth problem is that the generated ISS source program lacks the hierarchical program structure.

Fifth problem is that the generated ISS source program is very difficult to read, since it does not even restore the subroutine structure of the original binary executable program.

Sixth problem is lack of program control flow analysis capability.

The present invention solves the six aforementioned problems of the Non-patent Documents 4, 8, 9 which is the only viable options for practical use.

The present invention has been made to solve such problems of the related art, and the objective of the present invention is to provide an instruction-set simulator and a method for generating such simulator that is capable of guaranteeing the full restoration of source program file (ISS source program using C language) from the binary executable program, in which the generated source program is easy to analyze, and the simulation speed is considerably fast.

Solution to Problem

In order to solve the aforementioned problems, eight new processing schemes explained in the following are introduced which were not considered conventionally.

The first aspect of the present invention is an instruction-set simulator that is generated by convening the binary executable program into the source program. The instruction-set simulator is provided with a subroutine detection means that detects subroutines included in the binary executable program, a branch instruction detection means that detects the branch instructions in the binary executable program which have a branch target address, a subroutine-call instruction detection means that detects subroutine-call instructions in the binary executable program which have a subroutine-call target address, a subroutine source program output means that emits (generates) the source program for each subroutine detected by the subroutine detection means, a label annotation means that annotates a label indicating a branch target address at the branch target instruction in the source program, an unconditional branch instruction output means that converts each branch instruction in the binary executable program into an unconditional branch instruction in the generated source program which branches to the labeled branch target instruction (in the source program), and a subroutine-call instruction source program output means that converts each subroutine-call instruction in the binary executable program into a subroutine-call instruction in the generated source program.

The ninth aspect of the present invention is a method of generating the instruction-set simulator of the first aspect of the present invention.

By the first aspect or the ninth aspect of the present invention, a subroutine detection means, a branch instruction detection means, a subroutine-call instruction detection means, and a label annotation means are provided, therefore, the information to determine which instructions can potentially be the target of a branch instruction are provided (solves the aforementioned first problem).

Branch instructions in the binary executable program are emitted as unconditional branch instructions in the generated source program, and subroutines in the binary executable program are emitted as subroutines in the generated source program. Therefore, the hierarchical structure of the binary executable program is restored (in the generated source program) (solves the aforementioned fourth problem).

Since the hierarchical structure of the binary executable program is restored in the generated source program, code optimization capabilities of the compiler can be applied effectively (solves the aforementioned third problem), and therefore results in fast simulation execution (solves the aforementioned second problem). Also, the "completeness" criteria of the instruction-set simulator can be realized.

The second aspect of the present invention is an instruction-set simulator of the first aspect of the present invention, where the branch instruction detection means is further composed of a simple branch instruction detection means that detects simple branch instructions whose branch target address can be (statically) determined, and a data-dependent branch instruction detection means that detects data-dependent branch instructions whose branch target address is determined by a register value or a memory value.

By the second aspect of the present invention, simple branch instructions are detected by simple branch instruction detection means, and data-dependent branch instructions are detected by data-dependent branch instruction detection means, and therefore, the conversion of branch instructions in the binary executable program into the unconditional branch instructions in the generated source program can be performed easily (solves the aforementioned first and sixth problems).

The third aspect of the present invention is an instruction-set simulator of the second aspect of the present invention, which is further provided with a jump-table recording means that records the branch target addresses of the data-dependent branch instructions into the jump-table information storage unit, and a data-dependent branch instruction generation means that generates a set of unconditional branch instructions from the jump-table information (in the generated source program), in which the jump-table information is retrieved from the jump-table information storage unit by searching the address of the data-dependent branch instruction registered in the jump-table information storage unit.

The tenth aspect of the present invention is a method of generating the instruction-set simulator of the third aspect of the present invention.

By the third aspect or the tenth aspect of the present invention, (data-dependent) branch instructions in the binary executable program can be easily convened into a set of unconditional branch instructions in the generated source program with the use of the jump-table information (solves the aforementioned first and sixth problems).

The fourth aspect of the present invention is an instruction-set simulator of either from the first to the third aspect of the present invention, where the subroutine-call instruction detection means is further composed of a simple subroutine-call instruction detection means that detects simple subroutine-call instructions whose call target address can be (statically) identified, and a data-dependent subroutine-call instruction detection means that detects data-dependent subroutine-call instructions whose call target address is determined by a register value or a memory value.

By the fourth aspect of the present invention, simple subroutine-call instructions are detected by simple subroutine-call instruction detection means, and data-dependent subroutine-call instructions are detected by data-dependent subroutine-call instruction detection means, and therefore, the conversion of subroutine-call instructions in the binary executable program into the subroutine-call instructions in the generated source program can be performed easily (solves the aforementioned first and sixth problems).

The fifth aspect of the present invention is an instruction-set simulator of the fourth aspect of the present invention, where the subroutine-call instruction output means is further composed of a machine instruction subroutine address table generation means that generates a machine instruction subroutine address table whose table entry is composed of a subroutine name and a subroutine address in the binary executable program, a subroutine address search program generation means that generates a program which searches for the subroutine address in the generated source program from the subroutine address in the binary executable program, and a data-dependent subroutine-call instruction generation means that generates data-dependent subroutine-call instructions in the generated source program in which the target call address of the data-dependent subroutine-call instruction is resolved by the subroutine address search program.

The eleventh aspect of the present invention is a method of generating the instruction-set simulator of the fifth aspect of the present invention.

By the fifth aspect or the eleventh aspect of the present invention, target subroutine of the data-dependent subroutine instructions in the generated source program can be identified and (correctly) call the corresponding subroutine (solves the aforementioned fourth problem).

The sixth aspect of the present invention is an instruction-set simulator of either from the first to the fifth aspect of the present invention, which is further provided with a register variable conversion means that converts the register values in the machine instructions into subroutine's argument variables or it's (subroutine's) local variables of the generated source program.

The twelfth aspect of the present invention is a method of generating the instruction-set simulator of the sixth aspect of the present invention.

By the sixth aspect or the twelfth aspect of the present invention, the register values in the machine instructions are converted into subroutine's argument variables or it's (subroutine's) local variables of the generated source program by the register variable conversion means (solves the aforementioned third and fourth problems), and therefore the speed of the instruction-set simulator can further improve (solves the aforementioned second problem).

The seventh aspect of the present invention is an instruction-set simulator of either from the first to the sixth aspect of the present invention, where the generated source program is a C program, unconditional branch instructions to the labeled instructions and subroutine-call instructions are used instead of relying on the program structure that comprises switch-statements on the program counter and case-statements corresponding to individual instructions in the binary executable program, each of the subroutines in the binary executable program correspond to the subroutines in the generated source program, and the hierarchical structure of subroutines in the binary executable program is restored as the hierarchical structure of subroutines in the generated source program.

By the seventh aspect of the present invention, the generated source program is a C program, and unconditional branch instructions to the labeled instructions and subroutine-call instructions are used instead of relying on the program structure that comprises switch-statements on the program counter and case-statements corresponding to individual instructions in the binary executable program, and therefore the compiler can perform code optimization effectively. Also since each of the subroutines in the binary executable program correspond to the subroutines in the generated source program, and the hierarchical structure of subroutines in the binary executable program is restored as the hierarchical structure of subroutines in the generated source program (solves the aforementioned fourth problem), the compiler can perform code optimization effectively (solves the aforementioned sixth problem), and execution of the instruction-set simulator is fast (solves the aforementioned second problem). Also, the generated source program is highly readable and easy to analyze, thus making the task of analyzing malwares and virus programs easier (solves the aforementioned fifth problem).

The eighth aspect of the present invention is an instruction-set simulator of either from the first to the seventh aspect of the present invention, which is further provided with an unregistered machine instruction address detection means that detects and records an unresolved target call address of a data-dependent subroutine-call instruction then forcibly terminates the instruction-set simulator, a case which can be caused by the absence of symbol information in the binary executable program that can cause some of the subroutines in the binary executable program to remain undetected, and an unregistered subroutine source program output means that emits the source program for the unregistered subroutine.

The thirteenth aspect of the present invention is a method of generating the instruction-set simulator of the eighth aspect of the present invention.

By the eighth aspect or the thirteenth aspect of the present invention, the instruction-set simulator can also handle the case where symbol information is absent in the binary executable program that can cause some of the subroutines in the binary executable program to remain undetected (solves the aforementioned sixth problem).

Advantageous Effect of the Invention

The instruction-set simulator and the method for generating such simulator of the present invention can guarantee the full restoration of source program file from the binary executable program, in which the generated source program is easy to analyze, and the simulation speed is considerably fast.

BRIEF DESCRIPTION OF DRAWINGS

FIG. 1 is a diagram illustrating a C program source sample.

FIG. 2 is a diagram illustrating a list of machine instruction address in hexadecimal format, 32-bit machine instruction in hexadecimal format, and the disassembled assembly instruction.

FIG. 3 is a diagram illustrating a C program source description emitted by an embodiment of the present invention.

FIGS. 4A and 4B are diagrams illustrating a C program source description emitted by an embodiment of the present invention which are overlaid with the compiled machine instructions of the host-CPU (x86 instruction-set).

FIG. 8 is a diagram illustrating a C program source sample of "jump_test" function which contains a switch-statement.

FIG. 10 is a diagram illustrating machine instructions and assembly instructions of ARMv5 instruction-set on the "jump_test" function in FIG. 8.

FIG. 11 is a diagram illustrating machine instructions and assembly instructions of x86(64-bit) instruction-set on the "jump_test" function in FIG. 8.

FIG. 13 is a diagram illustrating an example of CPU resource data structure for ARMv5 ISS source program.

FIG. 14 is a diagram illustrating macro definitions for accessing CPU resource and macro definitions for instruction execution conditions.

FIG. 15 is a diagram illustrating 4 machine instructions and assembly instructions of ARMv5 instruction-set on the "jump_test" function.

FIG. 16 is a diagram illustrating macro calls of the 4 machine instructions of ARMv5 instruction-set in FIG. 15.

FIG. 17 is a diagram illustrating definitions of SUB and CMP macros.

FIG. 18 is a diagram illustrating definition of _SUB_ macro.

FIG. 19 is a diagram illustrating macro definitions that are called from _SUB_.

FIG. 20 is a diagram illustrating a definition of STR macro that are called from FIG. 16.

FIG. 21 is a diagram illustrating definitions of _ADDR_, _m8_, _m16_, _m32_, and D_CACHE_SIM macros.

FIG. 22 is a diagram illustrating definition of LDR macro.

FIG. 23 is a diagram illustrating the program description generated by the 4 machine instruction program generator macro calls in FIG. 16.

FIG. 25 is a diagram illustrating a subroutine definition description output for "jump_test" function.

FIG. 26 is a diagram illustrating an unconditional branch instruction.

FIG. 27 is a diagram illustrating a program source description for an unconditional branch instruction.

FIG. 28 is a diagram illustrating a subroutine-call instruction.

FIG. 29 is a diagram illustrating a program source description for a subroutine-call instruction.

FIG. 30 is a diagram illustrating a conditional data-dependent branch instruction and the following unconditional branch instruction.

FIG. 31 is a diagram illustrating program source descriptions for a conditional data-dependent branch instruction and the following unconditional branch instruction.

FIG. 32 is a diagram illustrating the two machine instructions that implement a data-dependent subroutine-call.

FIG. 33 is a diagram illustrating program source description for a data-dependent subroutine-call.

FIG. 34 is a diagram illustrating a program source description for machine instructions in "jump_test" function.

FIG. 35 is a diagram illustrating _FP_INFO_ data structure for storing symbol address information.

FIG. 36 is a diagram illustrating a source program description for initializing the _FP_INFO_ data structure.

FIG. 37 is a diagram illustrating a definition of _GET_FPI_ function which returns the pointer of _FP_INFO_data structure.

FIG. 38 is a diagram illustrating a source program description of memory initialization.

FIG. 39 is a diagram illustrating a first example of a topmost function program description of an instruction-set simulator.

FIG. 40 is a diagram illustrating a second example of a topmost function program description of an instruction-set simulator.

FIG. 41 is a diagram illustrating a source program description that writes the argument information of the main function into CPU memory.

FIG. 44 is a diagram illustrating input/output registers of ARMv5 machine instruction of "jump_test" function in FIG. 11.

FIG. 46 is a diagram illustrating macro definitions for accessing CPU resource and macro definitions for instruction execution conditions.

FIG. 47 is a diagram illustrating a subroutine definition description output of "jump_test" function.

FIG. 48 is a diagram illustrating a program source description of subroutine-call instruction.

FIG. 49 is a diagram illustrating a definition of function-pointer data type.

FIG. 50 is a diagram illustrating a source program description of a data-dependent subroutine-call instruction.

FIG. 52 is a diagram illustrating a definition of _GET_FPI_ function which returns a pointer to _FP_INFO_ data structure.

FIG. 53 is a diagram illustrating a set of C macro definitions of Non-patent Document 4 for a set of machine instructions.

FIG. 54 is a diagram illustrating a C program output of Non-patent Document 4 whose behavior is identical to the binary executable program.

FIGS. 55A and 55B are diagrams illustrating a C program structure of Non-patent Document 8 whose method is derived from Non-patent Document 4.

DESCRIPTION OF EMBODIMENTS

Figure 5:
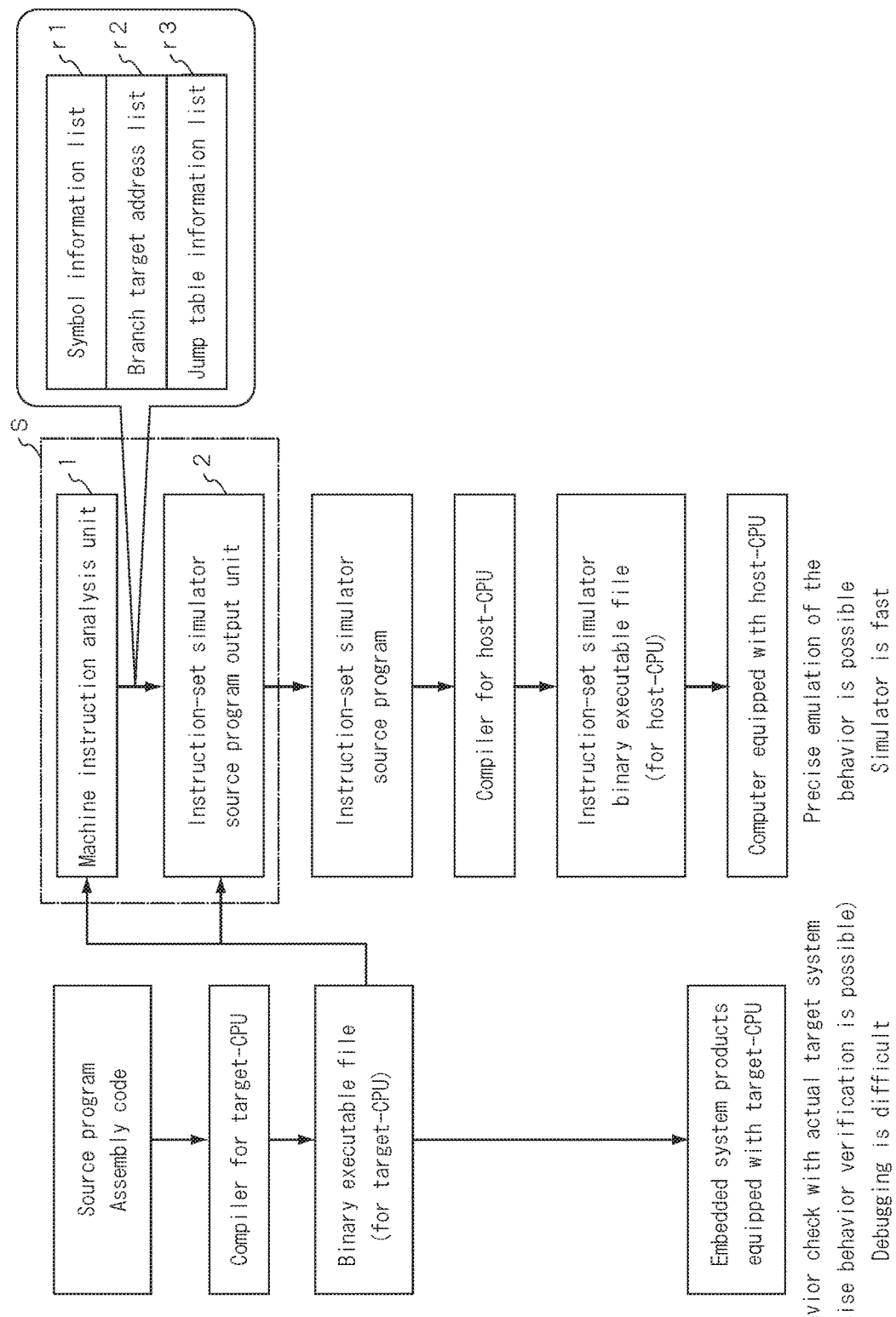
FIG. 5 is a diagram illustrating a software development environment for embedded systems using the Instruction-set simulator of the first embodiment.

Hereinafter, an embodiment of the present invention will be explained with reference to the accompanying drawings below.

<Summary of the Present Invention>

An instruction-set simulator of the present invention applies several of the techniques established during the development of reverse-compiler technology, such as program control flow analysis technique and data-dependence analysis technique, to the static compile based instruction-set simulator. By this approach, completeness is ensured by the inherent completeness of the instruction-set simulator, while the simulator execution can be as fast as the native execution (by the use of program control flow analysis and data-dependence analysis techniques, which enables the restoration of hierarchical structure of the program, as a result, enables code optimization capabilities of the compiler to be effective).

Here, "completeness" refers to the ability to ensure that any binary executable program (regardless of the program complexity) can be simulated (correctly).

First Embodiment

In order to explain the details of the present invention, a C program source generated by an instruction-set simulator of the first embodiment is explained.
<C Source Program Output Whose Behavior is Equivalent to the Binary Executable Program by the Present Invention.

FIG. 1 shows the C source program sample.

FIG. 2 shows a list of machine instructions of ARMv5 instruction-set, which is an instruction-set for an embedded processor, generated by gcc compiler (gcc: GNU Compiler Collection) from the C source program of FIG. 1. In FIG. 2, at each row, machine instruction address and the 32-bit machine instruction are shown as hexadecimal format, followed by assembly instruction generated by a disassembler (a program which translates machine instruction into text-based assembly instruction, which is also a part of gcc tool set). In FIG. 2, four alphanumerical digits at the left are instruction addresses, eight alphanumerical digits at the center are the machine instructions in hexadecimal format, and the assembly instructions are shown at the right.

Features of the ARMv5 instruction-set program shown in FIG. 2 are explained as follows:

16 registers (r0, ..., r9, sl, fp, ip, sp, lr, pc): the program counter (pc) can be modified by a normal instruction. Also, by the use of instructions that modifies pc, a variety of program flow control can be implemented.

Execution condition: all instructions contain a 5-bit execution condition flag, in which the instruction execution is skipped if the execution condition is not satisfied. In FIG. 2, suffices (gt, eq, le) of popgt, beq, ble instructions are the execution conditions for these instructions (greater than, equal less or equal), and instructions without any execution condition suffix are unconditionally executed (al: always).

Constant pool: For loading 32-bit immediate (constant) values to register, a constant pool located in the program (memory) area is used. At address locations 0x8234, 0x8238, 0x8428, constant values (0x1b308, 0x1b404, 0x1b308) are stored. Load instructions at 0x8218, 0x8220, 0x83c4 uses pc as the base-address to access these constant values.

FIG. 3 shows a C program source description emitted by an embodiment of the present invention.

Features of the C program source description emitted by an embodiment of the present invention are explained as follows;

First feature is the one-to-one correspondence between one machine instruction and one C macro call (such as LDR, ADD, CMP). Here, each C macro call (corresponding to one machine instruction) is processed one by one in the same order as the machine instructions. The actual instruction behavior is defined inside each C macro description. (Non-patent Document 4 employs the similar C macro approach: refer to FIGS. 53 and 54).

Second feature is that each function in the original C source program (FIG. 1) directly corresponds with a function in the generated ISS source program. That is, the hierarchical structure of the original C source program is restored in the ISS source program generated by the instruction-set simulator S of the embodiment of the present invention.

Features of function description and function call method in the generated ISS source program are explained as follows:

First feature is that the function arguments (such as r0) are passed as argument variables whose names match that of the CPU registers. Register names that do not appear in the function arguments are declared as local variables inside the function. In FIG. 3, r0, r1, ..., r9, sl, fp, ..., pc are the CPU general-purpose registers (local variables), and cv, cc, ..., cle are the CPU state registers (explained later).

Second feature is that update calculations of the program counter (pc) and link register (lr: register which stores the return address) are not required since the generated ISS source program utilizes the C function call mechanism directly. Therefore, function call overhead is comparable to that or the native execution.

Third feature is that the stack pointer (sp) is passed as a function argument if the stack frame allocation is required by the called function.

Fourth feature is that the function return value is passed back through a particular register (r0 in the above example) defined by the (compiler-dependent) calling convention (FIG. 3, line 12). Even if the function in the original source program is a void type (a function without a return value), the function in the generated ISS source program returns the value of r0, although this does not have any ill effects on the program behavior. This is because the compiler assumes that r0 can be modified after the call, and even if an undefined value is assigned to r0, this value will not be referenced and therefore has no unwanted side effects.

Fifth feature is that C labels (L_083f0, L_093fc, L08400, etc.) are attached before the instruction C macro of the branch target, and a branch instruction is converted into an unconditional branch instruction, that is, a goto-statement.

Due to this (fifth) feature, it becomes possible to describe the program control flow of the binary executable program directly on the generated ISS source program, unlike the conventional static compile based instruction-set simulator (non-patent 4, 8, 9) which requires the use of switch-statements on the program counter and case-statements corresponding to individual instructions in the binary executable program.

Since the original program control flow structure can be described on the generated ISS source program, the compiler can apply code optimization techniques to the fultest extent. Therefore, the simulation execution time can be drastically reduced.
<Instruction-Set Simulator Execution Time by the Embodiment of the Present Invention>

The structural features of the generated ISS source program by the embodiment of the present invention can be confirmed by actually compiling and executing the ISS source program. Internal structure of the C macros appearing in the C source code in FIG. 3 is composed of fairly complex codes since all behaviors of a complex CPU need to be accurately described in C codes. Here, in despite of such a complex CPU behavior, we explain how our ISS source program can convert into an efficient binary executable program of a host-CPU, where the host-CPU refers to a processor (such mounted on a desktop or notebook PCs) which executes instruction-set simulator and other software.

FIGS. 4A and 4D show the C source program of the binary executable program (of ARMv5 instruction-set) generated by the embodiment of the present invention, overlaid with the machine instructions of the host-CPU (x86 instruction-set) obtained by host-CPU's compiler. The underlined area in FIGS. 4A and 4B are the machine instructions of the host-CPU (x86 instruction-set) obtained by host-CPU's compiler.

Two function calls to _my_input_prime_ are inline-expanded.

ARMv5 code size: 26+7*2–40 instructions
get_primes function: 26 instructions
put_prime function: 7 instructions (inline-expanded twice)
x86 code size: 42 instructions ARMv5 machine instructions in FIG. 2 and x86 machine instructions in FIGS. 4A and 4B cannot be directly compared since the instruction-sets are different, however, it can be seen that, in despite of the complex C macro composition of the ISS source program shown in FIGS. 4A and 4B, one ARMv5 instruction corresponds approximately to one x86 instruction, based on the instruction counts. As a result, the C source program generated by the instruction-set simulator or the present invention enables the compiler's code optimizations to work at maximum level. In general, program execution time becomes shorter as the number on machine instructions of the host-CPU (x86 instruction-set) decreases, and therefore, the simulation time of the instruction-set simulator generated by the embodiment of the present invention becomes shorter.

Also, the comparison result between the native execution time (obtained by compiling and executing the original C program source using host-CPU's compiler) and the simulation execution time of our instruction-set simulator S (obtained by first convening the binary executable program of ARMv5 instruction-set into ISS source program, then compiling and executing the ISS source program using host-CPU's compiler) is given as follows:

A prime number calculation program which includes the test program in FIG. 2 is executed on
  host-CPU: Intel Xeon 3.4 GHz (Quad core), 3.25 GB memory
resulted in the native execution time: 0.7580 seconds.

The simulation time of the same prime number calculation program which includes the test program in FIG. 2 using the instruction-set simulator S of the embodiment of the present invention resulted in 0.7699 seconds, where the execution time ratio against the native execution time of 0.7580 seconds was 1.016 times.

While the simulation time of the conventional instruction-set simulator is 14 times to 54 times longer than the native execution time, the simulation time of the instruction-set simulator S of the embodiment of the present invention is only 1.016 times longer than the native execution time, and therefore a drastic speedup of simulation execution is clear.

<Software Development Environment for Embedded Systems Using Instruction-Set Simulator>

Next, software development environment for embedded systems using the instruction-set simulator S is explained.

FIG. 5 shows a software development environment for embedded systems using the instruction-set simulator of the first embodiment.

A target-CPU refers to a processor (such mounted on an embedded system) which executes the machine instructions in the binary executable program.

A host-CPU refers to a processor (such mounted on a desktop or notebook PCs) which executes software tools including an instruction-set simulator.

Source programs or assembly programs for a target-CPU is converted into target-CPU's binary executable programs by a target-CPU's compiler. Binary executable (program) files are stored in a memory of the embedded system products equipped with a target-CPU, and are executed by the target-CPU.

During the simulation on the instruction-set simulator S, a machine instruction analysis unit 1 of the instruction-set simulator S reads in the target-CPU's binary executable file, executes the machine instruction analysis process, and outputs a symbol information list r1, branch target address list r2 and jump table information list r3.

A source program output unit 2 of the instruction-set simulator S reads in the target-CPU's binary executable file, symbol information list r1, branch target address list r2 and jump table information list r3. The source program output unit 2 then outputs an instruction-set simulator source program (ISS source program, source program of instruction-set simulator S). Here, in the embodiment of the present invention. ISS source program corresponds to the a fore mentioned C source program.

ISS source program is converted into host-CPU's binary executable file by the host-CPU's compiler. Host-CPU's binary executable file is loaded on a memory of a computer equipped with a host-CPU, and is executed by the host-CPU.

The instruction-set simulator S is realized on software. Here, some parts of the instruction-set simulator S can be realized on hardware.

Next, composition details of the first embodiment are explained.

<Data Structure of the Binary Executable Program>

First, data structure of binary executable program (machine instructions) is explained.

Figure 6:
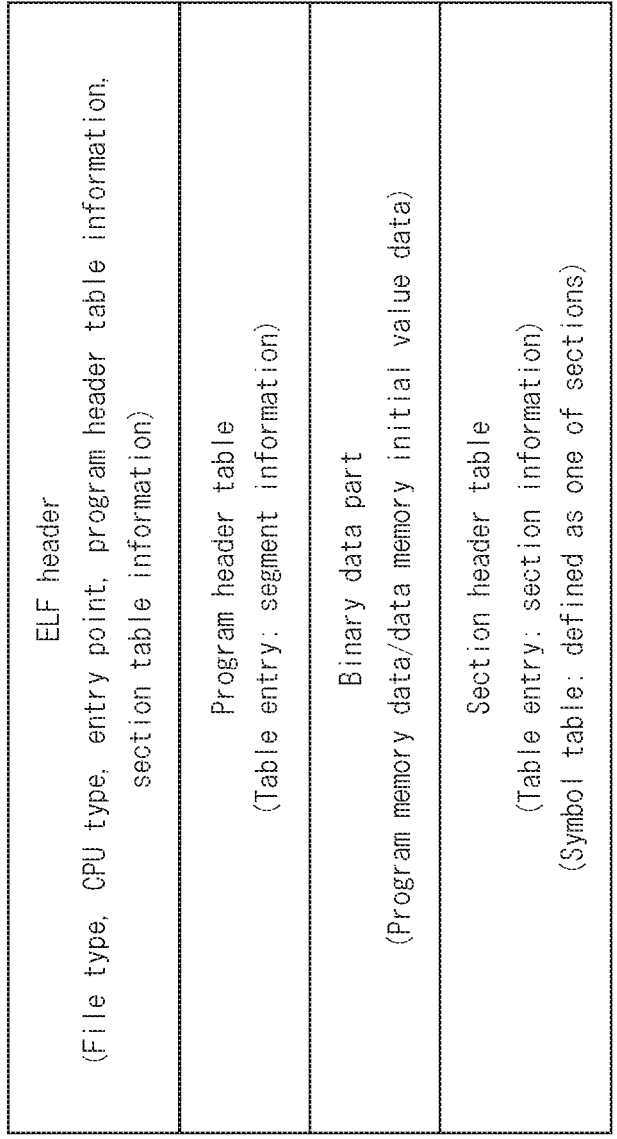
FIG. 6 is a diagram illustrating an overall structure of the ELF file

FIG. 6 shows the overall structure of the ELF file.

Several data formats of the binary executable (program) data (machine instruction data) exist depending on compilers and OSes. Here, ELF (Executable and Linkable Format) file is taken as an example and its internal structure is explained. Below, "storage position" refers to the offset value from the head position of the ELF file, and the storage position is specified by the number of bytes.

(1) ELF header: ELF header is located at the head position of the ELF file, which contains all necessary information to retrieve various information stored inside the ELF file. Main items (of the ELF header) are as follows:
  File type: executable file, linkable file, shared library, etc.
  CPU type/version,
  entry point (address of the first instruction to execute during program execution), storage position of the program header table,
  storage position of the section header table,
  size of the ELF header,
  size of one entry in the program header table,
  number of entries in the program header table,
  size of one entry in the section header table,
  number of entries in the section header table,
  an index to the section header table in which the string table for section names is stored, etc.

(2) The program header table contains information required for the OS (or other mechanisms for loading programs) to prepare the execution of the ELF file on the CPU, including allocation and initialization of the memory space. Each entry (in the program header table) contains the information for one segment (one segment is composed of one or more sections), where the key information items are as follows:

Segment type such as readable segment and dynamic link segment, segment storage position, virtual address and physical address of the segment when allocated to memory, file size and memory size of the segment, access permission of the segment (combination of executable, readable and writeable permission).

(3) Binary data part stores the machine instruction data (program memory data) and initial values of the data memory.

(4) Section header table

A section is a unit of memory space (program memory and data memory) and a unit of storage for auxiliary information. Each entry of the section header table contains the information for one section, where the key information items are as follows:

section name string information is given as an index inside the string table section, section type such as program information type (unit of memory composition, debug information, etc.), symbol table type (program address information, variable address information), string table type, relocation information type, dynamic link information type, etc., section attribute such as readable, writable and executable, section's memory address, section's storage position (inside ELF file), section size.

(5) Symbol table

A symbol is an information containing the program address and program variable which exists in one of the sections.

A symbol table is stored as an entry of the section header table. A symbol contains key information items as follows:

symbol name string information is given as an index inside the string table section, symbol's memory address, symbol's size, symbol attribute such as binding attribute, type attribute, visibility attribute, in particular, for type attribute, symbols associated to functions and other executable instructions have "FUNC-type" attribute, section index in which the symbol is a member of.

(6) Special symbols; some symbols defined in the symbol table require special treatments inside the "machine instruction analysis process" described later.

"Entry symbol": "entry point" defined in the ELF header (address of the first instruction to be executed upon program execution) is handled as the "entry symbol" whose symbol memory address is the entry point value. Program execution terminates when the execution of this "entry symbol" terminates. In general, the means for program termination is implemented by a "halt instruction which halts the CPU, or a call to "program termination symbol" which is explained next.

"Program termination symbol": This refers to a symbol which handles program termination. For example, in C program, exit( ) function is considered as the "program termination symbol".

<Information of the Memory Space of the Executable Program>

ELF

In the aforementioned ELF structure, information regarding the memory space which stores the executable program is defined in several layers.

Entry point (an item in ELF header): address of the first instruction upon the program activation Segment address: on each segment with "executable" access permission, its address range is defined in the program header table.

Section address: on each section with "executable" attribute, its address range is defined in the section header table.

Symbol address: on each symbol which exists inside the address range of "executable" sections, its address is defined in the symbol table contained in the section header table.

Here, information that are guaranteed to be defined in the binary executable file are the entry point and the address range of the executable segment, where section header table can be omitted, and therefore it is possible that section information and symbol information does not exist (in the binary executable file).

<Data Structures for Machine Instruction Analysis Process>

Here, data structures required for machine instruction analysis process is explained.

(1) "Symbol address temporal list": a list of addresses of executable symbols such as functions which is updated as machine instruction analysis process progresses.

(2) "Symbol information list": a list of "symbol information"

Here, a "symbol information" stores the symbol address and instruction address list of an executable symbol.

(A) Symbol address (B) Instruction address list: a list of addresses of all instructions which are reachable from the symbol address (C) Symbol name string: generated from "symbol name string information" included in the symbol table. In the case where a symbol does not exist in the symbol table, or in the case where the symbol table itself does not exist, symbol name string is generated according to an arbitrary naming scheme that produces unique names.

(D) "Data-dependent subroutine-call instruction flag": a flag to indicate whether a data-dependent subroutine-call instruction exists (1) or not (0) among all reachable instructions from the symbol address.

(3) "Instruction address temporal list": a list of machine instruction addresses to be processed, which is updated (instruction address is inserted or deleted) as the process of machine instruction analysis unit 1 progresses.

(4) "branch target address list": a list of branch target address of conditional and unconditional branch instructions (5) "Next-instruction information temporal list": a list of "next-instruction information"

Here, "next-instruction information" contains information regarding the potential instructions executed after an instruction (hereinafter called "next-instruction"), which includes the following data items:

A) Next-instruction address

B) Next-instruction type: one of the following three types

1) "Immediate-type": an instruction that is stored immediately after a particular instruction hereinafter will be called "immediate-next" instruction. Instructions which do not affect the normal updating (increment) of the program counter, such as arithmetic instructions (ADD, SUB, etc.), load instruction (LDR) and store instruction (STR), have a single "immediate-type" next-instruction, that is the "immediate-next" instruction.

2) "Branch-type": branch target instruction of a branch instruction

3) "Call-type": call target instruction of a call instruction

Also, hereinafter, three types of "next-instruction" will be called as "immediate-type" next-instruction, "branch-type" next-instruction and "call-type" next-instruction, respectively.

(6) "Jump table information list r3": a list of "jump table information"

"Jump table information" generated by the process of "data-dependent branch information extraction unit 2" explained later, includes the following data items:

A) Data-dependent branch instruction address

B) lump table size: if the process of "data-dependent branch information extraction unit 2" fails, jump table size is set to 0, which indicates that jump table information is absent on this entry.

C) Branch target address table: one entry of the branch target address table stores one branch target address, where the jump table size equals to the number of entries in the branch target address table.

<Terminologies Regarding the Operations on the List Structure>

(1) List insertion (non-duplicative): data insertion is performed only if an identical data does not already exist in the list, where the data is added to the tail position of the list. Hereinafter, since all lists store data in non-duplicative fashion, list insertion refers to non-duplicative list insertion, unless indicated otherwise.

(2) List extraction: data is extracted from the tail position of the list and is deleted from the list.

First Embodiment

Next, machine instruction analysis unit 1 of the instruction-set simulator S of the first embodiment is explained.

Figure 7:
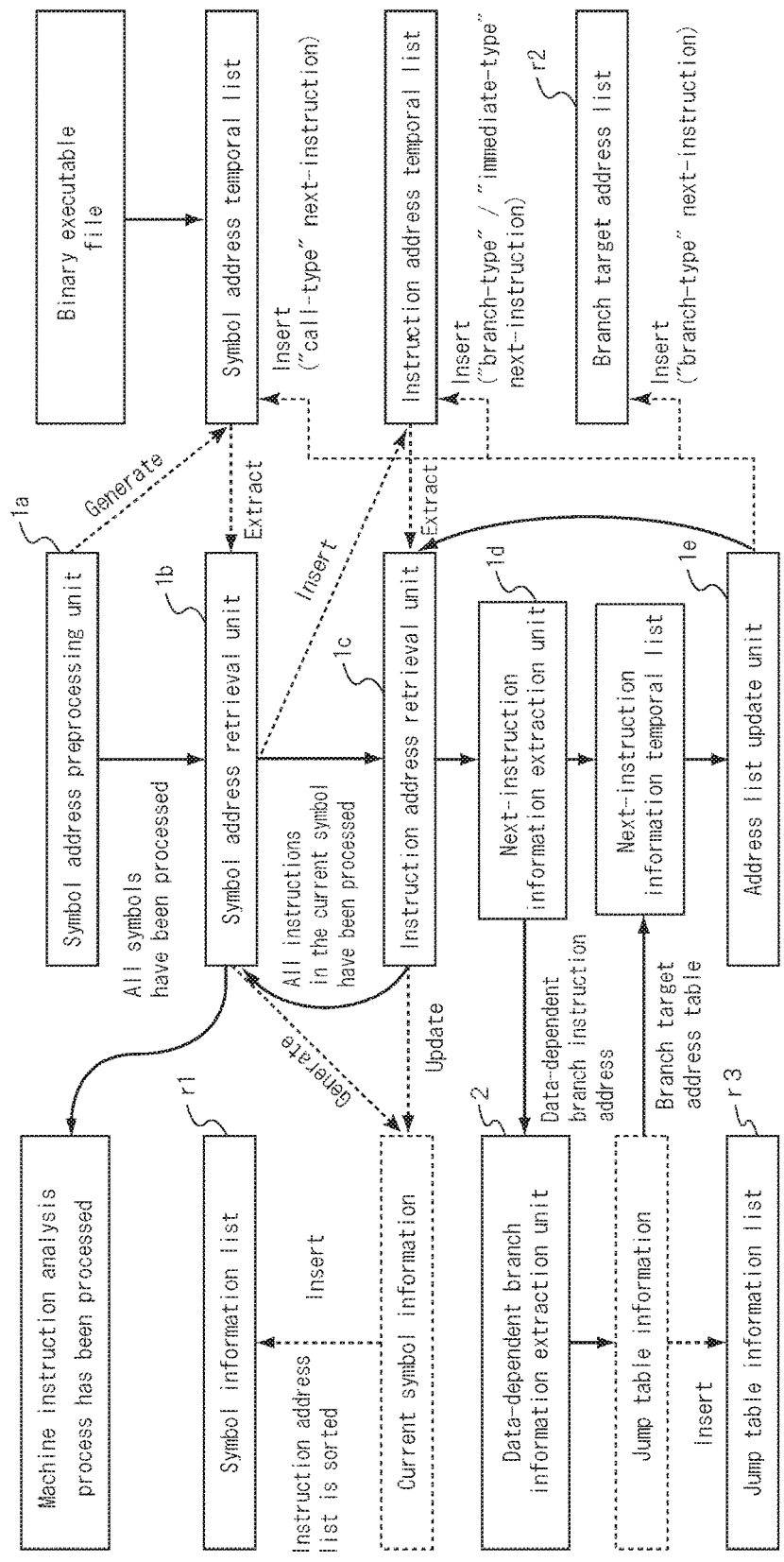
FIG. 7 is a function block diagram illustrating a machine instruction analysis unit of the first embodiment.

FIG. 7 shows the function block diagram of a machine instruction analysis unit of the first embodiment.

Machine instruction analysis unit of the first embodiment has the role of analyzing each machine instruction in order to convert the analyzed machine instruction, which is executed on the target-CPU, into C source program.

Machine instruction analysis unit 1 is composed of
a symbol address preprocessing unit 1a,
symbol address retrieval unit 1b,
instruction address retrieval unit 1c,
next-instruction information extraction unit 1d,
address list update unit 1e, and
data-dependent branch information extraction unit 2.

Machine instruction analysis unit 1, in order to generate the C code from the analyzed machine instruction, outputs a symbol information list r1, branch target address list r2 and jump table information list r3.

Here, on the explanations of the machine instruction analysis unit 1 of the first embodiment, it is assumed that section header table exists, and that symbol table is also defined inside the section header table.

<Symbol Address Preprocessing Unit 1a>

Symbol address preprocessing unit 1a creates the "symbol address temporal list".

Symbol address preprocessing unit 1a judges that a symbol, defined in the symbol table included in the section header table, satisfying the following criteria to be an "executable symbol".

A symbol whose address is included in the address range of a section with executable attribute A symbol whose type attribute is associated to functions and other executable instructions (refer to the aforementioned "FUNC-type" symbol attribute)

Symbol address preprocessing unit 1a creates the "symbol address temporal list" by "inserting" the addresses of all the "executable symbols" to the "symbol address temporal list".

Afterwards, the process progresses to symbol address retrieval unit 1b.

<Symbol Address Retrieval Unit 1b>

(1) If "symbol address temporal list" is not empty

A) Symbol address retrieval unit 1b "extracts" one symbol address from the "symbol address temporal list" (hereinafter, this extracted symbol is called the "current symbol").

B) If the "symbol information" of the current symbol already exists in the "symbol information list" (this indicates that the current symbol has already been processed), all following processes are skipped and returns to the beginning of the process of the symbol address retrieval unit 1b.

C) If the "symbol information" of the current symbol does not exist in the "symbol information list", the "symbol information" of the current symbol is created as follows (hereinafter, the "symbol information" of the current symbol is called the "current symbol information"):

1) "Symbol address" in the "symbol information" is set to the address of the current symbol.

2) "Symbol name string" is generated. If the current symbol is defined in the "symbol table", "symbol name string" is generated by retrieving the "symbol name string information" defined in the "symbol table". If the current symbol is not defined in the "symbol table", "symbol name string" is generated according to an arbitrary naming convention that produces unique names (one example of such naming convention is to generate symbol name based on the "symbol address": if the symbol address is 0x1234, give the symbol name as "func_1234").

3) "data-dependent subroutine-call instruction flag" is set to 0.

D) Address of the current symbol is "inserted" to the "instruction address temporal list". Then the process progresses to instruction address retrieval unit 1c.

(2) On the other hand, if the "symbol address temporal list" is empty, symbol address retrieval unit 1b terminates the process of "machine instruction analysis unit 1".

<Instruction Address Retrieval Unit 1c>

(1) If "instruction address temporal list" is not empty, instruction address retrieval unit 1c "extracts" one instruction address from the "instruction address temporal list". Hereinafter, the extracted instruction address is called the "current instruction address".

If the "current instruction address" exists in the "instruction address list" of the "current symbol information" (this indicates that the current instruction address has already been processed), all following processes are skipped and returns to the beginning of the process of address retrieval unit 1c.

On the other hand, if the "current instruction address" does not exist in the "instruction address list" of the "current symbol information", the "current instruction address" is "inserted" to the "instruction address list" of the "current symbol information", and then the process progresses to the next-instruction information extraction unit 1d explained below.

(2) On the other hand, if the "instruction address temporal list" is empty, "instruction address list" of the "current symbol information" is sorted in the increasing order (of address values). Then the "current symbol information" is "inserted" to the "symbol information list r1".

Then the process returns to the symbol address retrieval unit 1b.

<Next-Instruction Information Extraction Unit 1d>

Next-instruction information extraction unit 1d first extracts the binary data stored in the "binary data part" of the binary executable file, using the "current instruction address" to determine the stored position in the "binary data part", and assumes that the extracted binary data is a machine instruction. Then, next-instruction information extraction unit 1d decodes the machine instruction, generates the "next-instruction information" according to the following (1)-(5) processes, depending on the instruction type, and finally "inserts" the generated "next-instruction information" to the "next-instruction information temporal list".

(1) If the decoded machine instruction is a "simple branch instruction", in which the branch target address is statically determined, next-instruction information extraction unit 1d generates a "branch-type" next-instruction information from the branch target address.

(2) If the decoded machine instruction is a "data-dependent branch instruction", in which the branch target address is determined by a register value or a memory value, since the branch target address cannot be determined only by the decoded machine instruction, the following processes are executed.

First, "data-dependent branch information extraction unit 2" explained later is executed where the "jump table information" in the "jump table information list r3" is extracted. Then, "next-instruction information extraction unit 1d" generates a "branch-type" next-instruction information for each branch target address stored in the "branch target list r2" of the extracted "jump table information".

(3) If the decoded machine instruction is a "simple subroutine-call instruction", in which the call target address is statically determined, next-instruction information extraction unit 1d generates a "call-type" next-instruction information from the call target address.

(4) If the decoded machine instruction is a "data-dependent subroutine-call instruction", in which the call target address is determined by a register value or a memory value, next-instruction information extraction unit 1d sets the "data-dependent subroutine-call instruction flag" to "1". Here, resolving the call target address of "data-dependent subroutine call instruction" is done in a separate means which is described later.

(5) A machine instruction can potential execute "immediate-next" instruction (an instruction that is stored immediately after the current instruction) if none of the following cases apply:

A) Unconditionally executed "simple branch instruction" or "data-dependent branch instruction": since the branch target instruction becomes the only next-instruction.

B) Return instruction: return target address depends on the location of the subroutine-call instruction, and therefore cannot be determined statically.

C) CPU halt instruction: next-instruction is undefined since the CPU halts.

D) When the "current symbol" is the "entry symbol" and the decoded machine instruction is a call instruction to a "program termination symbol" (aforementioned symbol which handles program termination), this call instruction becomes the last instruction executed in the "entry symbol".

E) Invalid machine instruction (non-machine instruction): binary data which do not match any of the machine instructions specified in the instruction-set.

For all the cases other than the ones presented above (note that these other cases include conditional branch instructions, conditional data-dependent branch instructions and subroutine calls), "immediate-next" instruction can potentially be executed, and therefore next-instruction information extract unit 1d generates a "immediate-type" next-instruction information from the "immediate-next" instruction address.

Then the process progresses to address list update unit 1e.

<Address List Update Unit 1e>

From the "next-instruct ion information temporal list" generated by next-instruction information extraction unit 1d, each "next-instruction information" is "extracted" one-by-one from the "next-instruction information temporal list", and address list update is performed, depending on the type of the extracted "next-instruction information", as follows:

(1) On "immediate-type" next-instruction information, next-instruction address is "inserted" to the "instruction address temporal list".

(2) On "branch-type" next-instruction information, next-instruction address is "inserted" to "branch target address list r2" and "instruction address temporal list".

(3) On "call-type" next-instruction information, next-instruct ion address is "inserted" to "symbol address temporal list". There can be cases where a call target symbol is not included in the "executable symbols" extracted in the "symbol address preprocessing unit 1a", and this process ensures that all call target symbols are analyzed.

Afterwards, the process continues back to instruction address retrieval unit 1c.

<Mechanisms of Data-Dependent Branch Information Extraction Unit 2>

Mechanisms of "data-dependent branch information extraction unit 2" are explained.

FIG. 8 shows a sample C program with jump_test function which includes a switch-statement.

In the sample C program of FIG. 8, the switch-statement (switch(n){case 3; . . . case 8: . . . default: . . . }) inside jump_test function is implemented with a data-dependent branch instruction on the value of variable n.

<Behavior of a Data-Dependent Branch Instruction>

A data-dependent branch instruction is executed along with the preparation of the following instruction elements and data elements;

(1) Minimum and maximum values of the integer values of the case-statement labels: in the case of FIG. 8, minimum value is 3 and maximum value is 8. Hereinafter, they are described as min_case_value=3, max_case__value=8.

(2) Jump table: a jump table stores the first instruction address of each case-statement inside a switch-statement. Size of a jump table is usually given as max_case_value−min_case_value+1 (in the case of FIG. 8, 8−3+=6). First entry in the jump table contains the first instruction address corresponding to the case-statement "case min_case_value:". The last entry in the jump table contains the first instruction address corresponding to the case-statement "case max_case_value:".

Also, for each integer constant idx within the range (min_case_value<=idx<=max_case_value) which do not appear in the case labels, the first instruction address corresponding to the "default" statement is stored if "default" statement exists, otherwise the first instruction following the switch-statement block is stored.

(3) Jump table offset value: Normally, in the process of switch(n), jt_offset=n−min_case_value is calculated as the jump table offset value.

(4) Range check instructions of the jump table offset value: on the aforementioned jump table offset value jt_offset, a range check instructions determines if (jt_offset>=0) and (jt_offset<=max_jt_index=max_case_value−min_case_value) are both satisfied. If the range check result is "true", then the data-dependent branch target address exists in the jump table, otherwise if the range check result is "false", then the data-dependent branch target address does not exist in the jump table.

(5) Conditional branch instruction based on the range check result of the jump table offset value: if the aforementioned range check of the jump table offset value is "false", (which indicates that the data-dependent branch target address does not exist in the jump table), a conditional branch instruction redirects the program execution to the first instruction address corresponding to the "default" statement if "default" statement exists, otherwise redirects to the first instruction following the switch-statement block.

(6) Jump table storage memory load instruction and data-dependent branch instruction: if the range check result of the jump table offset value is "true", the data-dependent branch target address stored at address (jt_addr+jt_offset*a_size) in the memory is loaded, where "jt_addr" is the address of the jump table storage, and "a_st" is the word size of an address value in bytes (for example, 32-bit instruction-set has a 4-byte address, and 64-bit instruction-set has an 8-byte address). After loading the data-dependent branch target address, data-dependent branch is realized by assigning the obtained branch target address to the program counter. For some instruction-set, jump table storage memory load instruction and data-dependent branch instruction are implemented as a single machine instruction (such as ARMv5 and x86 instruction-sets).

<Relative Placement of Instructions Associated with Data-Dependent Branch Instruction>

(1) Range check instructions of the jump table offset value (2) Conditional branch instruction based on the range check result of the jump table offset value (3) Jump table storage memory load instruction (4) Data-dependent branch instruction Here, instructions (3) and (4) may be implemented as a single machine instruction (explained previously). Instruction (2) may be placed after instruction (4).

<Data-Dependent Branch Information Extraction Unit 2>

Figure 9:
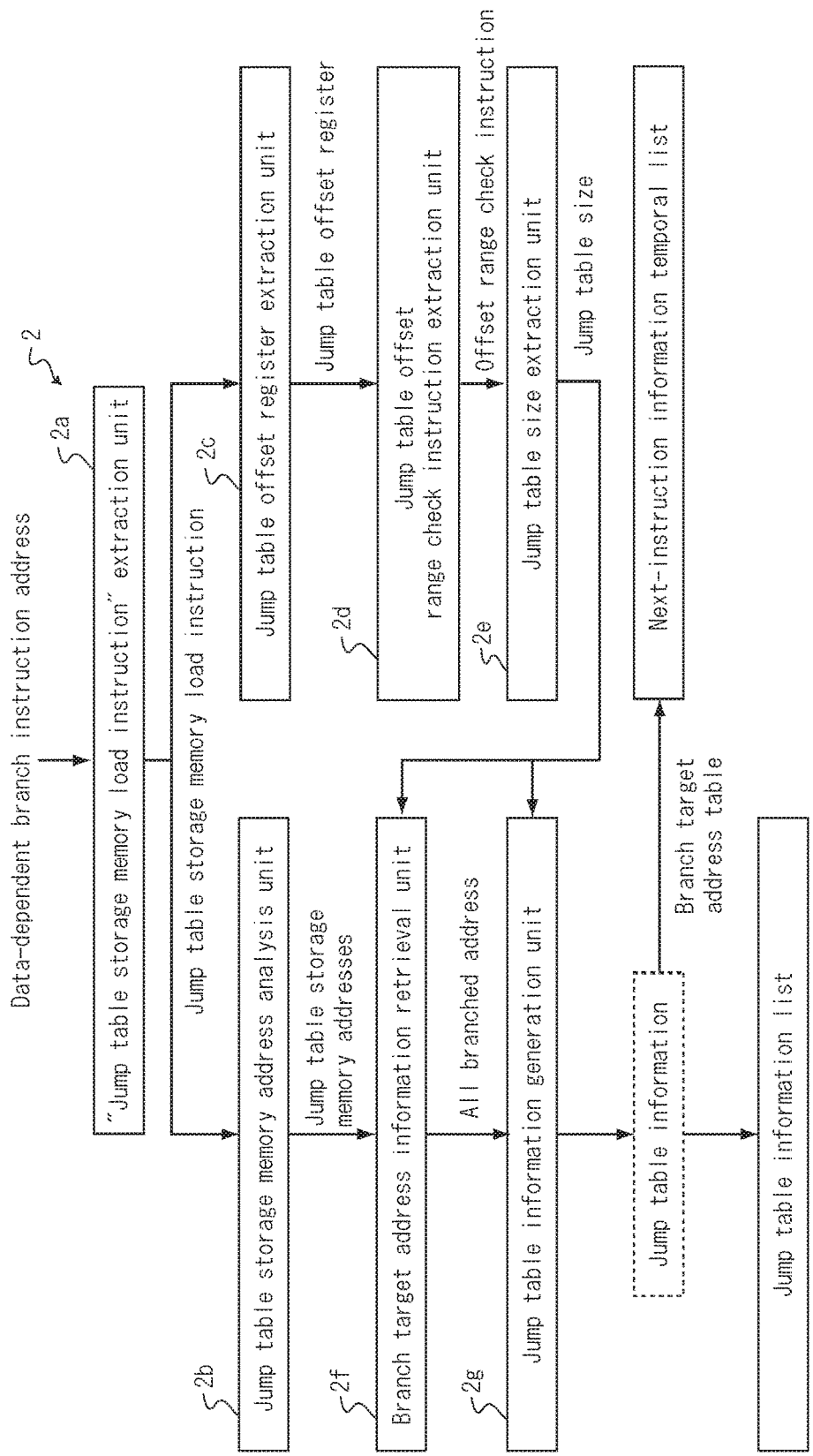
FIG. 9 is a function block diagram illustrating a data-dependent branch information extraction unit.

FIG. 9 shows the function block diagram of data-dependent branch information extraction unit.

Data-dependent branch information extraction unit 2 executes the following set of processes. Here, it is assumed that the data-dependent branch instruction address is given by aforementioned next-instruction information extraction unit 1d (FIG. 7).

(1) "Jump Table Storage Memory Load Instruction" Extraction Unit 2a

In the case where the data-dependent branch instruction directly performs the memory load, then this instruction itself is the "jump table storage memory load instruction". In other cases where a register value is assigned to the program counter in the data-dependent branch instruction, the memory load instruction on this register prior to this data-dependent branch instruction is determined to be the "jump table storage memory load instruction".

(2) Jump Table Storage Memory Address Analysis Unit 2b and Jump Table Offset Register Extraction Unit 2c On the jump table storage memory load instruction, if the memory address is computed in the form "base-address value (fixed address)+offset value", "base address value" is identified to be the "jump table storage memory address", and the register which holds the "offset value" is Identified to be the "jump table offset register".

Here, "base address value" can be give as an "absolute address" (address value itself is specified by the machine instruction), or as "PC-relative address" (address offset value to the current instruction address is specified by the machine instruction).

Here, if either the "jump table storage memory address" or the "jump table offset register" cannot be identified, it is determined that the data-dependent branch information extraction is not possible, and the process of "data-dependent branch information extraction unit 2" is terminated.

(3) Jump Table Offset Range Check Instruction Extraction Unit 2d and Jump Table Size Extraction Unit 2e "Range check instructions of the jump table offset value" which is placed before the "jump table storage memory load instruction" is identified here. In this range check instruction, previously extracted "jump table offset register" is compared against a constant value, that is the aforementioned value "max_jt_index" where the jump table size can be calculated as max_jt_index+1=max_case_value−min_case_value+1. If the "range check instructions of the jump table offset value" cannot be identified or if the range check instructions do not compare against constant values, then it is determined that the data-dependent branch information extraction is not possible, and the process of "data-dependent branch information extraction unit 2" is terminated.

(4) Branch Target Address Information Retrieval Unit 2f

From the "jump table storage memory address" and "jump table size" identified in the previous steps, all branch target addresses stored in the jump table are read and stored in the branch target address table (machine instruction address table).

(5) Jump Table Information Generation Unit 2g

From the given "data-dependent branch instruction" together with the "jump table size" and "branch target address table" identified by the aforementioned steps (1)-(4), "jump table information" of the data-dependent branch instruction is generated and is "inserted" to the "jump table information list". The generated "jump table information" of the data-dependent branch instruction is used in the aforementioned "next-instruction information extraction unit 1d".

Example 1 of Machine Instruction Analysis Process (ARMV5 Instruction-Set)

FIG. 10 shows the machine instructions and assembly instructions of ARMv5 instruction-set on the jump_test function in FIG. 8. Each line shows the instruction address (hexadecimal format), machine instruction data (hexadecimal format) and assembly instruction, along with the instruction type in the case the instruction modifies the program counter.

In the following explanations, it is assumed that the address 0x8340 of the function "jump_test" is retrieved from the "symbol address temporal list", and the succeeding machine instruction analysis process is explained thereafter.

Table 1 shows the machine instruction analysis process between 0x8340-0x834c.

TABLE 1

Machine instruction analysis process between 0x8340-0x834c

| Unit | Process overview | Updated information, list etc. |
|---|---|---|
| Symbol address retrieval unit 1b | Retrieve 0x8340 | Current symbol address: 0x8340<br>Instruction address list of the current symbol: {empty}<br>Instruction address temporal list: {0x8340} |
| Instruction address retrieval unit 1c | Retrieve 0x8340 | Instruction address list of the current symbol: {0x8340}<br>Instruction address temporal list: {empty} |
| Next-instruction information extraction unit 1d | Instruction analysis: Normal instruction | Next-instruction information temporal list: {(0x8344, "immediate")} |
| Address list update unit 1e | Insert 0x8344 | Instruction address temporal list: {0x8344} |
| Instruction address retrieval unit 1c | Retrieve 0x8344 | Instruction address list of the current symbol: {0x8340, 0x8344}<br>Instruction address temporal list: {empty} |
| Next-instruction information extraction unit 1d | Instruction analysis: Normal instruction | Next-instruction information temporal list: {(0x8348, "immediate")} |
| Address list update unit 1e | Insert 0x8348 | Instruction address temporal list: {0x8348} |
| Instruction address retrieval unit 1c | Retrieve 0x8348 | Instruction address list of the current symbol: {0x8340, 0x8444, 0x8348}<br>Instruction address temporal list: {empty} |
| Next-instruction information extraction unit 1d | Instruction analysis: Normal instruction | Next-instruction information temporal list: {(0x834c, "immediate")} |
| Address list update unit 1e | Insert 0x834c | Instruction address temporal list: {0x8348c} |
| Instruction address retrieval unit 1c | Retreive 0x834c | Instruction address list of the current symbol: {0x8340, 0x8444, 0x8348, 0x834c}<br>Instruction address temporal list: {empty} |
| Next-instruction information extraction unit 1d | Instruction analysis: Data-dependent branch instruction | (To data-dependent branch information extraction unit) |

A) In the first part of the machine instruction analysts process, starting from the instruction at symbol address 0x8340, next-instruction information extraction is sequentially executed. Instructions on 0x8340, 0x8344 and 0x8348 are "normal" instructions which do not modify the program counter, and therefore "immediate-next" instruction is the only next-instruction for each of these instructions. These next-instruction addresses are "inserted" by to the "instruction address temporal list" by the address list update unit 1c.

B) Instruction at 0x834c is a "data-dependent branch instruction", therefore the next-instruction information extraction process is executed in data-dependent branch information extraction unit 2.

Table 2 shows the process of data-dependent branch information extraction unit 2 on 0x834c.

TABLE 2

Process of data-dependent branch information extraction on 0x834c

| Unit | Process overview |
|---|---|
| Jump table storage memory load instruction extraction unit 2a | Analized instruction: 834c:979ff103 ldrls, pc, [pc, r3, lsl #2]<br>Alanysis result: ldrls instruction is a conditional load instruction, and is a load behavior to PC, and therefore, it can be identified as "data-dependent branch instruction" and also "jump table storage memory load instruction". |
| Jump table storage memory address analysis unit 2b | Analyzed address expression: [pc, r3, lsl #2]; MEM[ pc 30 (r3 << 2)]<br>Analysis result: Base address value = pc<br>Comment: Here, when pc is accessed by a load instruction, a value of current instruction address (0x834c) + 8 is used (according to ARMv5 instruction set specification)<br>--> Jump table storage memory address = 0x8354 |
| Jump table offset register extraction unit 2c | Analyzed address expression: [pc, r3, lsl #2]; MEM[pc + (r3 << 2)]<br>Analyzed result: Offset value = (r3 << 2) --> offset register = r3<br>Comment: ARMv5 instruction set is 32-bit (4 byte) address, and therefore, the offset value is given by r3 << 2 = r3 * 4 |

TABLE 2-continued

Process of data-dependent branch information extraction on 0x834c

| Unit | Process overview |
|---|---|
| Jump table offset range check instruction extraction unit 2d (An instruction placed before "jump table storage memory load instruction" is analyzed) | Analyzed instruction: 8348:e3530005 cmp r3, #5<br>Analysis result: cmp instruction prior to "Jump table storage memory load instruction" compares offset register r3 and 5.<br>--> cmp instruction is "Jump table offset range check instruction"<br>--> Jump table size = 5 + 1 = 6<br>Comment: Content of comparison of the cmp instruction is reflected in execution condition is (lower-or-same: unsigned comparison) of immediate-next ldrls instruction, and ((unsigned) r3 <= 5 is the execution condition of data-dependent branch instruction. |
| Branch target address information retrieval unit 2f | Loaded memory: The following 6 data is loaded from jump table storage memory address (0x8354) and jump table size (6)<br>8354: 00008384 andeq r8, r0, r4, lsl #7<br>8358: 0000839c muleq r0, ip, r3<br>835c: 0000836c andeq r8, r0, ip, ror #6<br>8360: 000083a4 andeq r8, r0, r4, lsr #7<br>8364: 0000836c andeq r8, r0, ip, ror #6<br>8368: 00008384 andeq r8, r0, r4, lsl #7<br>(Note: Descriptions of assembly instructions on the right side are not of original meaning)<br>Comment: Correspondence of case-statement and default-statement in switch-statement in FIG. 8<br>Branch target of n = = 3 (case 3:): 0x8384 (f = ftab[1];)<br>Branch target of n = = 4 (default:): 0x839c (return 0;)<br>Branch target of n = = 5 (case 5:): 0x836c (f = ftab[0];)<br>Branch target of n = = 6 (case 6:): 0x83a4 (f = ff1;)<br>Branch target of n = = 7 (case 7:): 0x836c (f = ftab[0];)<br>Branch target of n = = 8 (case 8:): 0x8384 (f = ftab[1];) |
| Jump table information generation unit 2g | Generated jump table information:<br>Data-dependent branch instruction address: 0x834c<br>Jump table size: 6<br>Branch target address table:{0x8384, 0x839c, 0x836c, 0x83a4, 0x836c, 0x8384} |

In data-dependent branch information extraction unit 2, "Jump table storage memory load instruction" is first identified to be the same as the data-dependent branch instruction at 0x834c, in which the jump (able storage memory address is identified to be 0x8354, and also the jump table size is identified to be 6. Finally, 6 branch target addresses {0x8384, 0x839c, 0x836c, 0x83a4, 0x836c, 0x8384} are read from address 0x8354 (jump table storage memory address), and the "jump table information" is generated.

Table 3 shows the process of next-instruction information extraction unit 1*d* at 0x834c and the process of machine instruction analysis unit 1 at 0x8350.

TABLE 3

Process of next-instruction information extraction at 0x834c and Process of machine instruction analysis at 0x8350

| Unit | Process overview | Updated information, list etc. |
|---|---|---|
| Data-dependent branch information extraction unit 2 | Generate jump table information of data-dependent branch instruction of 0x834c | Extracted branch target address table: {0x8384, 0x839c, 0x836c, 0x83a4, 0x836c, 0x8384} |
| Next-instruction information extraction unit 1d | Generate next-instruction infromation from branch target address table of jump table information and immediate-next instruction (since data-dependent branch instruction is a conditional instruction) | Next-instruction information temporal list: {(0x8384, "branch"), (0x839c, "branch"), (0x83a4, "branch"), (0x838c, "branch"), (0x8350, "immediate"),}<br>Comment: In branch target address table of jump table information, same addresses may appear for a plurality of times, but "insertion" of address information to next-instruction infromation temporal list is "non-duplicative," and therefore, duplicative next-instruction information is not inserted. |
| Address list update unit 1e | Update of branch-type next-instruction<br>Update of branch-type and immediate type next-instructions | Branch-target address list: {0x8384, 0x839c, 0x836c, 0x83a4}<br>Instruction address temporal list {0x8384, 0x839c, 0x836c, 0x83a4, 0x8350} |

TABLE 3-continued

Process of next-instruction information extraction at 0x834c
and Process of machine instruction analysis at 0x8350

| Unit | Process overview | Updated information, list etc. |
|---|---|---|
| Instruction address retrieval unit 1c | Retrieve 0x8350 | Current symbol instruction addres list: {0x8340, 0x8344, 0x8348, 0x834c, 0x8350} Instruction address temporal list (0x8384, 0x839c, 0x836c, 0x83a4) |
| Next-instruction information extraction unit 1d | Instruction analysis: Unconditional branch | Next-instruction information temporal list: {(0x839c, "branch")} |
| Address list update unit 1e | Insert 0x839c | Comment: 0x839c exists both in branch-target address list and instruction address temporal list, and therefore, both lists are not updated. |

A) On the instruction at 0x834c, 6 branch target addresses in the jump table information extracted by data-dependent branch information extraction unit 2 are retrieved. In addition, since the data-dependent branch, instruction at 0x834c is a conditional instruction (ldrls: ldr if (unsigned) "lower or same"), its "immediate-next" instruction at 0x8350 is also one part of the next-instruction group. As a result, the "next-instruction information temporal list", generated here, consists of the 6 branch target addresses in the jump table information and the "immediate-next" instruction address. Note that some of the 6 branch target addresses lake the same values, but the "next-instruction information temporal list" does not contain the same address values due to the non-duplicative "list insertion". In address list update unit 1e, 4 (distinct) branch target addresses are "inserted" to the "branch target address list", and 5 next-instruction address ("branch-type", "immediate-type") are "inserted" to the "instruction address temporal list".

B) Next, instruction address retrieval unit 1c "extracts" the last address entry 0x8350 in the "instruction address temporal list". The instruction at this address is an "unconditional branch instruction", and therefore the next-instruction information extraction unit 1d extracts the branch target address 0x839c as the next-instruction address. Then the address list update unit 1e "inserts" the branch target address 0x839c to "branch target address list" and "instruction address temporal list". Here, since 0x839c already exists in both lists, they are not updated.

Table 4 shows the machine instruction analysis process between 0x83a4-0x83b4.

TABLE 4

Machine instruction analysis process between 0x83a4-0x83b4

| Unit | Process overview | Updated information, list etc. |
|---|---|---|
| Instruction address retrieval unit 1c | Retreive 0x3a4 (Jump table branch target) | Instruction addres list of the current symbol: (0x8340, 0x8344, 0x8348, 0x834c, 0x8350, 0x83a4) Instruction address temporal list {0x8384, 0x839c, 0x836c} |
| Next-instruction information extraction unit 1d | Instruction analysis: Normal instruction | Next-instruction information temporal list: {(0x83a8, "immediate")} |
| Address list update unit 1e | Insert 0x83a8 | Instruction address temporal list {0x8384, 0x839c, 0x836c, 0x83a8} |
| Process between 0x83a8-0x83b0: omitted | | |
| "Data-dependent subroutine-call instruction" of 0x83ac is dealt with the same way as that of "Normal instruction" | | |
| Instruction address retrieval unit 1c | Retrieve 0x83b4 | Instruction addres list of the current symbol: {0x8340, 0x8344, 0x8348, 0x834c, 0x8350, 0x83a4, 0x83a8, 0x83ac, 0x83b0, 0x83b4} Instruction address temporal list {0x8384; 0x839c, 0x836c} |
| Next-instruction information extraction unit 1d | Instruction analysis: Return | Next-instruction information temporal list: {empty} --> No list updates |

Instructions on these addresses are "normal instructions" which only have "immediate-next" instructions as their next-instructions. The last instruction at 0x83b4 is a return instruction, and therefore the "instruction address temporal list" is not updated since it does not have a next-instruction. Here, in the intermediate addresses 0x83a8, 0x83ac, following two instructions appear.

Table 5 shows the machine instructions at 0x83ac, 0x83a8.

TABLE 5

| 83a8: | e1a0e00f | mov | lr, pc | (lr <-- 0x83a8 + 8) |
|---|---|---|---|---|
| 83ac | e12fff13 | bx | r3 | (Data-dependent subroutine-call) |

Here, the instruction at 0x83ac is a data-dependent branch instruction whose branch target address is given by the value of register r3. However, the previous instruction at 0x83a8 is a move instruction that copies the pc (program counter: actual value is the current instruction address 0x83a8+8, according to ARMv5 instruction-set specification) to the link register 1r, and therefore it can be determined that the instruction at 0x83ac is in fact a "data-dependent subroutine-call instruction".

The previous "data-dependent subroutine-call instruction" corresponds to the sample C program in FIG. 8, "func_pointer f; . . . f(n)". Here, variable f is a function pointer, and f(n) is a subroutine call through the function pointer f. While the "jump table information" of the "data-dependent branch instruction" is composed of fixed address values embedded in the memory, "call target address" of "data-dependent subroutine-call instructions" can be set (altered) during the program execution, and therefore extracting such call target address of data-dependent subroutine instruction is non-trivial in general.

Therefore, in this case, the next-instruction information of the data-dependent subroutine-call instruction is generated only for the "immediate-next" instruction, and resolving the call-target address of data-dependent sub routine-call instructions is handled by a different means explained later. In other words, next-instruction information extraction process for data-dependent subroutine-call instructions is handled in the some ways "normal instructions".

Table 6 shows other parts of the machine instruction analysis process.

The machine instruction analysis process after 0x836c progresses in the same manner as show in Table 4, involving a sequence of "normal instructions" (which take "immediate-next" instruction as next-instruction) and "return instructions" (which have no next-instruction).

Prior to analyzing the machine instruction at address 0x836c, the contents of "instruction address list" of the "current symbol information" and "instruction address temporal list" are as shown at the top rows in FIG. 6.

In row A of Table 6, where the instructions between 0x836c-0x8380 are analyzed, the last address 0x836c in the instruction address temporal list is first extracted, and from the instruction at 0x836c, next-instruction address ("immediate-next" instruction address) are repeatedly extracted until the return instruction at 0x8380 is reached.

In row B of Table 6, where the instructions between 0x839c-0x83a0 are analyzed, the last address 0x839c in the instruction address temporal list is first extracted, and from the instruction at 0x839c, next-instruction address ("immediate-next" instruction address) are repeatedly extracted until the return instruction at 0x83a0 is reached.

In row C of Table 6, where the instructions between 0x8384-0x8398 are analyzed, the last address 0x8384 in the instruction address temporal list is first extracted, and from the instruction at 0x8384, next-instruction addresses ("immediate-next" instruction addresses) are repeatedly extracted until the return instruction at 0x8398 is reached.

At the last part of row C of Table 6, instruction address retrieval unit 1c detects that the "instruction address temporal list" is "empty" (which indicates that all instructions in the current symbol have been processed), and "instruction address list" of the "current symbol information" is sorted in the increasing order of address values.

TABLE 6

Other parts of the machine instruction analysis process

| | Unit | Updated information, list etc. |
|---|---|---|
| Prior to 0x836 | Instruction address list of the current symbol | {0x8340, 0x8344, 0x8348, 0x834c, 0x8350, 0x83a4, 0x83a8, 0x83ac, 0x83b0, 0x83b4) |
| | Instruction address temporal list | {0x8384, 0x839c, 0x836c} <--Last address extracted |
| A | Analyzed instruction address | 0x836c--> (immediate)0x8370--> (immediate)0x8394-->(immediate)0x8378--> (immediate)0x837c--> (immediate)0x8380(return) |
| | Instruction address list of the current symbol | {0x8340, 0x8344, 0x8348, 0x834c, 0x8350, 0x83a4, 0x83a8, 0x83ac, 0x83b0, 0x83b4, 0x836c, 0x8370, 0x8374, 0x8378, 0x837c, 0x8380} |
| | Instruction address temporal list | {0x8384, 0x839c} <--Last address extracted |
| B | Analyzed instruction address | 0x839c--> (immediate)0x83a0(return) |
| | Instruction address list of the current symbol | (0x8340, 0x8344, 0x8348, 0x834c, 0x8350, 0x83a4, 0x83a8, 0x83ac, 0x83b0, 0x83b4, 0x836c, 0x8370, 0x8374, 0x8378, 0x837c, 0x8380, 0x839c, 0x83a0) |
| | Instruction address temporal list | {0x8384}<--Last address extracted |
| C | Analyzed instruction address | 0x8384--> (immediate)0x8388--> (immediate)0x838c-->(immediate)0x8390--> (immediate)0x8394--> (immediate)0x8398(return) |
| | Instruction address list of the current symbol | {0x8340, 0x8344, 0x8348, 0x834c, 0x8350, 0x83a4, 0x83a8, 0x83ac, 0x83b0, 0x83b4, 0x836c, 0x8370, 0x8374, 0x8378, 0x837c, 0x8380, 0x839c, 0x83a0, 0x8384, 0x8388, 0x838c, 0x8390, 0x8394, 0x8398} |
| | Instruction address temporal list | {empty}--> all instructions in the current symbol have been processed |
| D | Instruction address list of the current symbol after sorted in the increasing order | {0x8340, 0x8344, 0x8348, 0x834c, 0x8350, 0x836c, 0x8370, 0x8374, 0x8378, 0x837c, 0x8380, 0x8384, 0x8388, 0x838c, 0x8390, 0x8394, 0x8398, 0x839c, 0x83a0, 0x83a4, 0x83a8, 0x83ac, 0x83b0, 0x83b4} |

Example 2 of Machine Instruction Analysis Process
(x86(64-Bit) Instruction-Set)

FIG. 11 shows the machine instructions and assembly instructions of x86(64-bit) instruction-set on the jump_test function in FIG. 8. Each line shows the instruction address (hexadecimal format in six digits), machine instruction data (hexadecimal format delimited by two digits in the order from left to right) and assembly instruction, along with the instruction type in the case the instruction modifies the program counter.

In the following explanations, it is assumed that the address 0x400560 of the function "jump_test" is retrieved from the "symbol address temporal list" by the symbol address retrieval unit 1*b*, and the succeeding machine instruction analysts process is explained thereafter.

Table 7 shows the process of the machine instruction analysis unit 1 of jump_test function in FIG. 11 between 0x400560-0x40056e.

TABLE 7

| Unit | Process overview | Updated information, list etc. |
|---|---|---|
| Symbol address retrieval unit 1b | Retrieve 0x400560 | Current symbol address: 0x400560<br>Instruction address list of the current symbol: {empty}<br>Instruction address temporal list: {0x400560} |
| Instruction address retrieval unit 1c | Retrieve 0x400560 | Instruction address list of the current symbol: (0x400560)<br>Instruction address temporal list: {empty} |
| Next-instruction information extraction unit 1d | Instruction analysis: Normal instruction | Next-instruction information temporal list: {(0x400563, "immediate")} |
| Address list update unit 1e | Insert 0x400563 | Instruction address temporal list: {0x400563} |
| instruction address retrieval unit 1c | Retrieve 0x400563 | Instruction address list of the current symbol:; {0x400560, 0x400563}<br>Instruction address temporal list: {empty} |
| Next-instruction information extraction unit 1d | Instruction analysis: Normal instruction | Next-instruction information temporal list: {(0x400567, "immediate")} |
| Address list update unit 1e | Insert 0x400567 | Instruction address temporal list: {0x400567} |
| Instruction address retrieval unit 1c | Retrieve 0x400567 | Instruction address list of the current symbol: {0x400560, 0x400563, 0x400567}<br>Instruction address temporal list: {empty} |
| Next-instruction information extraction unit 1d | Instruction analysis: Normal instruction | Next-instruction information temporal list: {(0x40056a, "immediate")} |
| Address list update unit 1e | Insert 0x40056a | Instruction address temporal list: {0x40056a} |
| Instruction address retrieval unit 1c | Retrieve 0x40056a | Instruction address list of the current symbol: (0x400560, 0x400563, 0x400567, 0x40056a}<br>Instruction address temporal list: {empty} |
| Next-instruction information extraction unit 1d | Instruction analysis: Conditional branch instruction | Next-instruction information temporal list: {(0x400575, "branch")(0x40056c, "immediate")} |
| Address list update unit 1e | Insert branch target address | Branch target address list: {0x400575} |
|  | Insert next-instruction address | Instruction address temporal list: (0x400575, 0x40056c} |
| Instruction address retrieval unit 1c | Retrieve 0x40056c | Instruction address list of the current symbol: {0x400560, 0x400563, 0x400567, 0x40056a, 0x40056c}<br>Instruction address temporal list: {0x400575} |
| Next-instruction information extraction unit 1d | Instruction analysis: Normal instruction | Next-instruction information temporal list: {(0x40056e"immediate")} |
| Address list update unit 1e | Insert 0x40056e | Instruction address temporal list: {0x400575, 0x40056e} |
| Instruction address retrieval unit 1c | Retrieve 0x40056e | Instruction address list of the current symbol: {0x400560, 0x400563, 0x400567, 0x40056a, 0x40056c, 0x40056e}<br>Instruction address temporal list: {0x400575} |
| Next-instruction information extraction unit 1d | Instruction analysis: Data-dependent branch instruction | (To data-dependent branch information extraction unit) |

A) In the first part, starting from the instruction at symbol address 0x400560, next-instruction information extraction is sequentially executed. Instructions on 0x400560, 0x400563 and 0x400567 are "normal" instructions which do not modify the program counter, and therefore "immediate-next" instruction is the only next-instruction for each of these instructions.

B) Instruction at 0x40056a is a "conditional branch instruction", therefore the branch target address 0x400575 and "immediate-next" instruction address 0x40056c become the next-instruct ion addresses.

C) Instruction at 0x40056e is a "data-dependent branch instruction", therefore the next-instruction information extraction process is executed in data-dependent branch information extraction unit 2.

Table 8 shows the data-dependent branch information extraction process on 0x40056e in FIG. 11.

TABLE 8

| Unit | Process overview |
|---|---|
| | Data-dependent branch information extraction process on 0x40056e |
| Jump table storage memory load instruction extraction unit 2a | Analayzed instruction: 40056e:ff 24 c5 38 07 40 00 jmpq *0x400738(, % rax, 8)<br>Analysis result: It can be identified<br>that this jmpq instruction is "data-dependent branch instruction" which determines the branch target by memory data, and also "jump table storage memory load instruction". |
| Jump table storage memory address analysis unit 2b | Analyzed address expression: 0x400738(, % rax, 8):<br>MEM[0x400738 + (rax*8)]<br>Analysis result: Base address value = 0x400738<br>--> Jump table storage memory address = 0x400738 |
| Jump table offset register extraction unit 2c | Analyzed address expression: 0x400738(, % rax, 8):<br>MEM[0x400738 + (rax*8)]<br>Analysis result: Offset value = (rax*8) --> Offset register = rax<br>Comment: x86(64-bit) instruction set is 64-bit (8 byte) address, and therefore, the offset value is given by rax*8. |
| Jump table offset range check instruction extraction unit 2d (An instruction placed before "jump table storage memory load instruction" is analyzed) | Analyzed instruction 1: 40056c: 89 c0 mov % eax, % eax<br>Analysis result: mov instruction prior to "jump table storage memory load instruction" affects the offset register eax (lower 32 bits of 64-bit register rax), and clears the upper 32 bits with the lower 32 bits maintained as it is --> It is not the offset range check instruction<br>Analyzed instruction 2: 40056a:77 09 ja 400575<br>Analysis result: ja instruction prior to the mov instruction is a conditional branch instruction for avoiding the data dependent branch instruction when it is outside of the jump table --> It is not the offset range check instruction<br>Analyzed instruction 3: 400567:83 f8 05 cmp $0x5, % eax<br>Analysis result: cmp instruction prior to the ja instruction compares offset register eax and 5<br>--> cmp instruction is "jump table offset range check instruction"<br>--> Jump table size = 5 + 1 = 6<br>Comment: Content of comparison of the cmp instruction is reflected in branch condition (above: unsigned comparison) of the ja instruction after the instruction 2; and ((unsigned) eax > 5) is the branch condition of ja. |
| Branch target address information retrieval unit 2f | Loaded memory: The following 6 data is loaded from jump table storage memory address (0x400738) and jump table size (6)<br>400738:91 05 40 00 00 00 00 00 0000000000400591<br>400740:75 05 40 00 00 00 00 00 0000000000400575<br>400748:80 05 40 00 00 00 00 00 0000000000400580<br>400750:9a 05 40 00 00 00 00 00 000000000040059a<br>400758:80 05 40 00 00 00 00 00 0000000000400580<br>400760:91 05 40 00 00 00 00 00 0000000000400591<br>Comment: Correspondence of case-statement and default-statement in switch-statement in FIG. 8<br>Branch target of n = = 3 (case 3:): 0x400591 (f = ftab[1];)<br>Branch target of n = = 4 (default:): 0x400575 (return 0;)<br>Branch target of n = = 5 (case 5:): 0x400580 (f = ftab[0];)<br>Branch target of n = = 6 (case 6:): 0x40059a (f = ff1;)<br>Branch target of n = = 7 (case 7:): 0x400580 (f = ftab[0];)<br>Branch target of n = = 8 (case 8:): 0x400591 (f = ftab[1];) |
| Jump table information generation unit 2g | Generated jump table information:<br>Data-dependent branch instruction address: 0x40056e<br>Jump table size: 6<br>Branch target address table: {0x400591, 0x400575, 0x400580, 0x40059a, 0x400580, 0x400591} |

Here, "Jump table storage memory load instruction" is first identified to be the same as the data-dependent branch instruction at 0x40056e, in which the jump table storage memory address is identified to be 0x400738, and also the jump table size is identified to be 6. Finally, 6 branch target addresses {0x400591, 0x400575, 0x400580, 0x40059a, 0x400580, 0x400591} are read from address 0x400738 (jump table storage memory address), and the "jump table information" is generated.

Table 9 shows the next-instruction information extraction process at 0x40056e.

TABLE 9

Next-instruction information extraction process at 0x40056e

| Unit | Process overview | Updated information, list etc. |
|---|---|---|
| Data-dependent branch information extraction unit 2 | Generate jump table information of data-dependent branch instruction of 0x40056e | Branch target address list of jump table information: {0x400591, 0x400575, 0x400580, 0x40059a, 0x400580, 0x400591} |
| Next-instruction information extraction unit 1d | Generate next-instruction infromation from branch target address table of jump table information | Next-instruction information temporal list: {(0x400591, "branch"), (0x400575, "branch"), (0x400580, "branch"), (0x40059a, "branch")} Comment: In branch target address table of jump table information, same addresses may appear for a plurality of times, but "insertion" of address information to next-instruction infromation temporal list is "non-duplicative," and therefore, duplicative next-instruction information is not inserted. |
| Address list update unit 1e | Update of branch-type next-instruction Update of branch-type next-instruction | Branch-target address list: {0x400575, 0x400591, 0x400580, 0x40059a} Instruction address temporal list {0x400575, 0x400591, 0x400580, 0x40059a} |

On the instruction at 0x40056e, 6 branch target addresses in the jump table information extracted by data-dependent branch information extraction unit 2 are retrieved and the "next-instruction information temporal list" is generated. Note that some of the 6 branch target addresses take the same value, but the "next-instruct ion information temporal list" does not contain the same address values due to the non-duplicative "list insertion. In address list update unit 1e, 4 (distinct) branch target addresses are "inserted" to the "branch target address list r2" and the "instruction address temporal list", although since next-instruction address 0x400575 exists in both lists, only 3 new addresses are actually "inserted" here.

Table 10 shows the process of other parts of the machine instruction analysis unit 1.

TABLE 10

Other parts of the machine instruction analysis process

| | Unit | Updated information, list etc. |
|---|---|---|
| | Instruction address list of the current symbol | {0x400560, 0x400563, 0x400567, 0x40056a, 0x40056c, 0x40056e} |
| | Instruction address temporal list | {0x400575, 0x400591, 0x400580, 0x40059a}<--Last address extracted |
| A | Analyzed machine instruction address | 0x40059a--> (immediate)0x40059f--> (branch)0x400587--> (immediate)0x400589--> (immediate)0x40058d--> (immediate)0x400590 (return) |
| | Instruction address list of the current symbol | {0x400560, 0x400563, 0x400567, 0x40056a, 0x40056c, 0x40056e, 0x40059a, 0x40059f, 0x400587, 0x400589, 0x40058d, 0x400590) |
| | Branch target address list r2 | {0x400575, 0x400591, 0x400580, 0x40059a, 0x400587} |
| | Instruction address temporal list | 0x400575, 0x400591, 0x400580}<--Last address extracted |
| B | Analyzed machine instruction address | 0x400580--> (immediate)0x400587(already processed) |
| | Instruction address list of the current symbol | {0x400560, 0x400563, 0x400567, 0x40056a, 0x40056c, 0x40056e, 0x40059a, 0x40059f, 0x400587, 0x400589, 0x40058d, 0x400590, 0x400580} |
| | Instruction address temporal list | (0x400575, 0x400591}<--Last address extracted |

TABLE 10-continued

Other parts of the machine instruction analysis process

| | Unit | Updated information, list etc. |
|---|---|---|
| C | Analyzed machine instruction address | 0x400591--> (immediate)0x400598--> (branch)0x400587-->(already processed) |
| | Instruction address list of the current symbol | {0x400560, 0x400563, 0x400567, 0x40056a, 0x40056c, 0x40056e, 0x40059a, 0x40059f, 0x400587, 0x400589, 0x40058d, 0x400590, 0x400580, 0x400591, 0x400598} |
| | Instruction address temporal list | {0x400575}<--Last address extracted |
| D | Analyzed machine instruction address | 0x400575--> (immediate)0x400577--> (immediate)0x40057b (return) |
| | Instruction address list of the current symbol | {0x400560, 0x400563, 0x400567, 0x40056a, 0x40056c, 0x40056e, 0x40059a, 0x40059f, 0x400587, 0x400589, 0x40058d, 0x400590, 0x400580, 0x400591, 0x400598, 0x400575, 0x400577, 0x40057b} |
| | Instruction address temporal list | {empty}--> All instructions in the current symbol have been processed |
| | Instruction address list after sorted in the increasing order | {0x400560, 0x400563, 0x400567, 0x40056a, 0x40056c, 0x40056e, 0x400575, 0x400577, 0x40057b, 0x400580, 0x400587, 0x400589, 0x40058d, 0x400590, 0x400591, 0x400598, 0x40059a, 0x40059f} |

Prior to analyzing the machine instruction at address 0x40059a, the contents of "instruction address list" of the "current symbol information" and "instruction address temporal list" are as shown at the top rows in FIG. 10.

The machine instruction analysis process after 0x40059a progresses in the same manner, involving a sequence of "normal instructions", "unconditional branch instruction" or "data-dependent subroutine-call instruction", followed by a "return instruction" or "already processed" instructions. Here, resolving the call-target address of data-dependent subroutine-call instructions is handled by a different means explained later.

In row A of Table 10, where the instructions at 0x40059a, 0x40059f, 0x400587, 0x400589, 0x40058d, 0x400590 are analyzed, the last address 0x40059a in the instruction address temporal list is first extracted, then next-instruction address ("immediate-type" or "branch-type") are repeatedly extracted until the return instruction at 0x400590 is reached.

In row B of Table 10, where the instructions at 0x400580, 0x400587 are analyzed, the last address 0x400580 in the instruction address temporal list is first extracted, then next-instruction address 0x400587 is extracted which is determined to be "already processed" (since this address already exists in the instruction address list of the current symbol).

In row C of Table 10, where the instructions at 0x400591, 0x400598, 0x400587 are analyzed, the last address 0x400591 in the instruction address temporal list is first extracted, then next-instruction address ("immediate-type" or "branch-type") is repeatedly extracted until the instruction at 0x400587 is reached which is found to be "already processed" (since this address already exists in the instruction address list of the current symbol).

In row D of Table 10, where the instructions at 0x400575, 0x400577, 0x40057b are analyzed, the last address 0x400575 in the instruction address temporal list is first extracted, then next-instruct ion address ("immediate-type") is repeatedly extracted until the return instruction at 0x40057b is reached.

At the last part of row D of Table 10, instruction address retrieval unit 1c detects that the "instruction address temporal list" is "empty" (which indicates that all instructions in the current symbol have been processed), and "instruction address list" of the "current symbol information" is stored in the increasing order of address values.

<Instruction-Set Simulator Source Program Output Unit 3>

Figure 12:
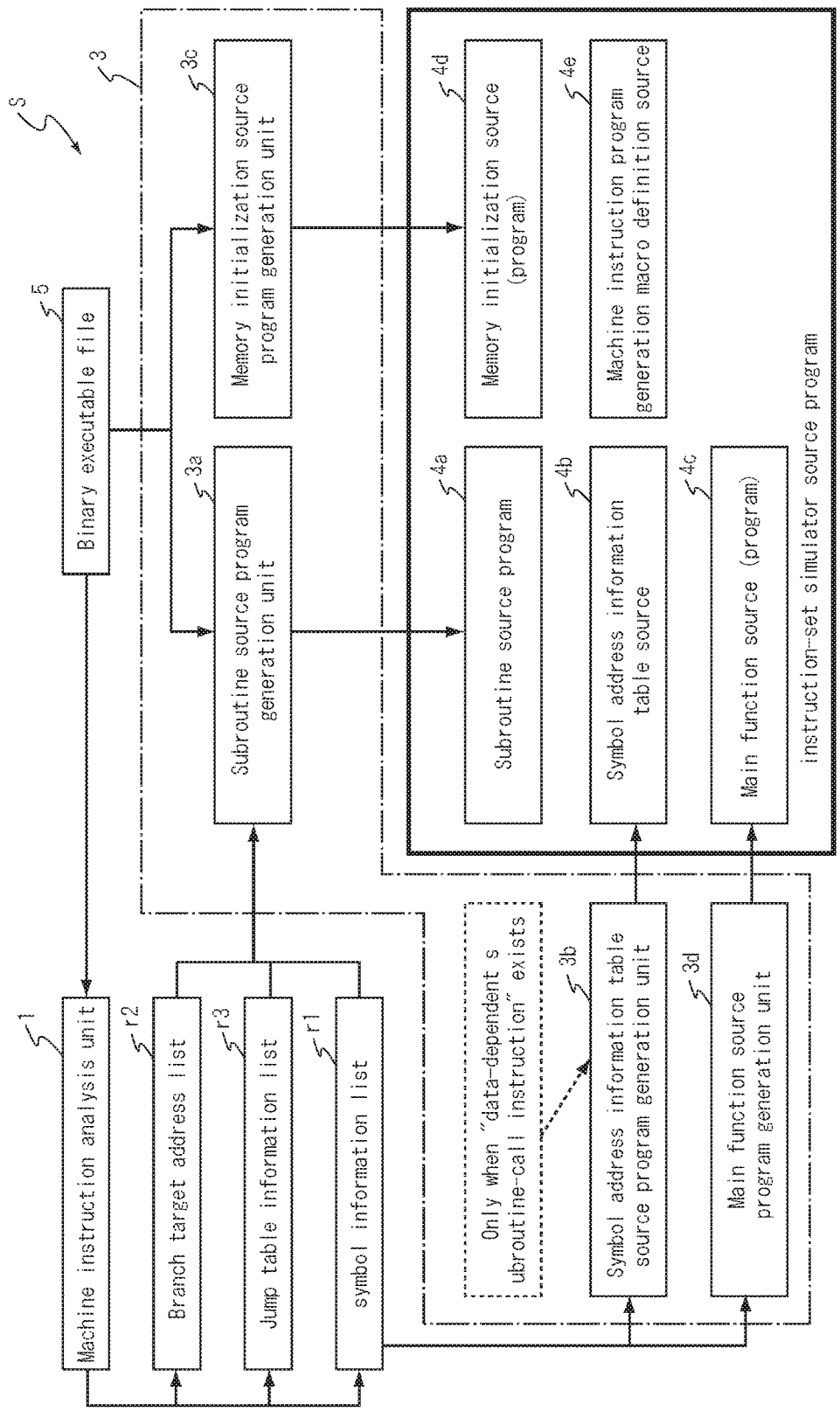
FIG. 12 is a function block diagram illustrating a structure of an instruction-set simulator together with the binary executable file 5 and the ISS source program generated by the instruction-set simulator.

FIG. 12 shows the composition of an instruction-set simulator together with the binary executable file 5 and the ISS source program generated by the instruction-set simulator. Instruction-set simulator S is composed of the machine instruction analysts unit 1 and an instruction-set simulator source program output unit 3.

Instruction-set simulator source program output unit 3 generates and emits the instruction-set simulator source program from the information in symbol information list r1, branch target address list r2 and jump table information list r3 generated by the machine instruction analysis unit 1.

Instruction-set simulator source program output unit 3 is composed of a subroutine source program generation unit 3a, a symbol address information table source program generation unit 3b, a memory initialization source program generation unit 3c, and a main function source program generation unit 3d.

An instruction-set simulator source program 4 is composed of a subroutine source program 4a, a symbol address information table source 4b, a main function source (program) 4c, a memory initialization source (program) 4d, and a predefined machine instruction program generation macro definition source 4e.

<CPU Resource Data Structure Description in the Instruction-Set Simulator Source Program>

Here, the data structure description of the CPU resource, which is required for the generation of the instruction-set simulator source program 4, is explained.

Here, a CPU resource refers to memories and CPU registers (general-purpose registers, internal state registers, etc.) in which the states of such CPU resource are essential in reproducing the detail CPU hardware behavior on a simulation program. FIG. 13 shows an example of CPU resource data structure descriptions for an instruction-set simulator for ARMv5 instruction-set, and FIG. 14 shows macro definitions for accessing the CPU resource and for calculating the instruction execution conditions.

(1) Memory: a CPU memory is declared as char-type (8-bit) array. MEM_SIZE (memory size) is obtained by calculating the required memory size (including stack memory) calculated from information included in the program header table of the binary executable file and other information.
(2) General-purpose registers: general-purpose registers are declared as 32-bit unsigned integer array of 16 elements. Among these registers, r[13] is used as a stack pointer (sp), r[14] is used as a link register (lr: stores the return address of a subroutine), r[15] is used as a program counter (pc).
(3) State registers: 6 state registers (cr, cc, cv, cls, cge, cle) are declared as 32-bit unsigned integer variable. These registers are used to calculate the instruction execution conditions which store the CPU slates. On the actual CPU that executes the ARMv5 instruction-set, 4 internal register bits (Z: zero, N: negative, V: overflow, C: carry) are only required to calculate 14 types of execution conditions. It is indeed possible to declare the state registers with only 4 bits in the same manner, the aim of using 6 32-bit variables is to minimize the amount of instruction execution condition calculations on the software (explained later).
(4) Macro definitions for CPU resource access
   A) _r_(n): a macro to access the n-th general-purpose register
   B) _R_,_C_,_V_,_LS_,_LE_,_GE_: macros to access the 6 state register variable
   C) _m8_, _m16_, _m32_: macros to read or write 8-bit data, 16-bit data and 32-bit data, respectively.
(5) Macro definitions for computing instruction execution conditions: using the aforementioned macros to access the 6 state register variables, calculation of instruction execution conditions are described as program source macro. There are 15 types of instruction execution conditions as follows (In the following, condition expression of the state register using the normal 4-bit state bits Z/N/V/C, and condition expression using the macros to access the 6 state register variables are compared.):
   A) AL(unconditional):always execution the instruction
   B) EQ(equal condition), NE(not equal condition)
      1) Z/N/V/C expression: EQ(Z==1), NE(Z==0)
      2) 6 state variable expression: EQ(_R_==0), NE(_R_!=0)
   C) CS (carry set condition) CC (carry clear condition)
      1) Z/N/V/C expression: CS(C==1), CC(C==0)
      2) 6 state variable expression: CS(_C_!=0), CC(_C_==0)
   D) MI(minus condition)PL(plus condition)
      1) Z/N/V/C expression: MI(N==1), PL(N==0)
      2) 6 state variable expression: MI(((S32)_R_)<0), PL((S32)_R_)>=0)
   E) VS (overflow condition)VC (no overflow condition)
      1) Z/N/V/C expression: VS(V==1), VC(V==0)
      2) 6 state variable expression: VS(((S32)_V_)<0), VC(((S32)_V_)>=0)
   F) HI(higher condition)LS(tower or same condition):unsigned comparison
      1) Z/N/V/C expression: HI(C==1 && Z==0), LS(C==0||Z==1)
      2) 6 state variable expression: HI(_LS_==0), LS(_LS_!=0)
   G) GE (greater or equal condition) LT (less than condition):signed comparison
      1) Z/N/V/C expression:GE (N==V), LT(N!=V)
      2) 6 state variable expression:GE(_GE_!=0), LT(_GE_==0)
   H) GT (greater than condition) LE (less or equal condition):signed comparison
      1) Z/N/V/C expression:GT(Z==0 && N==VV), LE(Z==1 && N!=V)
      2) 6 state variable expression:GT(_LE_==0), LE(_LE_=0)

On the 14 types of instruction execution conditions excluding AL condition, condition expression using the normal 4-bit state bits Z/N/V/C require 1 to 3 bits, where as condition expression using the 6 state variables (cr, cc, cv, cls, cge, cle) require only a single variable. This translates to smaller number of calculations on the program execution.

<Machine Instruction Program Generation Macro Definition Source 4e>

A machine instruction program generation macro refers to a program description method for generating parts or the program execution description using several macro arguments (such as variables, constants, strings).

This machine instruction program generation macro is defined for all machine instruction types (definition of such macro is, of course, customized for each target-CPU's instruction-set). Here, since a machine instruction program generation macro definition source 4e is independent of the target binary executable program, it is prepared beforehand.

FIG. 15 shows 4 machine instructions, and FIG. 16 shows the machine instruction program macro calls of the 4 machine instructions in FIG. 15. Below, each of machine instruction program generation macros is explained.

<SUB Macro Definition(Sub Instruction) and CMP Macro Definition(cmp Instruction)>

FIG. 17 shows the macro definitions of SUB macro and CMP macro.

SUB macro is called on sub instructions, and CMP macro is called on cmp instructions. FIG. 18 shows the macro definitions of _SUB_macro which are both called from SUB and CMP macros.

FIG. 19 shows the macro definitions called from _SUB_ macro.

(I) Macro arguments in SUB macro and CMP macro:
   c(string to specify execution condition): used as the macro argument of _COND_ (explained later)
   v(instruction bit-fields):contains instruction attributes (mainly for specifying the updating conditions of the internal state bit registers)
   rd(destination register ID):register ID for storing the calculation result
   rn(first operand register ID):register ID of the first operand
   sh(shift attribute):shift attribute for the second operand
   rm(second operand register ID):register ID of the second operand
   val immediate value):immediate value in case the second operand is an immediate (constant)
   pc(instruction address):not relevant to instruction behavior in this case
(2) _SUB_macro (FIG. 18): internal macro called from both SUB macro and CMP macro
   Here, the role of each macro arguments in _SUB_ macro are as follows:
   w_rd(output attribute); if (w_rd==1), store the calculation result in rd register, otherwise rd register is not updated
   cin(carry input):carry input for subtraction operation
   swap_op(swap attribute):if (swap_op==1), swap the two operands, otherwise there is no change
   c, v, rd, rn, sh, rm, val:same as SUB/CMP macro arguments (3) _COND_macro (FIG. 14): called from inside _SUB_ macro, its definition "_COND_(c)" is given as "if _COND_##c##". Here, "##" is a token concatenation preprocessor. For example, "_COND_(AL)" is replaced with "if _COND_AL_", and _COND_AL_macro is then replaced with (1).
(4) slate register variable update description: as described inside _SUB_macro, the 6 slate register variables update the values according to the specified expressions.
(5) Other macros called from inside _SUB_ macro is shown in FIG. 19.

IMM(rm, val): in the macro call on SUB and CMP in FIG. 16, macro argument "sh" is given as "IMM". Therefore, the description "sh(rm, val)" in FIG. 18 is replaced with "IMM(rm, val)", and in this IMM macro definition, it is finally replaced with "(val)".

_fS_(v):replaced with ((v>>2) & 1), where this operation is equivalent to extracting the lower 2 bits of v (counting from the 0th bit).

_fB_(v), _fH_(v), _fP_(v), _fU_(v), _fW_(v):in the same manner as _fS_(v), certain set of bits of v ere extracted (these are called from STR macro described later).

<STR Macro Definition(Push Instruction)>

FIG. 20 shows the definition of STR macro called from FIG. 16, and FIG. 21 shows the definitions of _ADDR_ and _D_CACHE_SIM macros called from STR macro. (Note: in the original assembly instruction description "push {lr}" (in FIG. 15) is equivalent to the CPU behavior of decrementing the stack pointer (sp) (arm.r[13]) by 4 (1 word) then storing 1*r* register (arm.r[14]) to memory at address sp, which is the stack memory region. In ARMv5 instruction-set. "push {lr}" is implemented with a str instruction.)

(1) Macro arguments in STR macro:
c(string to specify execution condition): same as SUB and CMP macros
v(instruction bit-fields):contains instruction attributes such as address offset calculation method, address register update flag, data-type
rd(store data register ID):register ID of the store data
rn(base address register ID):register ID of the base address
sh(shift attribute):shift attribute of the second operand
rm(offset register ID):register ID of the offset
val(immediate value):immediate value in case the second operand is an immediate (constant)
pc(instruction address):current instruction address(if the base address register is pc (program counter), current instruction address (with a predefined offset) is used as used as base address)

(2) _ADDR_macro: called from inside STR macro, generates the address calculation source program. Macros _fU_ (v), _fP_(v), _fW_(v) called from _ADDR_specify the instruction attributes such as address offset calculation method, address register update flag (on register _r_(n)).

(3) Program counter handling: according to ARMv5 Instruction-set specification, when the program counter (pc) is used as the base address, (current instruction address+8) becomes the base address (defined in _ADDR_macro). Also if the program counter is the store data value, the stored data value becomes (current instruction address+12), which is described in assignment to variable d in STR macro.

(4) Store data type: according to the instruction attributes given by _fB_(v), _fH_(v) (in FIG. 20), either an 8-bit integer type (U8), 16-bit integer type (U16) or 32-bit integer type (U32) is selected as the memory write operation (using the macros _m8_, _m16_, _m32_defined in FIG. 14).

(5) Cache model: D_CACHE_SIM macro provides a mechanism to call the data cache simulation function D_Cache_Sim (to be defined elsewhere) if cache simulation is enabled (when "ENABLE CACHE MODEL" is defined elsewhere) (in FIG. 21). If the cache simulation is not enabled, D_CACHE_SIM(addr, isRead) (in FIG. 21) is replaced by an empty string.

<LDR Macro Definition(Pop Instruction)>

FIG. 22 shows the definition of LDR macro called from FIG. 16. (Note: in the original assembly instruction description "pop {pc}" (in FIG. 15) is equivalent to the CPU behavior of loading the "return address" from the stack memory (at address sp (arm.r[13]), then increment sp by 4 (1 word)) which was previously stored by "push (lr) instruction". In ARMv5 instruction-set, "pop {pc}" is implemented with a ldr instruction.)

Here, arguments of the LDR macro (memory load) and macros called inside LDR macro are almost the same as the STR macro (memory store). On the other hand, behaviors specific to memory load operations are as follows:

(1) Bit extensions on the load data: if (_fS_(v)==1), the loaded data is signed, in which case the upper bits of 8-bit or 16-bit data are sign-extended. If (_fS_(v)==0), the loaded data is unsigned, in which case the upper bits of 8-bit or 16-bit data are zero-extended.

(2) Load behavior to the program counter (pc): In LDR macro, load to the program counter is assumed to be a "return instruction", in which a return-statement is inserted in the generated program. The aforementioned data-dependent branch instructions are also implemented with a ldr instruction to pc, in which case this LDR macro is not used, but a separate scheme by the "data-dependent branch instruction source program generation unit 3*a*8", described later, implements the program source generation.

<Source Program Description After Macro Expansion of the Macro Call Descriptions>

Previous 4 macro calls (SUB, STR, CMP, LDR in FIG. 16) for generating the source programs of the 4 machine instructions will be macro-expanded (by the compiler's preprocessor) to the program description shown in FIG. 23.

<Subroutine Naming Conventions on the Program Source Description>

Subroutine naming conventions on the subroutine program source 4*a* in FIG. 12 is explained.

In the subroutine naming conventions, it should be noted that, for example in a C program, there exists several reserved names on predefined functions, such as "main" function and "exit" function, and therefore, the subroutine names in the generated C program source should avoid such reserved subroutine names.

The subroutine naming convention employed in the embodiment concatenates a predefined prefix (such as "_my_") in front of the "symbol name string" defined in the "symbol information" to generate the subroutine name on the generated program source. For example, from symbol name "jump_test" and a predefined prefix "_my_", generated source program subroutine name becomes "_my_jump_test".

If a symbol is not registered in the symbol table of the binary executable file, or if the symbol table is absent, "symbol name string" is generated in the aforementioned "symbol naming convention". For such symbols, the same predefined subroutine prefix can still be applied. For example, an unregistered symbol at address 0x1234 can have the "symbol name string" generated as "func_1234", then the generated source program subroutine name becomes "_my_func_1234".

<Subroutine Source Program Generation Unit 3a>

Figure 24:
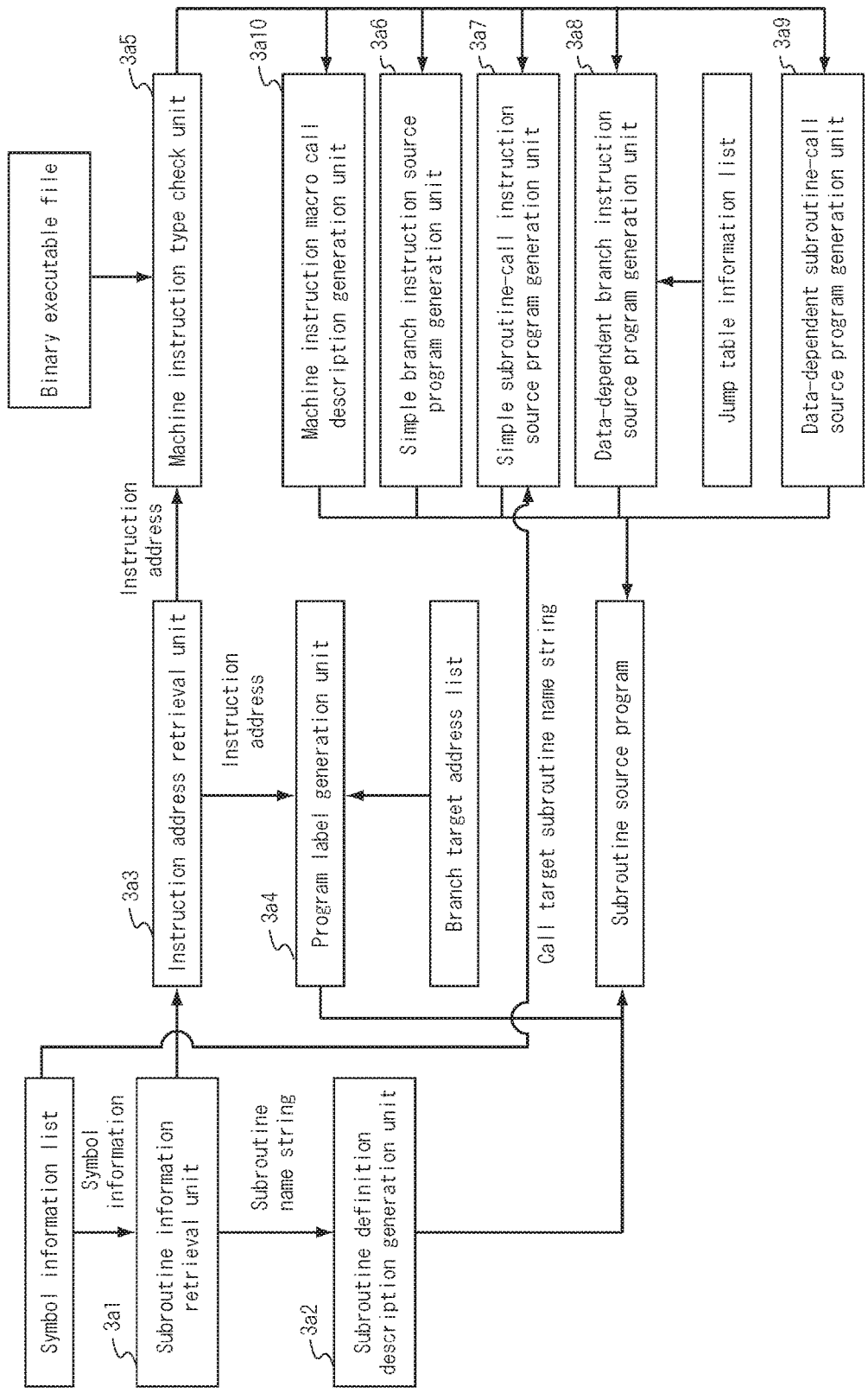
FIG. 24 is a function block diagram illustrating a subroutine source program generation unit.

Here, the subroutine source program generation unit 3a (FIG. 24) which generates the subroutine source program composed of the machine instruction program generation macro calls shown in FIG. 16 is explained.

<Subroutine Information Retrieval Unit 3a1>

From the symbol information list r1 generated by the aforementioned machine instruction analysis unit 1, one symbol information is extracted. Hereinafter, the extracted symbol information will be called the "current symbol information".

<Subroutine Definition Description Generation Unit 3a2>

From the "symbol name string" included in the current symbol information, "subroutine name string" is generated according to aforementioned subroutine naming convention, then a subroutine definition description is generated as shown in FIG. 25. In the first embodiment, subroutine definition which does not have a return value (void type) and does not have any argument is generated.

<Instruction Address Retrieval Unit 3a3>

Instruction address retrieval unit 3a3 sequentially reads the instruction address from the first element in the instruction address list in the current symbol information. Hereinafter, the instruction address read from the instruction address list is called the "current instruction address".

<Program Label Generation Unit 3a4>

If the current instruction address exists in the branch target address list r2 (generated by the machine instruction analysis unit 1), program label is generated before the machine instruction program generation macro call for the current instruction, so that the branch instruction can use the goto-statement to branch to the corresponding branch target instruction on the source program. In aforementioned example of jump_test function for ARMv5 instruction-set, branch target address list generated by the machine instruction analysis process is {0x8384, 0x839c, 0x836c, 0x83a4} (refer to Table 3). C program labels corresponding to these branch target addresses can be named, for example, as "L_08384:", "L_0839c:", "L_0836c:". "L_083a4:", respectively.

<Machine Instruction Type Check Unit 3a5>

Machine instruction type check unit 3a5 first extracts the binary data stored in the "binary data part" of the binary executable file, using the current instruction address to determine the stored location in the "binary data part". Assuming that the extracted binary data is a machine instruction, the machine instruction is decoded (in the same manner as aforementioned next-instruction information extraction unit 1d) and instruction types are determined as follows:

If the decoded machine instruction is a "simple branch instruction", in which the branch target address is statically determined. The process continues to simple branch instruction source program generation unit 3a6.

If the decoded machine instruction is a "simple subroutine-call instruction", in which the call target address is statically determined, the process continues to simple subroutine-call instruction source program generation unit 3a7.

If the decoded machine instruction is a "data-dependent branch instruction", in which the branch target address is determined by a register value or a memory value, the process continues to data-dependent branch instruction source program generation unit 3a8.

If the decoded machine instruction is a "data-dependent subroutine-call instruction", in which the call target address is determined by a register value or a memory value, the process continues to data-dependent subroutine-call source program generation unit 3a9.

For all other cases, the process continues to machine instruction macro call description generation unit 3a10.

<Machine Instruction Macro Call Description Generation Unit 3a10>

Here, a detail information of the machine instruction behavior is extracted as follows: Instruction type: machine instruction source program generation macro name is identified. For SUB, STR, CMP, LDR macro calls in FIG. 16, these macro names are determined by such instruction type.

register ID: operand register IDs and destination register ID are identified. In the example of FIG. 16, below are the relevant register IDs:

SUB(AL,0x020, 3, 0, IMM,−1, . . . ) register IDs:3, 0

STR(AL,0x009, 14, 13, IMM,−1, . . . ) register IDs: 14, 13

CMP(AL,0x024, 0, 3, IMM,−1, . . . ) register IDs:0, 3

LDR(AL,0x012, 15, 13, IMM,−1, . . . ) register IDs:15, 13

In the above examples, "−1" is set to the macro argument "rm" (second operand register ID for SUB and CMP, offset register ID for STR and LDR). All of these cases take the immediate values for the second operand or offset operand, and therefore "rm" macro arguments are ignored here.

Instruction attribute information: various attribute information which determines the detail behavior the instruction is extracted. In the example of FIG. 16, follow data corresponds to such instruction attributes:

SUB(AL,0x020, 3, 0, IMM,−1, 0x00000003, 0x08340)

AL:execution condition string(always:unconditional)

0x020:instruction bit-fields "v" (no internal state bit updates)

IMM: shift attribute "sh"(second operand is an immediate)

0x00000003:immediate value

STR(AL,0x009, 14, 13, IMM,−1, 0x00000004, 0x08344)

AL:execution condition string(always:unconditional)

0x009:instruction bit-fields "v"(pre-decrement 32-bit store)

IMM:shift attribute "sh"(address offset is an immediate)

0x00000004:immediate value

CMP(AL,0x024, 0, 3, IMM,−1,0x00000005, 0x08348)

AL:execution condition string(always:unconditional)

0x024:instruction bit-fields "v" (FIG. 17) (update internal state bit registers)

IMM:shift attribute "sh"(second operand is an immediate)

0x00000005:immediate value

LDR(AL,0x012, 15, 13, IMM,−1,0x00000004, 0x08380)

AL:execution condition string(always:unconditional)

0x012:instruction bit-fields "v"(post-increment, 32-bit load)

IMM:shift attribute "sh"(address offset is an immediate)

0x00000004:immediate value

According to these detail instruction attributes, "machine instruction source program generation macro call description" are generated.

<Simple Branch Instruction Source Program Generation Unit 3a6>

For simple branch instructions whose branch target address is statically determined, goto-statement (unconditional branch) is used to describe the program branching.

Below, unconditional branch instruction in FIG. 26, which is taken from FIG. 10, line 6, is used to explain the source program generation steps.

Here, branch target address is 0x839c, where the corresponding program label "L_0839c:" is inserted by aforementioned program label generation unit 3a4 before the instruction at 0x839c (FIG. 10, line 25), therefore a goto-statement to this label is generated, as shown in FIG. 27.

Also, for the case of conditional branch Instructions, instead of "AL" (always: unconditional) in the macro call "_COND_(AL)", corresponding execution condition string (such as "EQ", "NE", etc.) can be inserted to describe conditional program branching on the source program.

<Simple Subroutine-Call Instruction Source Program Generation Unit 3a7>

For simple subroutine-call instructions whose call target address is statically determined, call-statement is used on the source program.

Simple subroutine-call machine instruction to "jump_test" symbol in FIG. 28 is used to explain the source program generation steps.

Here, using the call target address of the machine instruction in FIG. 28 as a key, call target symbol's symbol Information is searched from the symbol information list r1, then its subroutine name string is generated according to the aforementioned subroutine naming convention on its symbol name string, and a call-statement using the generated subroutine name string is generated as shown in FIG. 29.

Also, for the case of conditional subroutine call instruction (which is possible in ARMv5 instruction-set), instead of "AL" (always: unconditional) in the macro call "_COND_(AL)", corresponding execution condition string (such as "EQ", "NE", etc.) can be inserted to describe conditional subroutine call on the source program.

<Data-Dependent Branch Instruction Source Program Generation Unit 3a8>

For data-dependent branch instructions whose branch target address is determined by a register value or a memory value, the corresponding jump table information is searched, using the data-dependent branch instruction address as a key, from the jump table information list r3 generated by the machine instruction analysis unit 1. Then, the branch target address table stored in the jump table information is used to generate the source program which implements such data-dependent program branching.

Below, data-dependent branch instruction in FIG. 30, which is taken from FIG. 10, lines 5 and 6, is used to explain the source program generation steps.

Here, the jump table information on the data-dependent branch instruction at address 0x834c is as follows:

Jump table size: 6
Branch target address table: {0x8384, 0x839c, 0x836c, 0x83a4, 0x836c, 0x8384}

From the jump table information and the execution condition of the data-dependent branch instruction (on instruction "ldrls", its execution condition is "ls": (unsigned) lower or same), source program shown in FIG. 31 is generated.

Here, each case-statement is followed by a goto-statement whose target label corresponds to the branch target address. Note that "case 0:" and "case 5:" do not appear since their branch target address is the same as "default:"case.

<Data-Dependent Subroutine-Call Source Program Generation Unit 3a9>

For data-dependent subroutine-call instructions whose call target address is determined by a register value or a memory value, a "symbol address information" which is generated by a symbol address information table source generation unit 3b (described later) is used to resolve the call target symbol during the source program execution.

Below, data-dependent subroutine-call instruction in FIG. 32, which is taken from FIG. 10, lines 28 and 27, is used as an example to explain the source program generation steps.

Here, as mentioned previously, the instruction at 0x83ac is a data-dependent (unconditional) branch instruction whose branch target address is given by the value of register r3, however the previous instruction at 0x83a8 is a move instruction which copies the pc (actual value is 0x83a8+8) to the link register 1r, and therefore the two consecutive instructions behave as a single data-dependent subroutine-call instruction. Therefore, these two instructions are converted into the source program description as shown in FIG. 33.

Also, for the case of conditional data-dependent subroutine call instruction, instead of "AL" (always: unconditional) in the macro call "_COND_(AL)", corresponding execution condition string (such as "EQ", "NE", etc.) can be inserted to describe conditional data-dependent subroutine call on the source program.

Here, the behavior of the source program description in FIG. 33 is explained in the symbol address information table source generation unit 3b, described later.

<Subroutine Source Program Output Example>

On the machine instruction description of ARMv5 instruction-set on "jump_test" function in FIG. 10, its subroutine source program output example is shown in FIG. 34.

<Symbol Address Information Table Source Program Generation Unit 3b>

Here, the information required by the source program generated by aforementioned data-dependent subroutine-call instruction source program generation unit 3a9 is explained together with the source generation steps. This process is required only if "data-dependent subroutine-call instruction flag" is set to 1 on a symbol information.

First, _FP_INFO_ in FIG. 33 is a data structure to store the symbol address information as shown in FIG. 35. Here, "addr" is the symbol address (in the machine instruction) and "func" is a function pointer that points to the source program subroutine of the corresponding symbol.

Also, _GET_FPI_(_r_(3)) in FIG. 33 is a call to function _GET_FPI_ on value _r_(3) where _f_(3) holds the value of the call target symbol address in the machine instruction program, and the return value "fpi" a pointer to the data structure _FP_INFO_ whose "addr" value is the call target symbol address (_r_(3)) and "func" value points to the corresponding subroutine of the source program. Therefore, by the expression "fpi→func( )", data-dependent subroutine-call behavior of the machine instruction can be reproduced on the source program.

Next, a method of generating the source program description of a "symbol address information table", which holds all symbol address information in a table format, is explained. For example, symbol information list r1 as shown in Table 11 is assumed to be generated by the machine instruction analysis unit 1.

TABLE 11

Example of "Symbol information list"
("Instruction address list" is omitted)

| Symbol address | Symbol name |
|---|---|
| 0x8218 | "f0" |
| 0x8220 | "f1" |
| 0x8238 | "ff1" |
| 0x8338 | "ff2" |
| 0x8340 | "jump_test" |
| 0x8448 | "main" |

This symbol information list can be expressed with an array of aforementioned _FP_INFO_ data structure with the array initialization as shown in FIG. 36.

In FIG. 36, for example, the description {0x8218, _my_f0} is the initial values of the first element of _FP_INFO_s- shown in FIG. 35, where member "addr" initializes to 0x8218, and member "func" initializes to _my_f0. Here, _my_f0 is the subroutine name string of symbol f0 which is the symbol located at 0x8218. By this way, we can construct such data structure that directly links the symbol address in the machine instructions and the subroutine address of the generated source program.

Next, _GET_FPI_function in FIG. 33 which searches the symbol address information table on the symbol address and returns the corresponding address of _FP_INFO_ can be implemented with a simple linear search program as shown in FIG. 37.

In case the size of the symbol address information table is large and the overhead for searching the table may become an issue, a faster search method such as "binary tree search" or "hash search" can be applied to speed up the table search.

<Memory Initialization Source Program Generation Unit 3c>

Memory initialization source program generation unit 3c (instruction-set simulator source program output unit 3) generates a source program for initializing the CPU memory space as a part of the source program of the instruction-set simulator S.

The targets for memory initialization include not only the data sections with defined initial values but also may include the program sections. For example, ARMv5 instruction-set allows PC-relative load instruction for constants, in which case parts of the program sections are used for storing constants which needs to be initialized as well. Therefore, the program sections are also included in memory initialization.

Memory initialization data are stored in the binary data part of the binary executable file 5, where the location of binary data part is defined for each segment inside the program header table and for each section inside the section header table.

Memory initialization source program generation unit 3b generates the memory initialization source program either on per segment basis or on per section basis. FIG. 38 shows one example of memory initialization source program description which employs per section basis memory initialization including the initialization on ".rodata" section.

In this example, ".rodata" section has the address range of 0x1260c-0x127e7, and its actual initial data are defined as the array initializer on unsigned char data[476] array. This array is then copied to the CPU memory with memory function at the location &arm._mem[0x1260c].

<Main Function Source Program Generation Unit 3d>

Here, the top-most function of the source program description of the instruction-set simulator S, that is the main function, is explained. Source program of the top-most function (main function) is generated by the main function source program generation unit 3d.

As mentioned previously, an "entry symbol" whose address is the entry point (address of the first instruction executed upon program execution) defined in the binary executable file is the first subroutine to be executed from the top-most function of the instruction-set simulator source program. Therefore, a function call to the "entry symbol subroutine" is created.

For example, if the subroutine name corresponding to the entry symbol is "_my_mainCRTStartup", the top-most function of the instruction-set simulator S can be described as shown in FIG. 39, where the memory initialization function install_mem( )" is first called then the entry symbol subroutine is called.

As a second method, the main function in the binary executable file ("_my_main") can be directly called. In this case, stack pointer is initialized to the memory size, and if needed, arguments int argc, char*argv[ ] of the main function (of the instruction-set simulator S) can be written to the CPU memory of the simulator, then calls the main symbol "_my_main". FIG. 40 shows the example of the second method where the memory initialization function call "install_mem( )", parameter setting function call "install_main_param(argc, argv)", and finally the main function call "_my_main( )" are executed in sequence. FIG. 41 shows the description of the parameter selling function "install_main_param".

<Features of the Source Program Description Structure of the Instruction-Set Simulator S>

The instruction-set simulator source program generated by aforementioned methods has the following structural features:

(1) As shown in FIG. 34, subroutines in the binary executable file directly corresponds to the subroutines in the source program, therefore, the hierarchical structures of subroutines in the binary executable file is preserved in the source program of instruction-set simulator S.

Also, goto-statements and program labels directly correspond on simple branch instructions, switch-statements and case-statements directly correspond on data-dependent branch instructions, and therefore the program execution flow is easy to understand.

Therefore, generated source program is highly readable, and program debugging and program modifications such as functional extensions can be efficiently carried out.

(2) Program execution flow is explicitly described with goto-statements, call-statements, return-statements, and updating calculation of the program counter is completely omitted. While the conventional static compile based Instruction-set simulator relied on the program structure that comprises switch-statements on the program counter and case-statements corresponding to individual instructions in the binary executable program, such program structure is not required.

Therefore, the overhead of program flow control is drastically smaller than the conventional techniques. Also, since the program flow control structure is drastically simpler than that of the conventional techniques, code optimizations of the compiler (such as dead code elimination) can be highly effective.

For these reasons, processing speed of the instruction-set simulator S is drastically improved.

Therefore, the instruction-set simulator S of the first embodiment has the following effects:

1. Software development environment for embedded systems which utilizes the instruction-set simulator S can emulate the details of the target system.

2. By generating the source program whose behavior is equivalent to that of the binary executable program, and then compiling and executing the generated source program, as mentioned previously, a fast instruction-set simulator environment can be established. The speed of such instruction-set simulator has the comparable speed to that of the native execution (that is, compiling and executing the original source program directly on the host-CPU).

3. Debugging, behavior verification and performance verification can be performed directly on the target-CPU's binary executable program on the standard application software development environment on the host-CPU.
4. On processor architecture development and verification environment, efficient instruction-set simulator which reflects architecture modifications for CPU performance improvement can be generated.
5. Platform conversion (porting) is possible. From a binary executable program for one target-CPU, the equivalent C source program can be generated and the recompiled for other CPUs.
6. Malware analysis becomes possible. Source program analysis of the equivalent binary executable program is easy, and therefore malware analysis, including virus programs can be easily carried out, which facilitates the fast development of virus antidote programs and firewalls.
7. Software copyright protection can be strengthened. Equivalent source program from the binary executable program can be easily analyzed, and therefore can be used for proving copyright infringement and patent infringement effectively.
8. A complete source program restoration from the binary executable program can be guaranteed.
9. The instruction-set simulator S can be generated from a simple software framework that satisfies high speed and completeness.

As previously mentioned, Non-patent Documents 4, 8, 9 which provide viable practical use, had the following problems to the solved:

First problem is that it lacks the information to determine which instructions can potentially be the target of a branch instruction.

Second problem is that the simulation speed of ISS source program is 14 times to 54 times slower than native execution (original program)

Third problem is that the generated ISS source programs have little opportunities for code optimization (due to the particular program structure composed of switch-statements and case-statements).

Fourth problem is that the generated ISS source program lacks the hierarchical program structure.

Fifth problem is that the generated ISS source program is very difficult to read, since it does not even restore the subroutine structure of the original binary executable program.

Sixth problem is lack of program control flow analysis capability.

As previously mentioned, by the first embodiment, branch target address is converted to program labels and jump tables, and therefore sufficient information is provided to determine which instruction can become the branch target address.

Also, the simulation execution time is comparable to native execution time.

Also, hierarchical structure of the binary executable program is restored in the source program, and therefore the code optimizations of the compiler can be effectively applied.

Also, the source program restored from the binary executable program restores the subroutine hierarchical structure of the binary executable program, and therefore is highly readable.

Also, simple branch instructions, data-dependent branch instructions, data-dependent subroutine-call instructions, etc. are analyzed and branch/call targets are explicitly specified by jump tables, etc., therefore possesses the ability to perform program control flow analysis.

For the above reasons, the first embodiment of the present invention, con solve the problems of the Non-patent Documents 4, 8, 9 which is used in practice.

Second Embodiment

An instruction-set simulator 2S of the second embodiment (refer to FIG. 43) is an instruction-set simulator S of the first embodiment which is further provided with a "subroutine argument extraction unit".

Other compositions are the same as the instruction-set simulator S of the first embodiment, and therefore, for the same composition element, same sign is designated and detail explanations are omitted.

The instruction-set simulator 2S of the second embodiment is the instruction-set simulator S of the first embodiment which is further provided with a "subroutine argument extraction unit", in which the CPU registers are replaced with local variables and argument variables so that further speedup of the instruction-set simulator is achieved.

Figure 42:
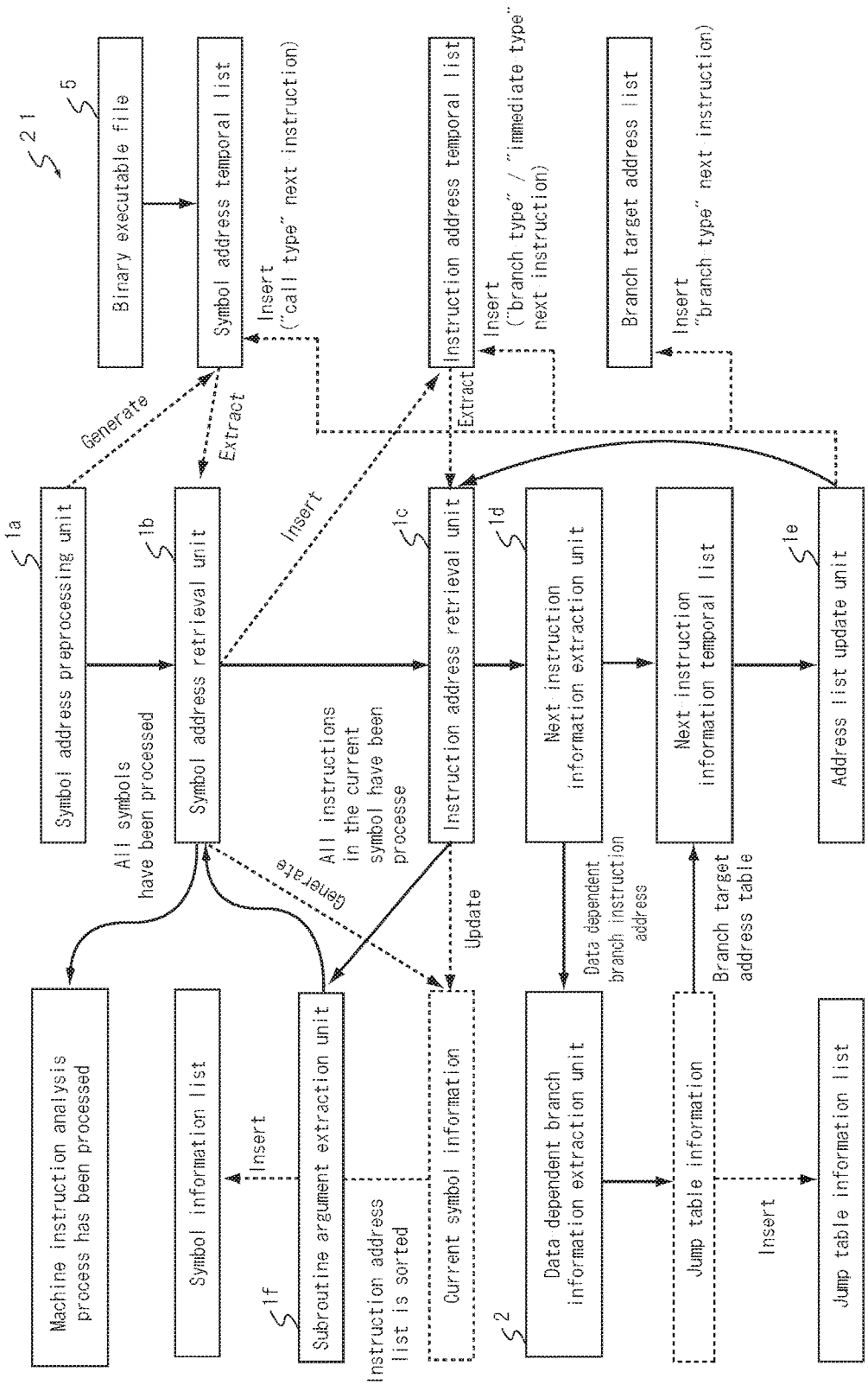
FIG. 42 is a function block diagram illustrating a machine instruction analysis unit or the second embodiment.

FIG. 42 shows the function block diagram of a machine instruction analysis unit of the second embodiment.

The machine instruction analysis unit 21 is composed of
a symbol address preprocessing unit 1a,
symbol address retrieval unit 1b,
instruction address retrieval unit 1c,
next-instruction information extraction unit 1d,
address list update unit 1e, and
data-dependent branch information extraction unit 2, from the first embodiment,
with newly added subroutine argument extraction unit 1f.

The subroutine argument extraction unit 1f has a role of describing the CPU registers by local variables and argment variables of a subroutine.

Figure 43:
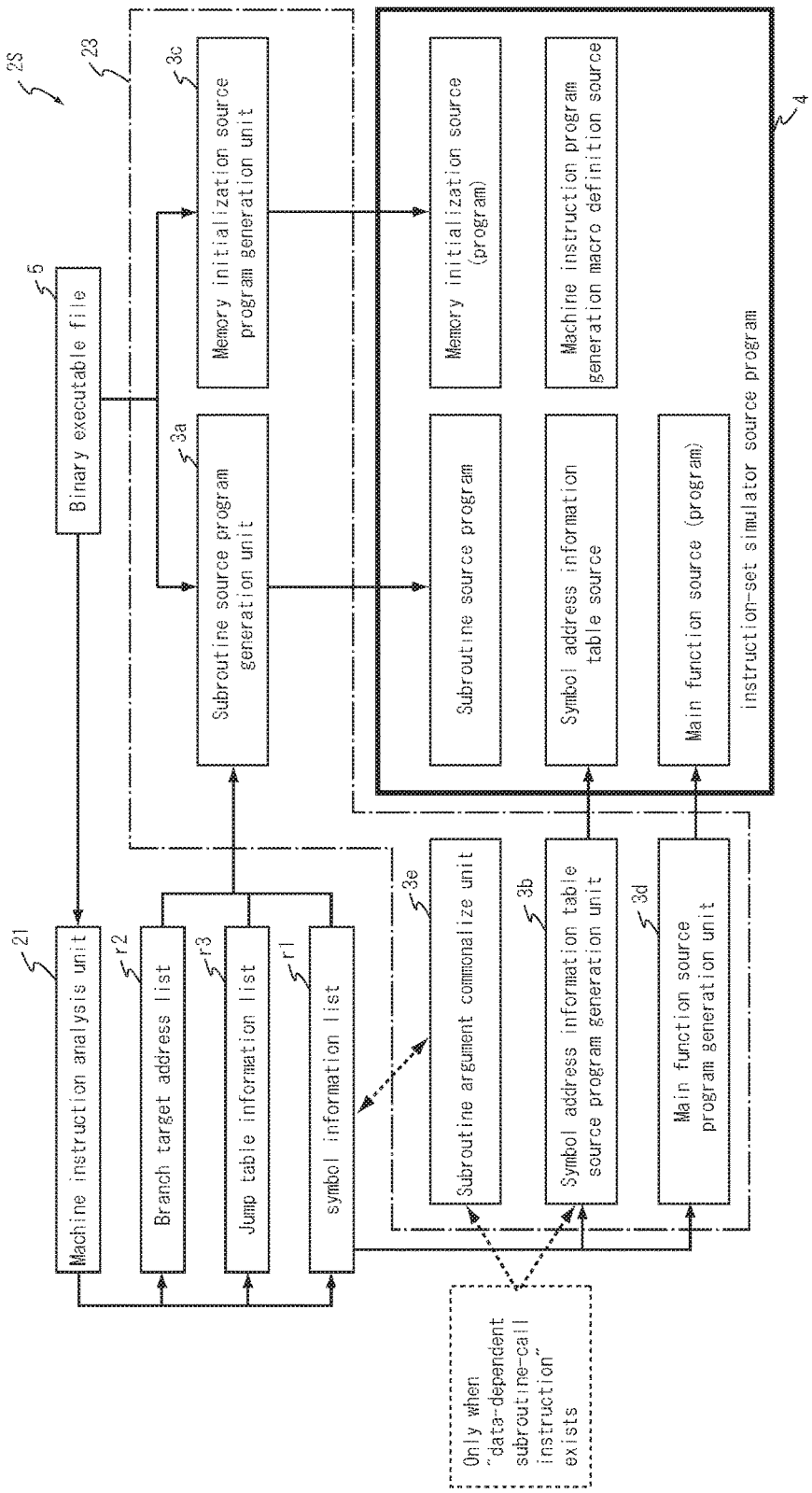
FIG. 43 is a function block diagram illustrating a structure of an instruction-set simulator of the second embodiment.

FIG. 43 shows the composition of the instruction-set simulator 2S of the second embodiment, together with the binary executable file 5, the instruction-set simulator source program 4 generated by the instruction-set simulator 2S.

The instruction-set simulator 2S of the second embodiment is composed of a machine instruction analysis unit 21, and an instruction-set simulator source program output unit 23.

The instruction-set simulator 2S takes the binary executable file 5 as an input, and outputs an instruction-set simulator source program 4

Instruction-set simulator source program output unit 23 is composed of
a subroutine source program generation unit 3a,
a symbol address information table source program generation unit 3b,
a memory initialization source program generation unit 3c, and
a main function source program generation unit 3d,
with newly added subroutine argument commonalize unit 3e.

Here, a symbol address information table source program generation unit 3b and subroutine argument communize unit 3e are used only if data-dependent subroutine-call instructions exist in the machine instruction of the binary executable file 5.

Newly added subroutine argument extraction unit 1f (refer to FIG. 42) is explained.

<Subroutine Argument Extraction Unit 1f>

The process of the subroutine argument extraction unit 1f is executed before the instruction address retrieval unit 1c "inserts" the "current symbol information" to the "symbol information list" (refer to FIG. 42 and FIG. 7).

<Mechanisms of Subroutine Argument Extraction Unit 1f>

Subroutine "argument" is a data set to the CPU register before the subroutine-call, and is referred after the program execution enters the subroutine (case where the argument is stored on the stack memory is not considered where). In order to analyze which register is the "subroutine argument", it suffices to search for registers which are referenced without being modified by any instruction. For this analysis, first by analyzing which registers are referenced and modified for each instruction, then by traversing the instructions in the reverse order of instruction executions, "subroutine arguments" can be identified.

FIG. 44 shows the "input-output register" information of ARMv5 instruction-set machine instructions of FIG. 10. Here, "input-output register" refers to the register which is used as operand (input register) and the register which is modified (output register) by the machine instruction. On the candidates of "input-output registers", pc (program counter) is excluded from the candidate (pc is not related to argument extraction process), and state registers are included. Also, for convenience, multiple "state registers" are considered as a single register "CC", and its register ID is set to 16. Also, register ID of sp is 13, register ID of 1r is 14, as described previously.

(1) Input register ID list (in FIG. 44, depicted as I(..)): a list of register IDs in which the corresponding register is used by the machine instruction uses as operands (2) Output register ID list (in FIG. 44, depicted as O(..)): a list of register IDs in which the corresponding register is modified by the machine instruction (3) Examples of input-output registers:

A) sub r3, r0, #3: first operand is r0, so "I(0)", destination register is r3, so "O(3)"

B) push {lr}: base address is a stack pointer (sp: r[13]) and the stored data is the link register (lr: r[14]), so "I(13,14)", base address register is modified, so "O(13)"

C) cmp r3, #5: first operand is r3, so "I(3)", state register (CC) is modified, so "O(16)"

D) ldrls pc, (pc, r3, lsl #2: base address is pc (ignored) and address offset is r3, and this instruction is conditional (ldrls) which references the state register (CC), so "I(3,16)", output register is pc (ignored), so "O( )" (no output register)

(4) "Live input register analysis": Instructions are traversed in the reverse order of instruction execution starting from all return instructions, and "live input register ID list" is updated. A "live input register" refers to a register, at a particular instruction, which is referenced after the execution of that instruction by other instructions in the same subroutine, and which is not modified inside the same subroutine before the execution of that instruction, "Live input register analysis" performs the below steps at each instruction.

A) For each register ID in the "output register ID list", if the register ID exists in the "live input register ID list", this register ID is deleted from the "live input register ID list".

B) All register IDs in the "input register ID list" are "inserted" (non-duplicatively) in the "live input register ID list".

TABLE 12

Analysis example of input-output register (Analysis is started from a return instruction at 0x8380)

| Instruction | Instruction input-output register ID | Live input register ID |
|---|---|---|
| 8380: pop {pc} | I(13), O(13) | I(13) |
| 837c: add r0, r0, #1 | I(0), O(0) | I(0, 13) |
| 8378: bx r3 | I(3), O( ) | I(0, 3, 13) |
| 8374: mov lr, pc | I( ), O(14) | I(0, 3, 13) |
| 8370: ldr r3, [r3] | I(3), O(3) | I(0, 3, 13) |
| 836c: ldr r3, [pc, #68] | I( ), O(3) | I(0, 13) |
| 834c: ldrls pc, [pc, r3, lsl #2] | I(3, 16), O( ) | I(0, 3, 13, 16) |
| 8348: cmp r3, #5 | I(3), O(16) | I(0, 3, 13) |
| 8344: push{lr} | I(13, 14), O(13) | I(0, 3, 13, 14) |
| 8340: sub r3, r0, #3 | I(0), O(3) | I(0, 13, 14) |

Table 12 shows the machine instructions in the reverse order of execution starting from the return instruction at 0x8380 to the first instruction of this symbol at 0x8340. As a result of this analysis, the "live input register ID list" is (0, 13, 14), therefore the "live input registers" are r0, sp, lr. Applying the same analysis from all other return instructions, the "live input register ID list" is finally obtained as (0, 13,14).

(5) Identification of subroutine argument registers: from the "live input register ID list" obtained by the aforementioned analysis, the "subroutine arguments" are identified according to the following rules;

A) Link register (lr:r[14]) is not considered as the "subroutine argument", since the link register whose information is used to implement the subroutine-call and subroutine-return operations on the CPU is not required in the techniques of the present invention, in which the subroutine-call and subroutine-return operations are directly implemented on the source program with call-statements and return-statements.

B) Stack pointer (sp:r[13]) is considered as the "subroutine argument". Normally, updates on the stack pointer are executed after the subroutine-call operation and before the subroutine-return operation in which the stack pointer is managed in the CPU resource. However, in the second embodiment, all CPU registers including the slack pointer is implemented by local variables or subroutine argument variables, and therefore the slack pointer is considered as the "subroutine argument".

C) All other registers are considered as the "subroutine arguments".

<Data Structure Used in Subroutine Argument Extraction Unit 1f>

Subroutine argument extraction unit 1f uses the following data structure:

(1) Instruction information list: a list for analyzing the "live input registers".

"Instruction information" consists of the following data items:

A) Instruction information ID: a unique ID for each instruction information

B) Instruction address

C) Input register ID list

D) Output register ID list

E) Live input register ID list ("live input registers" it each instruction)

F) Next-instruction information list: same as aforementioned "next-instruction information temporal list"

G) "Previous instruction information ID list": a list of instruction information IDs of all "previous instructions", where "previous instruction" is an instruction whose next-instruction is the current instruction (this list is used during backward instruction traversal)

(2) "Instruction information ID temporal list": a temporal list for backward instruction traversal (3) "Subroutine live input register ID temporal list": a temporal list of "live input register IDs"

(4) "Subroutine argument register ID list": a list which stores the register IDs of the corresponding subroutine arguments after the completion of the subroutine argument extraction process Also, "subroutine argument register ID list" is added to the aforementioned "symbol information".

Data items of "Symbol information of the second embodiment":
A) Symbol address
B) Instruction address list
C) Symbol name string
D) Data-dependent subroutine Instruction flag
E) Subroutine argument register ID (newly added in the second embodiment)

<Composition of Subroutine Argument Extraction Unit 1f>

Figure 45:
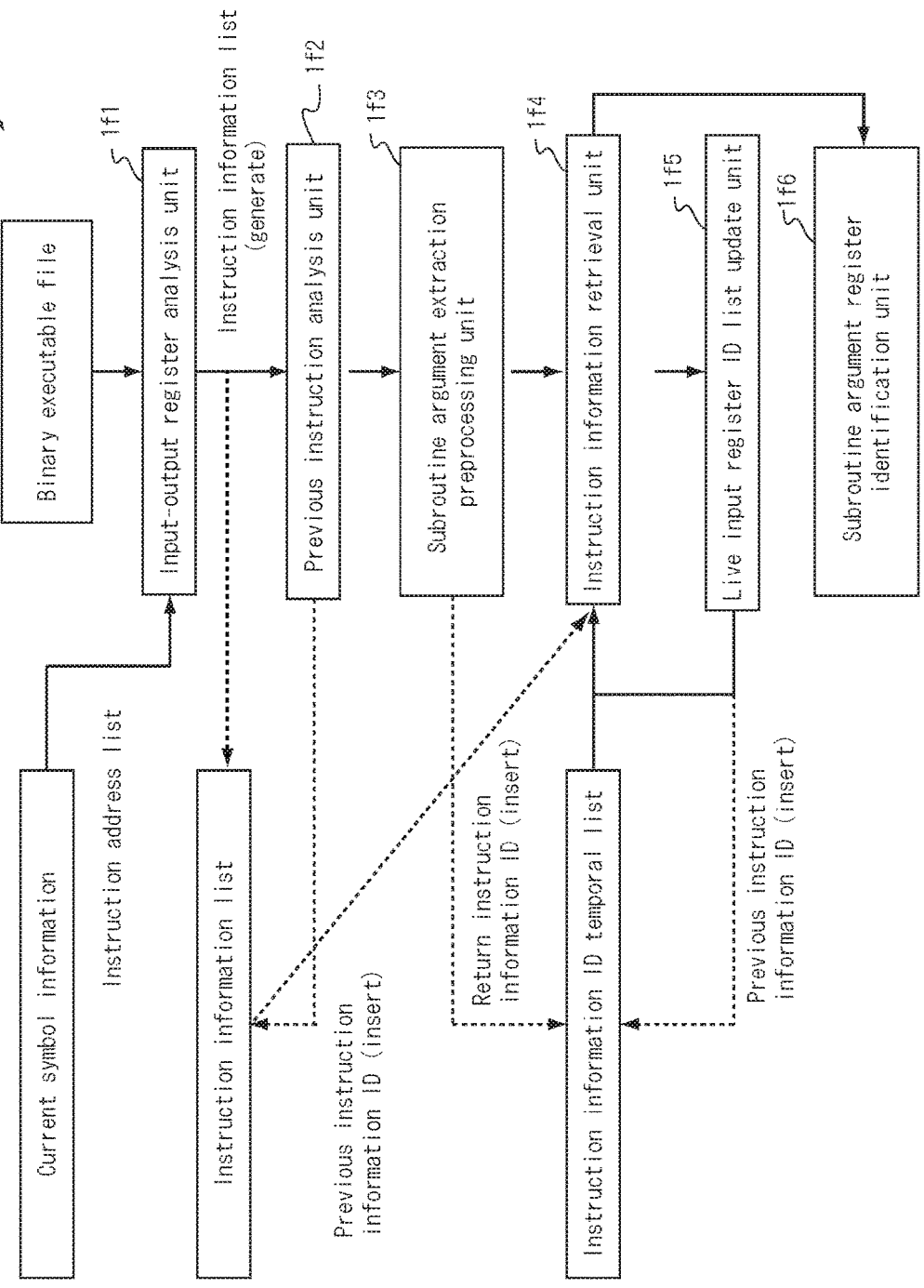
FIG. 45 is a function block diagram illustrating a subroutine argument extraction unit.

In FIG. 45, a function block diagram of a subroutine argument extraction unit 1f is shown.

Subroutine argument extraction unit 1f is composed of
input-output register analysis unit 1f1,
previous instruction analysis unit 1f2,
subroutine argument extraction preprocessing unit 1f3,
instruction information retrieval unit 1f4,
live input register ID list update unit 1f5, and
subroutine argument register identification unit 1f6. Each unit in the subroutine argument extraction unit 1f is explained in the following.

<Input-Output Register Analysis Unit 1f1>

An "instruction address" is retrieved, one-by-one, from the "instruction address list" of the "current symbol information", and creates the "instruction information" on the retrieved instruction address. The created "instruction information" is stored in "instruction information list". On the created "instruction information", a unique "instruction information ID" is assigned, instruction address is set to the retrieved instruction address, and generates the "input register ID list", "output register ID list" and "next-instruction information list". Here, aforementioned next-instruction information extraction unit 1d is used to create the "next-instruction information list". At this point, the "live input register ID list" and "previous instruction information ID list" in each "instruction information" is initialized to be "empty". After processing all instruction addresses, the process progresses to previous instruction analysis unit 1f2.

<Previous Instruction Analysis Unit 1f2>

The following process is performed for each "instruction information" stored in the "instruction information list". Hereinafter, the "instruction information" being processed is called the "current instruction information", and the "instruction information ID" of the "current instruction information" is called the "current instruction information ID".

At the "current instruction information", the "instruction information" of all next-instructions (stored in "next-instruction information list") of "immediate-type" or "branch-type" is searched, where the "instruction information" whose instruction address matches the next-instruction address are retrieved. The "current instruction information ID" is "inserted" (non-duplicatively) to the "previous instruction information ID list" of the searched "instruction information" (corresponding to the next-instruction).

After all "instruction information" have been processed, the process progresses to subroutine argument extraction preprocessing unit 1f3.

<Subroutine Argument Extraction Preprocessing Unit 1f3>

Among the "instruction information" included in the "instruction information list", the "instruction information ID" of all "instruction information" corresponding to return instructions are "inserted" (non-duplicatively) to the "instruction information ID temporal list". The "subroutine live input register ID temporal list" is initialized to be "empty".

The process then progresses to instruction information retrieval unit 1f4.

<Instruction Information Retrieval Unit 1f4>

"Instruction information ID" is "extracted" from the "instruction information ID temporal list", the corresponding "instruction information" is retrieved from the "instruction information list", then continues to live input register ID list update unit 1f5. Hereinafter, the retrieved "instruction information" is called the "current instruction information".

If "instruction information ID temporal list" is empty, the process progresses to subroutine argument register identification unit 1f6.

<Live Input Register ID List Update Unit 1f5>

Here, the following steps are executed and returns back to instruction information extraction unit 1f4.

(1) For each "output register ID" in the "output register ID list" of the "current instruction information", if the register ID exists in the "subroutine live input register ID temporal list", then delete the register ID from the "subroutine live input register ID temporal list".

(2) For each "input register ID" in the "input register ID list" of the "current instruction information", "insert" (non-duplicatively) the register ID to the "subroutine live input register ID temporal list".

(3) If all register IDs in the "subroutine live input register ID temporal list" exist in the "live input register ID list" of the "current instruction information", below steps are skipped and returns back to instruction information retrieval unit 1f4.

(4) If there exists a register ID in "subroutine live input register ID temporal list" which does not included in the "live input register ID list" of the "current instruction information", execute the following steps.

A) For each register ID in the "subroutine live input register ID temporal list", "insert" the register ID (non-duplicatively) to the "live input register ID list" of the "current instruction information". That is, when the same ID exists, the register ID is not inserted to "live input register ID list".

B) For each "instruction information ID" in the "previous instruction information ID list" of the "current instruction information", "insert" the "instruction information ID" (non-duplicatively) to the "instruction information ID temporal list". That is, when the same ID exists, the instruction information ID is not inserted to "instruction information ID temporal list".

<Subroutine Argument Register Identification Unit 1f6>

For each register ID in the "subroutine live input register ID temporal ist" which is not the ID of "link register" (which stores the subroutine return address), "insert" the register ID to the "subroutine argument register ID list".

<Subroutine Argument Commonalize Unit 3e>

Next, subroutine argument commonalize unit 3e in the instruction-set simulator source program output unit 23 is explained.

The subroutine argument communalize unit 3e is executed when the process of the subroutine argument extraction unit 1f is executed for all "symbol information" in the "symbol information list" (refer to FIG. 42). This process is required if there exists a "symbol information" whose "data-dependent subroutine-call instruction flag" is set to "1". The reason this process is required is, when implementing the data-dependent subroutine-call on the source program, a "common" function-pointer data type is required.

First, an "empty" "common subroutine argument register ID list" is created. For each "symbol information" in the "symbol information list", for each register ID in the "subroutine argument register ID list", the register ID is "insert" (non-duplicatively) to the "common subroutine argument register ID list". That is, the same register ID does not exist in the common subroutine argument register ID list.

For each "symbol information" in the "symbol information list", the "subroutine argument register ID list" is replaced with the "common subroutine argument register ID list".

<Other Modifications on the Second Embodiment>
(1) Macro definition for CPU resource access: FIG. 14 shows the macro definition for CPU resource access, where the CPU registers are defined in the CPU resource data structure (refer to FIG. 13). However, In the second embodiment, CPU register variables are defined as subroutine argument variable or a local variable. Therefore, the macro definition of for CPU resource access is modified as shown in FIG. 46.
(2) Subroutine definition description generation unit: in the second embodiment, subroutine data type (return type, argument types) are different from that of the first embodiment.
A) Subroutine "return value": In the first embodiment, all the generated subroutines do not have a return value (void type), however in the second embodiment, all subroutines have a return value with the data type of the CPU register. For example, 32-bit CPU will have U32 type (unsigned 32-bit integer), and 64-bit CPU will have U64 type (unsigned 64-bit integer).
B) Subroutine argument: "subroutine argument register ID list" generated by the subroutine argument extraction unit 1f and (if required) subroutine argument communalize unit 3e (refer to FIG. 43) is used to determine the subroutine argument count. Data type of each argument is the same as the CPU register data type. And argument names are generated from register IDs or register alias name (such as "sp" for r[13]).
C) CPU register local variable definition description: all other registers that do not appear as subroutine arguments are implemented as local variable, and are defined at the beginning of the subroutine definition description (refer to FIG. 47). FIG. 47 shows the subroutine definition description output of "jump_test" function.

FIG. 48 shows the subroutine description example of the second embodiment. Here, it assumed that the number of subroutine arguments do not change after executing subroutine argument commonalization unit 3e.
(3) Simple subroutine-call instruction source program generation unit 3a7 (refer to FIG. 24): In the second embodiment, subroutine type (return type, argument types) is different, and therefore the subroutine-call description is changed.
A) Subroutine argument passing description: after retrieving the "symbol information" of the call target symbol in the simple subroutine-call instruction source program generation unit 3a7, its "subroutine argument register ID" is used to generate argument passing description using local variables and argument variables.
B) Subroutine return value: description of storing the return value to the register variable is generated. (Even if the actual subroutine does not have a return value, this does not have any ill effects on the program execution)
FIG. 48 shows the subroutine call source program description of the second embodiment.
(4) Modification to the "function-pointer type" on the "symbol address information table": in the first embodiment, a function-pointer type with no return value and no arguments were used for _FP_INFO_data structure for symbol address information (refer to FIGS. 35-37). However in the second embodiment, modification is made as shown in FIG. 49. Here, it is assumed that the "common subroutine argument register ID list" is identical to "subroutine argument register ID list" for "my_jump_test" subroutine.
(5) Data-dependent subroutine call instruction source program generation unit 3a9 (refer to FIG. 24): in the second embodiment, since the subroutine-call description changes, "data-dependent subroutine-call source program description" also is changed. Here, the "common subroutine argument register ID list" is used to generate the argument passing description of the data-dependent subroutine-call using argument variable or local variable. FIG. 50 shows the data-dependent subroutine-call instruction source program description of the second embodiment. Same as previously, it is assumed that the "common subroutine argument register ID list" is identical to "subroutine argument register ID list" for "my_jump_test" subroutine.

Third Embodiment

Figure 51:
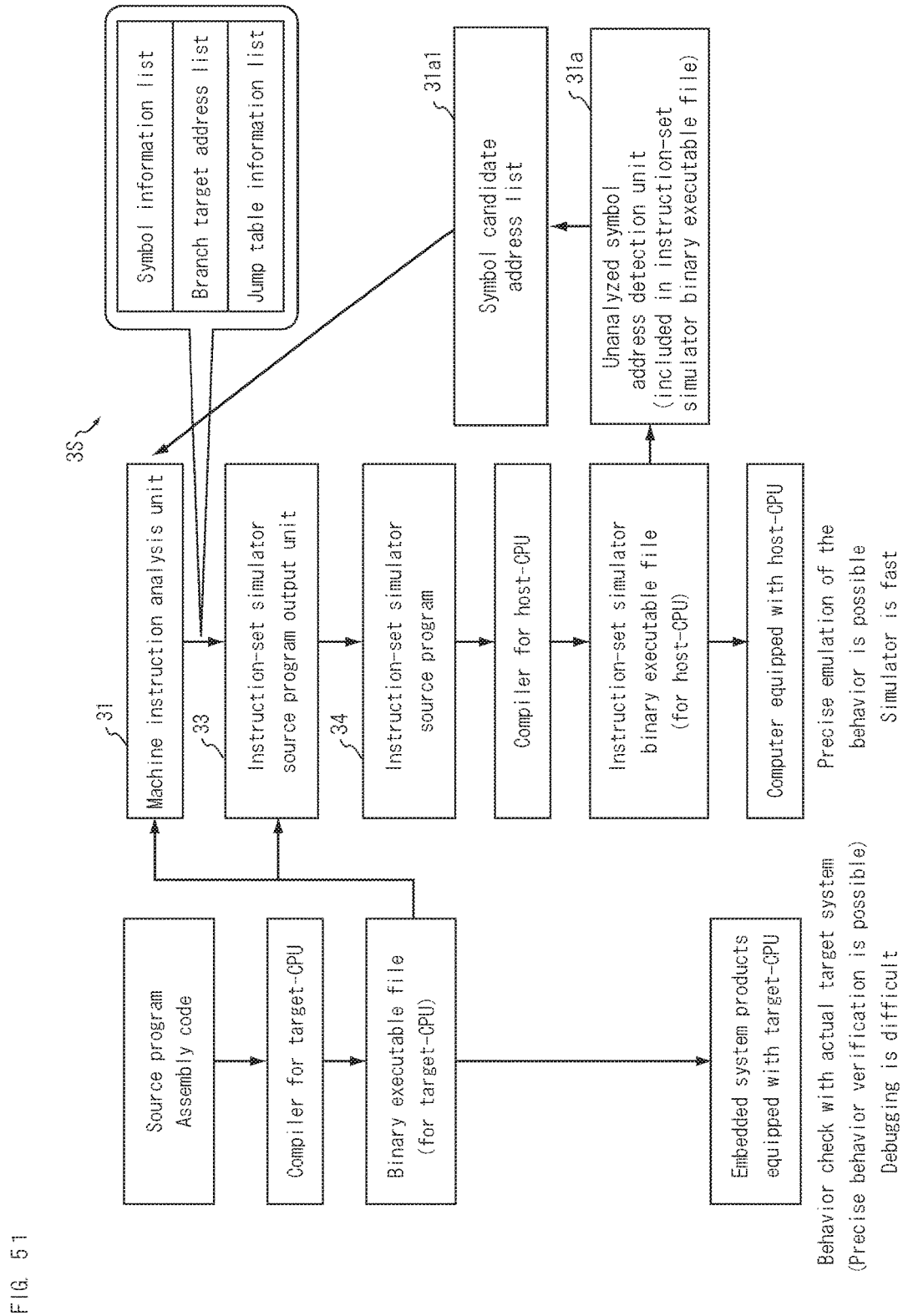
FIG. 51 is a function block diagram illustrating a software development environment for embedded systems using the instruction-set simulator of the third embodiment.
Figure 56:
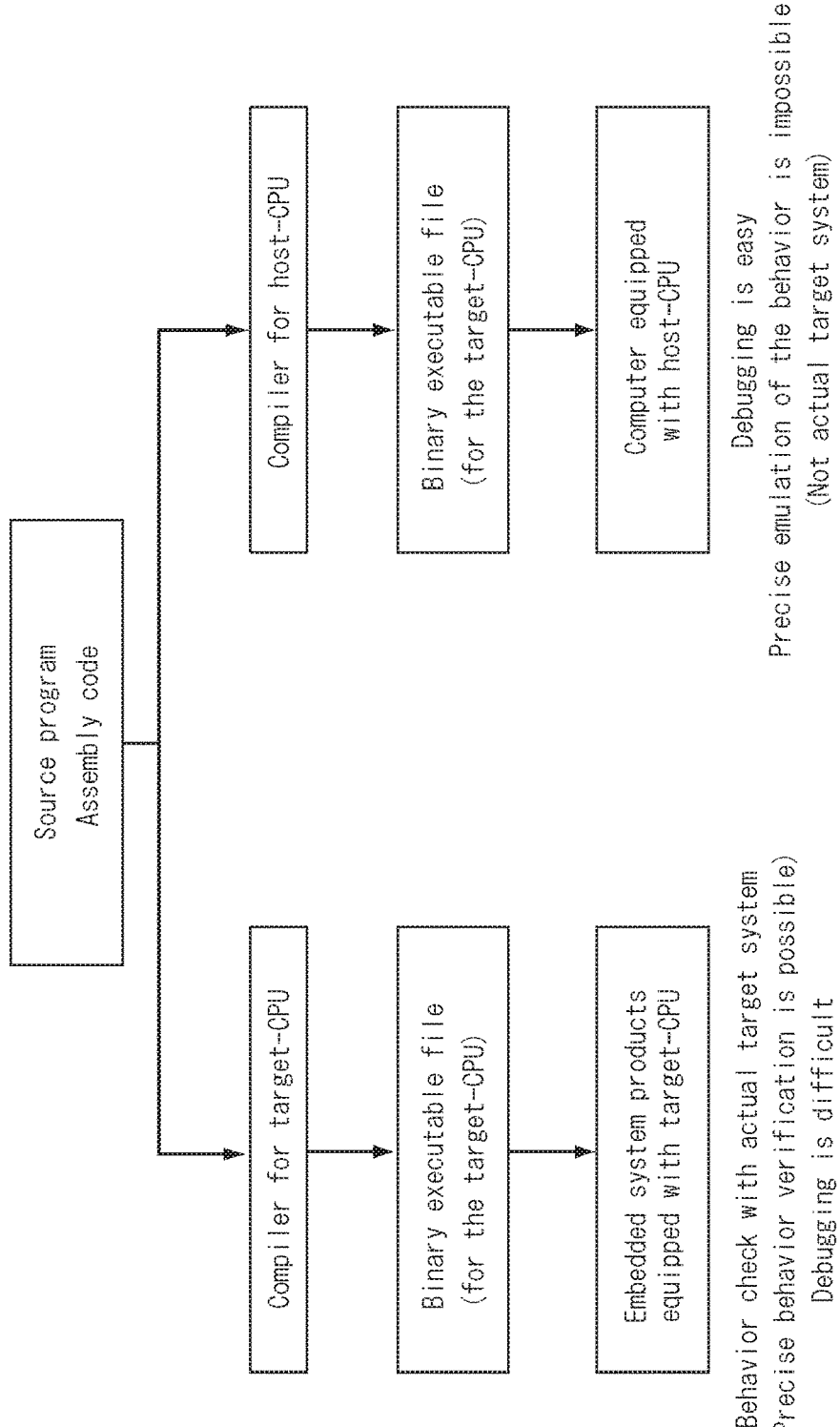
FIG. 56 is a diagram illustrating a conventional software development environment for embedded systems that does not utilize the instruction-set simulator.
Figure 57:
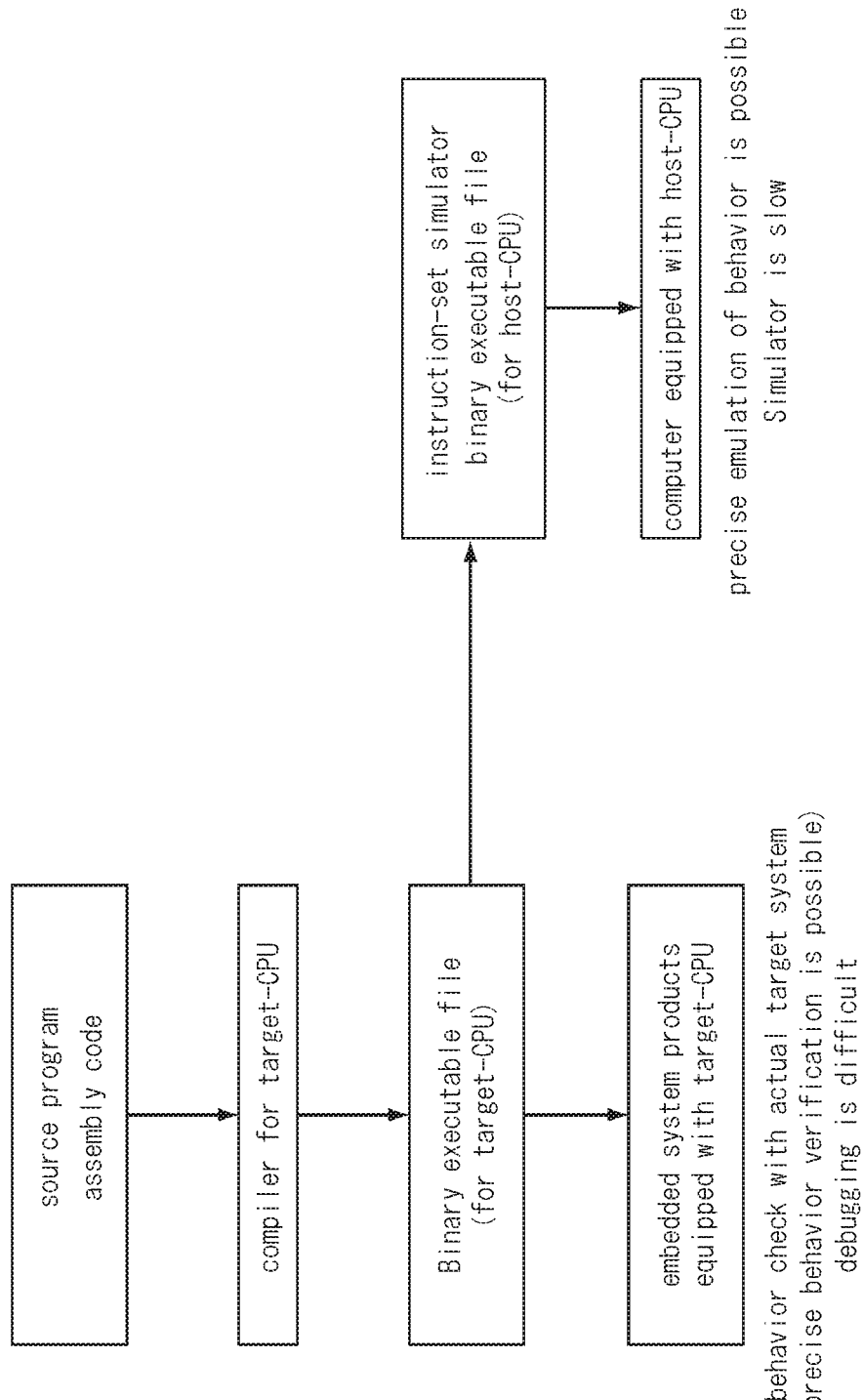
FIG. 57 is a diagram illustrating a conventional software development environment for embedded systems that utilizes the instruction-set simulator.

FIG. 51 shows the software development environment for embedded systems using a instruction-set simulator of the third embodiment.

The instruction-set simulator 3S of the third embodiment, is an instruction-set simulator S of the first embodiment or an instruction-set simulator 2S of the second embodiment, which is further provided with a machine instruction analysis unit 31 for handling the situation where a symbol table does not exist in the binary executable file.

In the first or second embodiment, it is assumed that the symbol table existed in the binary executable file. Here, the third embodiment for handling the situation where a symbol table does not exist is explained.

<Overview of the Method for Handling the Case where Symbol Table Does Not Exist>

In the third embodiment, the machine instruction analysis unit 1 (21) of the first (second) embodiment and the instruction-set simulator source program output unit 3 is modified to the machine instruction analysis unit 31 and instruction-set simulator source program output unit 33.

(1) Modifications to the machine instruction analysis unit 31 are as follows:
a) The machine instruction analysis unit 31 contains an unanalyzed symbol address detection unit 31a.
If a "symbol table" does not exist, the only means of locating the position of a valid machine instruction is the "entry point" (the address of the first instruction to be executed upon program activation). Therefore, the unanalyzed symbol address detection unit 31a first inserts the "entry point" to the "symbol address temporal list".
b) The machine instruction analysis unit 31 contains a symbol candidate address list 31a1. A "symbol candidate address list" is a list of "symbol candidate" addresses.

Initially, the symbol candidate address list 31a1 is "empty", and when an "unanalyzed" symbol address is found, unanalyzed symbol address detection unit 31a inserts this address to the symbol candidate address list 31a1 (explained later). Each address of this symbol candidate address list 31a1 is added to "symbol address temporal list".

(2) Modifications to the instruction-set simulator program source output unit 33: definition of _GET_FPI_function which is called from the source program description of "data-dependent subroutine-call instruction" is modified as shown in FIG. 52. FIG. 52 shows the definition of _GET_FPI_function which returns the pointer to _FP_INFO_ data structure.

The main point of this modification is that when the "symbol information" of the call target address cannot be found during the data-dependent subroutine-call operation, this implies that the symbol at the call target address is "unanalyzed", in which case the "unanalyzed" call target address is written to the file containing the symbol candidate address list 31a1, and then the instruction-set simulator is forced to terminate.

With this feature, whenever an "unanalyzed" symbol is called, the call target address is recorded in the symbol candidate address list 31a1 and the instruction-set simulator is forced to terminate (by calling exit(−1)). Afterwards, recorded "unanalyzed" call target address in the symbol candidate address list 31a1 is then added to "symbol address temporal list", where machine instruction analysis unit 31 and instruction-set simulator source program generation unit 33 is executed again, and the generated instruction-set simulator source program 34 is recompiled and executed.

By the aforementioned composition, the instruction-set simulator 3S can handle cases where the symbol table does not exist in the binary executable file.

Also, the same set of effects of the first (or second) embodiment remains the same, in which a precise behavior of the target-CPU is reproduced at the host-CPU while the simulation speed is fast.

Other Embodiments

1. In the aforementioned first to third embodiment, the conversion from the binary executable program to a source program utilized the C language, however, high level programming languages other than C language can be used for this purpose.
2. The source program in the patent claim refers to the source program described in C language and the like by the instruction-set simulator S, 2S and 3S of the explained embodiments, however, the source program can be described with high level programming languages other than C language.

REFERENCE SIGNS LIST

1c: Instruction address retrieval unit (subroutine detection means, subroutine-call instruction detection means)

1d: Next-instruction information extraction unit (subroutine detection means, subroutine-call instruction detection means, branch instruction detection means, simple branch instruction detection means, simple subroutine-call instruction detection means, data-dependent branch instruction detection means, data-dependent subroutine-call instruction detection means)

1e: Address list update unit (subroutine detection means, simple subroutine-call instruction detection means, data-dependent subroutine-call instruction detection means)

1f: Subroutine argument extraction unit (subroutine detection means, register variable conversion means)

2: Data-dependent branch information extraction unit (subroutine detection means, branch instruction detection means, data-dependent branch instruction detection means, data-dependent subroutine-call detection means, branch target address information retrieval unit)

2f: Branch target address information retrieval unit (machine instruction subroutine address table generation means)

2g: Jump table information generation unit (jump-table recording means, machine instruction subroutine address table generation means)

3: Instruction-set simulator source program output unit (data-dependent branch instruction generation means)

3a: Subroutine source program generation unit (subroutine source program output means)

3a4: Program label generation unit (label annotation means)

3a5: Machine instruction type check unit (unconditional branch instruction output means)

3a6: Simple branch instruction source program generation unit (unconditional branch instruction output means, subroutine-call instruction source program output means)

3a7: Simple subroutine-call instruction source program generation unit (subroutine source program output means, subroutine-call instruction source program output)

3a8: Data-dependent branch instruction source program generation unit (unconditional branch instruction output means, data-dependent branch instruction generation means, subroutine-call instruction output means, data-dependent subroutine-call instruction generation means)

3a9: Data-dependent subroutine-call instruction source program generation unit (subroutine program source output means, subroutine-call instruction output means, subroutine address search program generation means)

3e: Subroutine argument commonalize unit (subroutine source program output means, register variable conversion means)

23: Instruction-set simulator source program output unit (data-dependent branch instruction generation means, register variable conversion means)

33: Instruction-set simulator source program output unit (subroutine source program output means)

r3: Jump table information list (Jump table information storage unit, machine instruction subroutine address table)

S, 2S, 3S: Instruction-set simulator

The invention claimed is:

1. An instruction-set simulator which generates a simulator executable program by converting a binary executable program into a source program, comprising:
   a subroutine detection means that detects subroutines included in the binary executable program,
   a branch instruction detection means that detects the branch instructions in the binary executable program which have a branch target address,
   a subroutine-call instruction detection means that detects subroutine-call instructions in the binary executable program which have a subroutine-call target address,
   a subroutine source program output means that generates the source program for each subroutine detected by the subroutine detection means,
   a label annotation means that annotates a label indicating the branch target address at a branch target instruction in the generated source program,
   an unconditional branch instruction output means that converts each branch instruction in the binary executable program into an unconditional branch instruction in the generated source program which branches to the labeled branch target instruction in the generated source program, and
a subroutine-call instruction output means that converts each subroutine-call instruction in the binary executable program into a subroutine-call instruction in the generated source program.

2. The instruction-set simulator according to claim 1, wherein the branch instruction detection means comprises
a simple branch instruction detection means that detects simple branch instructions whose branch target address can be statically determined, and
a data-dependent branch instruction detection means that detects data-dependent branch instructions whose branch target address is determined by a register value or a memory value.

3. The instruction-set simulator according to claim 2, wherein the instruction-set simulator comprises
a jump-table recording means that records the branch target addresses of the data-dependent branch instructions into a jump-table information storage unit, and
a data-dependent branch instruction generation means that generates a set of unconditional branch instructions from a jump-table information in the generated source program, in which the jump-table information is retrieved from the jump-table information storage unit by searching the branch target address of the data-dependent branch instruction registered in the jump-table information storage unit.

4. The instruction-set simulator according to claim 1, wherein the subroutine-call instruction detection means comprises
a simple subroutine-call instruction detection means that detects simple subroutine-call instructions whose call target address can be statically identified, and
a data-dependent subroutine-call instruction detection means that detects data-dependent subroutine-call instructions whose call target address is determined by a register value or a memory value.

5. The instruction-set simulator according to claim 4, wherein the subroutine-call instruction output means comprises
a machine instruction subroutine address table generation means that generates a machine instruction subroutine address table whose table entry is composed of a subroutine name and a subroutine address in the binary executable program,
a subroutine address search program generation means that generates a program which searches for the subroutine address in the generated source program from the subroutine address in the binary executable program, and
a data-dependent subroutine-call instruction generation means that generates data-dependent subroutine-call instructions in the generated source program in which the target call address of the data-dependent subroutine-call instruction is resolved by the subroutine address search program.

6. The instruction-set simulator according to claim 1, wherein the instruction-set simulator comprises
a register variable conversion means that converts the register values in the binary executable program into subroutine's argument variables or subroutine's local variables of the generated source program.

7. The instruction-set simulator according to claim 1, wherein
the generated source program is a C program,
unconditional branch instructions to the labeled instructions and subroutine-call instructions are used instead of relying on a program structure that comprises switch-statements on the program counter and case-statements corresponding to individual instructions in the binary executable program,
each of the subroutines in the binary executable program correspond to the subroutines in the generated source program, and
a hierarchical structure of subroutines in the binary executable program is restored as a hierarchical structure of subroutines in the generated source program.

8. The instruction-set simulator according to claim 1, wherein the instruction-set simulator comprises
an unregistered machine instruction address detection means that detects and records an unresolved target call address of a data-dependent subroutine-call instruction then forcibly terminates the instruction-set simulator, a case which can be caused by the absence of symbol information in the binary executable program that can cause some of the subroutines in the binary executable program to remain undetected, and
an unregistered subroutine source program output means that emits the source program for the unregistered subroutine.

9. A method for generating a simulator executable program by an instruction-set simulator for converting a binary executable program into a source program to generate the simulator executable program,
wherein the instruction-set simulator comprises a subroutine detection means, a branch instruction detection means, a subroutine-call instruction detection means, a subroutine source program output means, a label annotation means, an unconditional branch instruction output means, and a subroutine-call instruction source program output means,
the method comprising steps of:
detecting, by the subroutine detection means, subroutines included in the binary executable program,
detecting, by the branch instruction detection means, the branch instructions in the binary executable program which have a branch target address,
detecting, by the subroutine-call instruction detection means, subroutine-call instructions in the binary executable program which have a subroutine-call target address,
generating, by the subroutine source program output means, the source program for each subroutine detected by the subroutine detection means,
annotating, by the label annotation means, a label indicating the branch target address at a branch target instruction in the generated source program,
converting, by the unconditional branch instruction output means, each branch instruction in the binary executable program into an unconditional branch instruction in the generated source program which branches to the labeled branch target instruction in the generated source program, and
converting, by the subroutine-call instruction source program output means, each subroutine-call instruction in the binary executable program into a subroutine-call instruction in the generated source program.

10. The method for generating the simulator executable program according to claim 9, wherein the instruction-set simulator comprises a jump-table recording means and a data-dependent branch instruction generation means,
wherein the method comprises steps of:
recording, by the jump-table recording means, the branch target addresses of the data-dependent branch instructions into a jump-table information storage unit, and generating, by the data-dependent branch instruction generation means, a set of unconditional branch instructions from the jump-table information in the generated source program, in which the jump-table information is retrieved from the jump-table information storage unit by searching the branch target address of the data-dependent branch instruction registered in the jump-table information storage unit.

11. The method for generating the simulator executable program according to claim 9,
   wherein the instruction-set simulator comprises a machine instruction subroutine address table generation means, a subroutine address search program generation means and a data-dependent subroutine-call instruction generation means,
   wherein the method comprises steps of:
   generating, by the machine instruction subroutine address table generation means, a machine instruction subroutine address table whose table entry is composed of a subroutine name and a subroutine address in the binary executable program,
   generating, by the subroutine address search program generation means, a program which searches for the subroutine address in the generated source program from the subroutine address in the binary executable program, and
   generating, by the data-dependent subroutine-call instruction generation means, data-dependent subroutine-call instructions in the generated source program in which the target call address of the data-dependent subroutine-call instruction is resolved by the subroutine address search program.

12. The method for generating the simulator executable program according to claim 9,
   wherein the instruction-set simulator comprises a register variable conversion means,
   wherein the method comprises a step of:
   converting, by the register variable conversion means, the register values in the binary executable program into subroutine's argument variables or subroutine's local variables of the generated source program.

13. The method for generating the simulator executable program according to claim 9,
   wherein the instruction-set simulator comprises an unregistered machine instruction address detection means and an unregistered subroutine source program output means,
   wherein the method comprises steps of:
   detecting and recording, by the unregistered machine instruction address detection means, an unresolved target call address of a data-dependent subroutine-call instruction, and then forcibly terminating the instruction-set simulator, a case which can be caused by the absence of symbol information in the binary executable program that can cause some of the subroutines in the binary executable program to remain undetected, and
   emitting, by the unregistered subroutine source program output means, the source program for the unregistered subroutine.

* * * * *